(12) United States Patent
Liu et al.

(10) Patent No.: US 11,699,194 B2
(45) Date of Patent: Jul. 11, 2023

(54) USER CONTROLLED TASK EXECUTION WITH TASK PERSISTENCE FOR ASSISTANT SYSTEMS

(71) Applicant: Meta Platforms Technologies, LLC, Menlo Park, CA (US)

(72) Inventors: Xiaohu Liu, Bellevue, WA (US); Zhiguang Wang, Bellevue, WA (US); Rajen Subba, San Carlos, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 211 days.

(21) Appl. No.: 16/742,668

(22) Filed: Jan. 14, 2020

(65) Prior Publication Data

US 2021/0117479 A1    Apr. 22, 2021

Related U.S. Application Data

(60) Provisional application No. 62/923,342, filed on Oct. 18, 2019.

(51) Int. Cl.
*G06F 40/30* (2020.01)
*G06F 9/54* (2006.01)
(Continued)

(52) U.S. Cl.
CPC ............ *G06Q 50/01* (2013.01); *G06F 3/011* (2013.01); *G06F 3/013* (2013.01); *G06F 9/453* (2018.02); *G06F 9/485* (2013.01); *G06F 9/4881* (2013.01); *G06F 9/547* (2013.01); *G06F 16/3329* (2019.01); *G06F 16/90332* (2019.01);
(Continued)

(58) Field of Classification Search
None
See application file for complete search history.

(56) References Cited

U.S. PATENT DOCUMENTS

| 3,706,503 A | 12/1972 | Foley |
| 5,567,805 A | 10/1996 | Henderson et al. |

(Continued)

FOREIGN PATENT DOCUMENTS

| AU | 2017203668 | 1/2018 |
| CA | 2793743 A1 | 7/2011 |

(Continued)

OTHER PUBLICATIONS

U.S. Appl. No. 14/591,723, filed Jan. 9, 2015, Colin Patrick Treseler.

(Continued)

*Primary Examiner* — Sonia L Gay
(74) *Attorney, Agent, or Firm* — Baker Botts L.L.P.

(57) ABSTRACT

In one embodiment, a method includes receiving a first user request to execute a first task comprising one or more sub-tasks from a client system associated with a user, receiving a second user request to suspend the first task from the client system, storing a dialog state for the first task in response to the second user request, wherein the dialog state comprises results of executed sub-tasks and a status indicating the first task is suspended, receiving a third user request to resume the first task, accessing the dialog state for the first task, and providing a prompt to resume the first task at the client system.

19 Claims, 14 Drawing Sheets

(51) Int. Cl.

| | |
|---|---|
| *G06F 40/205* | (2020.01) |
| *G06F 40/242* | (2020.01) |
| *G06N 3/04* | (2006.01) |
| *G06F 16/9536* | (2019.01) |
| *G10L 15/18* | (2013.01) |
| *G10L 15/22* | (2006.01) |
| *G10L 15/30* | (2013.01) |
| *G10L 15/32* | (2013.01) |
| *G06F 40/253* | (2020.01) |
| *G06N 20/00* | (2019.01) |
| *G06F 3/01* | (2006.01) |
| *G06F 16/9032* | (2019.01) |
| *G06F 9/48* | (2006.01) |
| *G10L 15/08* | (2006.01) |
| *H04N 7/14* | (2006.01) |
| *H04L 67/306* | (2022.01) |
| *G06V 10/20* | (2022.01) |
| *G06V 20/20* | (2022.01) |
| *G06V 20/30* | (2022.01) |
| *G06V 20/40* | (2022.01) |
| *G06V 40/16* | (2022.01) |
| *G06Q 50/00* | (2012.01) |
| *H04L 51/52* | (2022.01) |
| *H04L 51/212* | (2022.01) |
| *H04L 67/75* | (2022.01) |
| *G06F 9/451* | (2018.01) |
| *G06F 16/332* | (2019.01) |
| *G06F 40/35* | (2020.01) |
| *G06K 9/62* | (2022.01) |
| *G06F 3/16* | (2006.01) |
| *G06N 3/08* | (2023.01) |
| *G10L 15/06* | (2013.01) |
| *G10L 15/16* | (2006.01) |
| *G06F 18/2321* | (2023.01) |
| *G06N 3/045* | (2023.01) |
| *G06N 3/047* | (2023.01) |
| *G06V 10/764* | (2022.01) |
| *G06V 10/82* | (2022.01) |
| *G06F 40/56* | (2020.01) |
| *H04L 51/18* | (2022.01) |
| *G06V 20/00* | (2022.01) |
| *G06V 40/20* | (2022.01) |
| *H04L 51/222* | (2022.01) |
| *H04L 51/224* | (2022.01) |
| *G06Q 10/109* | (2023.01) |

(52) U.S. Cl.
CPC ...... *G06F 16/9536* (2019.01); *G06F 18/2321* (2023.01); *G06F 40/205* (2020.01); *G06F 40/242* (2020.01); *G06F 40/253* (2020.01); *G06F 40/30* (2020.01); *G06F 40/35* (2020.01); *G06F 40/56* (2020.01); *G06N 3/045* (2023.01); *G06N 3/047* (2023.01); *G06N 3/0454* (2013.01); *G06N 3/0472* (2013.01); *G06N 3/08* (2013.01); *G06N 20/00* (2019.01); *G06Q 10/109* (2013.01); *G06V 10/255* (2022.01); *G06V 10/764* (2022.01); *G06V 10/82* (2022.01); *G06V 20/00* (2022.01); *G06V 20/20* (2022.01); *G06V 20/30* (2022.01); *G06V 40/16* (2022.01); *G06V 40/25* (2022.01); *G10L 15/063* (2013.01); *G10L 15/08* (2013.01); *G10L 15/16* (2013.01); *G10L 15/1815* (2013.01); *G10L 15/1822* (2013.01); *G10L 15/22* (2013.01); *G10L 15/30* (2013.01); *G10L 15/32* (2013.01); *H04L 51/18* (2013.01); *H04L 51/212* (2022.05); *H04L 51/222* (2022.05); *H04L 51/224* (2022.05); *H04L 51/52* (2022.05); *H04L 67/306* (2013.01); *H04L 67/75* (2022.05); *H04N 7/147* (2013.01); *G06F 3/017* (2013.01); *G06F 3/167* (2013.01); *G06V 20/41* (2022.01); *G06V 40/174* (2022.01); *G06V 2201/10* (2022.01); *G10L 2015/088* (2013.01); *G10L 2015/223* (2013.01); *G10L 2015/227* (2013.01)

(56) References Cited

U.S. PATENT DOCUMENTS

| | | | |
|---|---|---|---|
| 5,809,492 | A | 9/1998 | Murray et al. |
| 6,462,660 | B1 | 10/2002 | Cannon et al. |
| 6,567,805 | B1 | 5/2003 | Johnson et al. |
| 6,760,412 | B1 | 7/2004 | Loucks |
| 7,124,123 | B1 | 10/2006 | Roskind |
| 7,158,678 | B2 | 1/2007 | Nagel |
| 7,228,275 | B1 | 6/2007 | Endo et al. |
| 7,397,912 | B2 | 7/2008 | Aasman |
| 8,027,451 | B2 | 9/2011 | Arendsen |
| 8,548,808 | B2 | 10/2013 | Nakano et al. |
| 8,560,564 | B1 | 10/2013 | Hoelzle |
| 8,677,377 | B2 | 3/2014 | Cheyer |
| 8,706,503 | B2 | 4/2014 | Cheyer et al. |
| 8,862,460 | B2 | 10/2014 | Cai et al. |
| 8,935,192 | B1 | 1/2015 | Ventilla |
| 8,983,383 | B1 | 3/2015 | Haskin |
| 9,060,100 | B2 | 6/2015 | Boortz |
| 9,070,366 | B1 | 6/2015 | Mathias et al. |
| 9,154,739 | B1 | 10/2015 | Nicolaou |
| 9,270,941 | B1 | 2/2016 | Lavelle |
| 9,299,059 | B1 | 3/2016 | Marra |
| 9,304,736 | B1 | 4/2016 | Whiteley |
| 9,338,242 | B1 | 5/2016 | Suchland |
| 9,338,493 | B2 | 5/2016 | Van Os |
| 9,390,724 | B2 | 7/2016 | List |
| 9,418,658 | B1 | 8/2016 | David |
| 9,424,840 | B1 | 8/2016 | Hart et al. |
| 9,460,406 | B1 | 10/2016 | Hopper |
| 9,472,206 | B2 | 10/2016 | Ady |
| 9,479,931 | B2 | 10/2016 | Ortiz |
| 9,576,574 | B2 | 2/2017 | van Os |
| 9,607,102 | B2 | 3/2017 | Lavallee et al. |
| 9,659,577 | B1 | 5/2017 | Langhammer |
| 9,720,955 | B1 | 8/2017 | Cao et al. |
| 9,747,895 | B1 | 8/2017 | Jansche |
| 9,792,281 | B2 | 10/2017 | Sarikaya |
| 9,819,823 | B2 | 11/2017 | Hara |
| 9,858,925 | B2 | 1/2018 | Gruber |
| 9,865,260 | B1 | 1/2018 | Vuskovic |
| 9,875,233 | B1 | 1/2018 | Tomkins |
| 9,875,741 | B2 | 1/2018 | Gelfenbeyn |
| 9,881,077 | B1 | 1/2018 | Alfonseca et al. |
| 9,886,953 | B2 | 2/2018 | Lemay |
| 9,971,340 | B1 | 5/2018 | Labrosse et al. |
| 9,972,318 | B1* | 5/2018 | Kelly ............. G10L 15/26 |
| 9,990,591 | B2 | 6/2018 | Gelfenbeyn |
| 10,042,032 | B2 | 8/2018 | Scott |
| 10,089,072 | B2 | 10/2018 | Piersol et al. |
| 10,127,220 | B2 | 11/2018 | Bellegarda et al. |
| 10,134,395 | B2 | 11/2018 | Typrin |
| 10,140,668 | B2 | 11/2018 | Gopinath et al. |
| 10,199,051 | B2 | 2/2019 | Binder |
| 10,241,752 | B2 | 3/2019 | Lemay |
| 10,268,912 | B2 | 4/2019 | Adamek et al. |
| 10,276,170 | B2 | 4/2019 | Gruber |
| 10,303,771 | B1 | 5/2019 | Jezewski |
| 10,354,653 | B1 | 7/2019 | Vijayvergia et al. |
| 10,418,032 | B1 | 9/2019 | Mohajer et al. |
| 10,462,422 | B1 | 10/2019 | Harrison et al. |
| 10,511,808 | B2 | 12/2019 | Harrison et al. |
| 10,559,019 | B1 | 2/2020 | Beauvais |
| 10,719,786 | B1 | 7/2020 | Treseler et al. |

(56) References Cited

U.S. PATENT DOCUMENTS

| Patent/Pub. No. | Date | Name |
|---|---|---|
| 10,748,529 B1 | 8/2020 | Milden |
| 10,762,113 B2 | 9/2020 | Jia et al. |
| 10,782,986 B2 | 9/2020 | Martin |
| 10,785,365 B2 | 9/2020 | Rodriguez et al. |
| 10,791,163 B2 | 9/2020 | Kim et al. |
| 10,805,409 B1 | 10/2020 | Ledet |
| 10,817,713 B2 | 10/2020 | Bui et al. |
| 10,841,249 B2 | 11/2020 | Lim et al. |
| 10,880,384 B1 * | 12/2020 | Li ............................ G06F 3/167 |
| 10,963,493 B1 | 3/2021 | Hu et al. |
| 10,978,056 B1 | 4/2021 | Challa et al. |
| 10,997,963 B1 | 5/2021 | Baligar et al. |
| 11,017,764 B1 | 5/2021 | Das et al. |
| 11,037,222 B1 | 6/2021 | Natesh et al. |
| 11,151,992 B2 | 10/2021 | Cui et al. |
| 11,295,745 B1 * | 4/2022 | Roy ........................ G06F 3/167 |
| 2003/0160871 A1 | 8/2003 | Pelletier et al. |
| 2003/0225697 A1 | 12/2003 | DeTreville |
| 2004/0044516 A1 | 3/2004 | Kennewick et al. |
| 2004/0193420 A1 | 9/2004 | Kennewick et al. |
| 2005/0086382 A1 | 4/2005 | Ramaswamy et al. |
| 2005/0154730 A1 | 7/2005 | Miller et al. |
| 2005/0273493 A1 | 12/2005 | Buford et al. |
| 2006/0069678 A1 | 3/2006 | Chou et al. |
| 2006/0156252 A1 | 7/2006 | Sheshagiri et al. |
| 2006/0203620 A1 | 9/2006 | Bedingfield |
| 2006/0212757 A1 | 9/2006 | Ross et al. |
| 2007/0050191 A1 | 3/2007 | Weider et al. |
| 2007/0100625 A1 | 5/2007 | Silvera et al. |
| 2007/0230282 A1 | 10/2007 | May et al. |
| 2007/0239428 A1 | 10/2007 | Milstein et al. |
| 2008/0027917 A1 | 1/2008 | Mukherjee et al. |
| 2008/0120616 A1 * | 5/2008 | James ........................ G06F 3/16 718/100 |
| 2008/0154828 A1 | 6/2008 | Antebi et al. |
| 2008/0240379 A1 | 10/2008 | Maislos |
| 2008/0240406 A1 | 10/2008 | Akula et al. |
| 2008/0300884 A1 | 12/2008 | Smith |
| 2009/0119234 A1 | 5/2009 | Pinckney et al. |
| 2009/0119587 A1 | 5/2009 | Allen et al. |
| 2009/0125584 A1 | 5/2009 | Agrawala et al. |
| 2009/0150156 A1 | 6/2009 | Kennewick et al. |
| 2009/0273659 A1 | 11/2009 | Lee et al. |
| 2009/0282033 A1 | 11/2009 | Alshawi |
| 2009/0307159 A1 | 12/2009 | Pinckney et al. |
| 2010/0205541 A1 | 8/2010 | Rapaport et al. |
| 2010/0217604 A1 | 8/2010 | Baldwin et al. |
| 2010/0228693 A1 | 9/2010 | Dawson et al. |
| 2010/0295676 A1 | 11/2010 | Khachaturov et al. |
| 2011/0181517 A1 | 7/2011 | Orr et al. |
| 2011/0246383 A1 | 10/2011 | Gibson et al. |
| 2011/0249024 A1 | 10/2011 | Arrasvuori et al. |
| 2011/0295594 A1 | 12/2011 | Cai et al. |
| 2011/0302117 A1 | 12/2011 | Pinckney et al. |
| 2011/0307478 A1 | 12/2011 | Pinckney et al. |
| 2012/0035932 A1 | 2/2012 | Jitkoff et al. |
| 2012/0083285 A1 | 4/2012 | Shatsky et al. |
| 2012/0084086 A1 | 4/2012 | Gilbert et al. |
| 2012/0245944 A1 | 9/2012 | Gruber et al. |
| 2012/0246191 A1 | 9/2012 | Xiong |
| 2012/0253825 A1 | 10/2012 | Di Fabbrizio et al. |
| 2012/0265528 A1 | 10/2012 | Gruber |
| 2012/0309363 A1 | 12/2012 | Gruber et al. |
| 2012/0311126 A1 | 12/2012 | Jadallah et al. |
| 2012/0316986 A1 | 12/2012 | Levy et al. |
| 2013/0035930 A1 | 2/2013 | Ferrucci et al. |
| 2013/0124449 A1 | 5/2013 | Pinckney et al. |
| 2013/0198652 A1 | 8/2013 | Dunn et al. |
| 2013/0215116 A1 | 8/2013 | Siddique et al. |
| 2013/0218766 A1 | 8/2013 | Mueller |
| 2013/0268839 A1 | 10/2013 | Lefebvre |
| 2013/0275138 A1 | 10/2013 | Gruber |
| 2013/0275164 A1 | 10/2013 | Gruber |
| 2013/0276022 A1 | 10/2013 | Tidwell |
| 2013/0278631 A1 | 10/2013 | Border et al. |
| 2014/0058679 A1 | 2/2014 | Varoglu et al. |
| 2014/0067455 A1 | 3/2014 | Zhang et al. |
| 2014/0074483 A1 | 3/2014 | Van Os |
| 2014/0090049 A1 | 3/2014 | Friedlander et al. |
| 2014/0104372 A1 | 4/2014 | Calman et al. |
| 2014/0136612 A1 | 5/2014 | Redfern et al. |
| 2014/0164506 A1 | 6/2014 | Tesch |
| 2014/0236678 A1 | 8/2014 | Akerman et al. |
| 2014/0244270 A1 | 8/2014 | Han et al. |
| 2014/0244686 A1 | 8/2014 | Tran et al. |
| 2014/0244712 A1 | 8/2014 | Walters et al. |
| 2014/0253319 A1 | 9/2014 | Chang |
| 2014/0267396 A1 | 9/2014 | Doolittle |
| 2014/0270480 A1 | 9/2014 | Boardman et al. |
| 2014/0280017 A1 | 9/2014 | Indarapu et al. |
| 2014/0297284 A1 | 10/2014 | Gruber et al. |
| 2014/0309990 A1 | 10/2014 | Gandrabur et al. |
| 2014/0372126 A1 | 12/2014 | Ady |
| 2015/0081674 A1 | 3/2015 | Ali et al. |
| 2015/0116519 A1 | 4/2015 | Jarske et al. |
| 2015/0142420 A1 | 5/2015 | Sarikaya et al. |
| 2015/0142704 A1 | 5/2015 | London |
| 2015/0149182 A1 | 5/2015 | Kalns et al. |
| 2015/0169284 A1 | 6/2015 | Quast et al. |
| 2015/0169744 A1 | 6/2015 | Walkingshaw et al. |
| 2015/0179168 A1 | 6/2015 | Hakkani-Tur |
| 2015/0186156 A1 | 7/2015 | Brown et al. |
| 2015/0207765 A1 | 7/2015 | Brantingham et al. |
| 2015/0227972 A1 | 8/2015 | Tang |
| 2015/0340033 A1 | 11/2015 | Di Fabbrizio et al. |
| 2015/0347375 A1 | 12/2015 | Tremblay et al. |
| 2015/0348551 A1 * | 12/2015 | Gruber .................... G10L 15/26 704/235 |
| 2016/0019290 A1 | 1/2016 | Ratnaparkhi et al. |
| 2016/0037311 A1 | 2/2016 | Cho |
| 2016/0042735 A1 * | 2/2016 | Vibbert ............... G10L 15/1822 704/257 |
| 2016/0050391 A1 | 2/2016 | Schultz et al. |
| 2016/0063118 A1 | 3/2016 | Campbell et al. |
| 2016/0070696 A1 * | 3/2016 | Lavallee ........... G06F 16/90332 704/9 |
| 2016/0098992 A1 | 4/2016 | Renard et al. |
| 2016/0117360 A1 | 4/2016 | Kunc et al. |
| 2016/0127641 A1 | 5/2016 | Gove |
| 2016/0155442 A1 * | 6/2016 | Kannan ................... G10L 15/22 704/275 |
| 2016/0182727 A1 | 6/2016 | Baran et al. |
| 2016/0187654 A1 | 6/2016 | Border et al. |
| 2016/0196491 A1 | 7/2016 | Chandrasekaran et al. |
| 2016/0203002 A1 | 7/2016 | Kannan |
| 2016/0225370 A1 | 8/2016 | Kannan |
| 2016/0247110 A1 * | 8/2016 | Sinha .................... G06Q 10/06 |
| 2016/0255082 A1 | 9/2016 | Rathod |
| 2016/0255170 A1 | 9/2016 | Gargi et al. |
| 2016/0259775 A1 | 9/2016 | Gelfenbeyn et al. |
| 2016/0306505 A1 | 10/2016 | Vigneras et al. |
| 2016/0308799 A1 | 10/2016 | Schubert et al. |
| 2016/0320951 A1 | 11/2016 | Ernst et al. |
| 2016/0328096 A1 | 11/2016 | Tran |
| 2016/0342902 A1 | 11/2016 | Pinckney et al. |
| 2016/0344818 A1 | 11/2016 | Bhayani |
| 2016/0345132 A1 | 11/2016 | Creighton et al. |
| 2016/0350101 A1 | 12/2016 | Gelfenbeyn et al. |
| 2016/0360039 A1 | 12/2016 | Sanghavi et al. |
| 2016/0378849 A1 | 12/2016 | Myslinski |
| 2016/0378861 A1 | 12/2016 | Eledath |
| 2017/0017519 A1 | 1/2017 | Khan et al. |
| 2017/0018018 A1 | 1/2017 | Akpala et al. |
| 2017/0026318 A1 | 1/2017 | Daniel et al. |
| 2017/0038829 A1 | 2/2017 | Lanier et al. |
| 2017/0039476 A1 | 2/2017 | Eyring et al. |
| 2017/0068423 A1 | 3/2017 | Napolitano et al. |
| 2017/0068550 A1 | 3/2017 | Zeitlin |
| 2017/0078510 A1 | 3/2017 | Hara |
| 2017/0084067 A1 | 3/2017 | Son et al. |
| 2017/0091168 A1 | 3/2017 | Bellegarda |
| 2017/0091612 A1 | 3/2017 | Gruber et al. |
| 2017/0092264 A1 | 3/2017 | Hakkani-Tur et al. |
| 2017/0116426 A1 | 4/2017 | Pattabhiraman et al. |

(56) References Cited

U.S. PATENT DOCUMENTS

| | | |
|---|---|---|
| 2017/0132019 A1 | 5/2017 | Karashchuk |
| 2017/0148307 A1* | 5/2017 | Yeom .................. G08B 29/185 |
| 2017/0169506 A1 | 6/2017 | Wishne et al. |
| 2017/0185857 A1 | 6/2017 | Adamek et al. |
| 2017/0193390 A1 | 7/2017 | Weston et al. |
| 2017/0243465 A1 | 8/2017 | Bourne, Jr. et al. |
| 2017/0244801 A1 | 8/2017 | Brisebois |
| 2017/0249710 A1 | 8/2017 | Guillama et al. |
| 2017/0270929 A1 | 9/2017 | Aleksic et al. |
| 2017/0300831 A1 | 10/2017 | Gelfenbeyn et al. |
| 2017/0353469 A1 | 12/2017 | Selekman |
| 2017/0357637 A1* | 12/2017 | Nell ........................ G10L 15/22 |
| 2017/0358141 A1 | 12/2017 | Stafford et al. |
| 2017/0358302 A1 | 12/2017 | Orr et al. |
| 2017/0358304 A1 | 12/2017 | Castillo Sanchez et al. |
| 2017/0358305 A1 | 12/2017 | Kudurshian et al. |
| 2017/0359707 A1 | 12/2017 | Diaconu |
| 2018/0006990 A1 | 1/2018 | Munemann |
| 2018/0012601 A1 | 1/2018 | Kumar et al. |
| 2018/0013699 A1 | 1/2018 | Sapoznik et al. |
| 2018/0018562 A1 | 1/2018 | Jung |
| 2018/0018971 A1 | 1/2018 | Park et al. |
| 2018/0018987 A1 | 1/2018 | Zass |
| 2018/0040020 A1 | 2/2018 | Kurian et al. |
| 2018/0054523 A1 | 2/2018 | Zhang et al. |
| 2018/0060358 A1 | 3/2018 | Jiang et al. |
| 2018/0095636 A1 | 4/2018 | Valdivia et al. |
| 2018/0096071 A1 | 4/2018 | Green |
| 2018/0096072 A1 | 4/2018 | He |
| 2018/0096302 A1 | 4/2018 | Tseretopoulos et al. |
| 2018/0107917 A1 | 4/2018 | Hewavitharana |
| 2018/0121508 A1 | 5/2018 | Halstvedt |
| 2018/0124438 A1 | 5/2018 | Barnett |
| 2018/0181997 A1 | 6/2018 | Sanjeevaiah Krishnaiah et al. |
| 2018/0188695 A1 | 7/2018 | Kumar et al. |
| 2018/0189352 A1 | 7/2018 | Ghafourifar |
| 2018/0189629 A1 | 7/2018 | Yatziv |
| 2018/0191732 A1 | 7/2018 | Erciyes et al. |
| 2018/0210874 A1 | 7/2018 | Fuxman et al. |
| 2018/0213284 A1 | 7/2018 | Shekhar et al. |
| 2018/0218739 A1 | 8/2018 | Park et al. |
| 2018/0233128 A1 | 8/2018 | Chen et al. |
| 2018/0233132 A1 | 8/2018 | Herold et al. |
| 2018/0233139 A1 | 8/2018 | Finkelstein et al. |
| 2018/0247221 A1 | 8/2018 | Park et al. |
| 2018/0260189 A1 | 9/2018 | Li |
| 2018/0286507 A1 | 10/2018 | Gass et al. |
| 2018/0293484 A1 | 10/2018 | Wang et al. |
| 2018/0307303 A1 | 10/2018 | Powderly et al. |
| 2018/0314689 A1 | 11/2018 | Wang et al. |
| 2018/0329998 A1 | 11/2018 | Thomson et al. |
| 2018/0330723 A1 | 11/2018 | Acero et al. |
| 2018/0330725 A1 | 11/2018 | Varadharajan et al. |
| 2018/0336188 A1 | 11/2018 | Tran et al. |
| 2018/0336414 A1 | 11/2018 | Badr et al. |
| 2019/0007546 A1 | 1/2019 | Anderson |
| 2019/0012198 A1 | 1/2019 | Ni et al. |
| 2019/0012714 A1 | 1/2019 | Bright |
| 2019/0036923 A1 | 1/2019 | Xuan et al. |
| 2019/0050862 A1 | 2/2019 | Oka et al. |
| 2019/0074006 A1 | 3/2019 | Kumar et al. |
| 2019/0080168 A1 | 3/2019 | Nowak-Przygodzki et al. |
| 2019/0080698 A1 | 3/2019 | Miller |
| 2019/0087455 A1 | 3/2019 | He et al. |
| 2019/0087491 A1 | 3/2019 | Bax |
| 2019/0095846 A1 | 3/2019 | Gupta et al. |
| 2019/0103103 A1* | 4/2019 | Ni ........................... G10L 15/22 |
| 2019/0108639 A1 | 4/2019 | Tchapmi et al. |
| 2019/0139150 A1 | 5/2019 | Brownhill et al. |
| 2019/0147173 A1 | 5/2019 | Mai |
| 2019/0147348 A1 | 5/2019 | Ng et al. |
| 2019/0156204 A1 | 5/2019 | Bresch et al. |
| 2019/0164547 A1 | 5/2019 | Yoo et al. |
| 2019/0180743 A1 | 6/2019 | Yoshida et al. |
| 2019/0188328 A1 | 6/2019 | Oyenan et al. |
| 2019/0206400 A1 | 7/2019 | Cui et al. |
| 2019/0208124 A1 | 7/2019 | Newman et al. |
| 2019/0213490 A1 | 7/2019 | White et al. |
| 2019/0213999 A1 | 7/2019 | Grupen et al. |
| 2019/0219415 A1 | 7/2019 | Wang |
| 2019/0220668 A1 | 7/2019 | Siskind et al. |
| 2019/0228494 A1 | 7/2019 | Stasi et al. |
| 2019/0228780 A1 | 7/2019 | Athias |
| 2019/0235916 A1 | 8/2019 | Min et al. |
| 2019/0236628 A1 | 8/2019 | Sudhindra et al. |
| 2019/0237068 A1 | 8/2019 | Canim et al. |
| 2019/0248012 A1 | 8/2019 | Nelson |
| 2019/0311036 A1 | 10/2019 | Shanmugam et al. |
| 2019/0311714 A1 | 10/2019 | Barbello et al. |
| 2019/0318729 A1 | 10/2019 | Chao et al. |
| 2019/0324527 A1 | 10/2019 | Presant et al. |
| 2019/0324553 A1 | 10/2019 | Liu et al. |
| 2019/0324779 A1 | 10/2019 | Martin |
| 2019/0324780 A1 | 10/2019 | Zhu et al. |
| 2019/0325042 A1 | 10/2019 | Yu et al. |
| 2019/0325080 A1 | 10/2019 | Natarajan et al. |
| 2019/0325081 A1 | 10/2019 | Liu et al. |
| 2019/0325084 A1 | 10/2019 | Peng et al. |
| 2019/0325873 A1 | 10/2019 | Mathias et al. |
| 2019/0327330 A1 | 10/2019 | Natarajan et al. |
| 2019/0327331 A1 | 10/2019 | Natarajan et al. |
| 2019/0334571 A1 | 10/2019 | Khawand et al. |
| 2019/0340200 A1 | 11/2019 | Coimbra et al. |
| 2019/0340510 A1 | 11/2019 | Li et al. |
| 2019/0348033 A1 | 11/2019 | Chen et al. |
| 2019/0361408 A1 | 11/2019 | Tokuchi |
| 2019/0391834 A1 | 12/2019 | Mullen et al. |
| 2020/0012886 A1 | 1/2020 | Walters et al. |
| 2020/0012930 A1 | 1/2020 | Kumar |
| 2020/0042240 A1 | 2/2020 | Therene et al. |
| 2020/0051338 A1 | 2/2020 | Zia et al. |
| 2020/0097814 A1 | 3/2020 | Devesa |
| 2020/0117336 A1 | 4/2020 | Mani et al. |
| 2020/0117758 A1 | 4/2020 | Lu et al. |
| 2020/0160042 A1 | 5/2020 | Bui et al. |
| 2020/0184956 A1 | 6/2020 | Agarwal et al. |
| 2020/0202845 A1 | 6/2020 | Jacobson et al. |
| 2020/0202846 A1 | 6/2020 | Bapna et al. |
| 2020/0218780 A1 | 7/2020 | Mei et al. |
| 2020/0228469 A1 | 7/2020 | Mullins et al. |
| 2020/0334567 A1 | 10/2020 | Bhattacharjee et al. |
| 2020/0342039 A1 | 10/2020 | Bakir et al. |
| 2020/0342853 A1 | 10/2020 | Ji et al. |
| 2020/0349919 A1 | 11/2020 | Wanas et al. |
| 2020/0372111 A1 | 11/2020 | Ho et al. |
| 2020/0379726 A1 | 12/2020 | Blatz et al. |
| 2020/0388282 A1 | 12/2020 | Secker-Walker et al. |
| 2020/0410012 A1 | 12/2020 | Moon et al. |
| 2021/0011684 A1 | 1/2021 | Trim et al. |
| 2021/0035239 A1 | 2/2021 | Srivastava et al. |
| 2021/0043209 A1 | 2/2021 | Kim et al. |
| 2021/0048987 A1 | 2/2021 | Kedida et al. |
| 2021/0056968 A1 | 2/2021 | Shreeshreemal et al. |
| 2021/0064828 A1 | 3/2021 | Johnson Premkumar et al. |
| 2021/0064829 A1 | 3/2021 | Lavallee et al. |
| 2021/0118442 A1 | 4/2021 | Poddar et al. |
| 2021/0120206 A1 | 4/2021 | Liu et al. |
| 2021/0264913 A1 | 8/2021 | Schramm et al. |
| 2021/0295166 A1 | 9/2021 | Rouhani et al. |
| 2022/0279051 A1 | 9/2022 | Khemka et al. |

FOREIGN PATENT DOCUMENTS

| | | |
|---|---|---|
| CA | 2818207 C | 7/2018 |
| EP | 2530870 | 12/2012 |
| EP | 3122001 | 1/2017 |
| EP | 3444814 A1 | 2/2019 |
| EP | 3929771 A1 | 12/2021 |
| WO | WO 2012/116241 | 8/2012 |
| WO | WO 2015/179510 A1 | 11/2015 |
| WO | 2015183401 A1 | 12/2015 |
| WO | WO 2016/195739 | 12/2016 |
| WO | 2017044163 A1 | 3/2017 |

(56) References Cited

FOREIGN PATENT DOCUMENTS

| WO | WO 2017/053208 | | 3/2017 |
|---|---|---|---|
| WO | WO 2017/116488 | | 7/2017 |
| WO | 2019078576 | A1 | 4/2019 |

OTHER PUBLICATIONS

U.S. Appl. No. 15/808,638, filed Nov. 9, 2017, Ryan Brownhill.
U.S. Appl. No. 15/953,957, filed Apr. 16, 2018, Kemal El Moujahid.
U.S. Appl. No. 15/966,455, filed Apr. 30, 2018, Scott Martin.
U.S. Appl. No. 15/967,193, filed Apr. 30, 2018, Davide Testuggine.
U.S. Appl. No. 15/967,239, filed Apr. 30, 2018, Vivek Natarajan.
U.S. Appl. No. 15/967,279, filed Apr. 30, 2018, Fuchun Peng.
U.S. Appl. No. 15/967,290, filed Apr. 30, 2018, Fuchun Peng.
U.S. Appl. No. 15/967,342, filed Apr. 30, 2018, Vivek Natarajan.
U.S. Appl. No. 16/011,062, filed Jun. 18, 2018, Jinsong Yu.
U.S. Appl. No. 16/025,317, filed Jul. 2, 2018, Sonal Gupta.
U.S. Appl. No. 16/036,827, filed Jul. 16, 2018, Emmanouil Koukoumidis.
U.S. Appl. No. 16/038,120, filed Jul. 17, 2018, Jason Schissel.
U.S. Appl. No. 16/048,049, filed Jul. 27, 2018, Markku Salkola.
U.S. Appl. No. 16/048,072, filed Jul. 27, 2018, Markku Salkola.
U.S. Appl. No. 16/048,101, filed Jul. 27, 2018, Markku Salkola.
U.S. Appl. No. 16/053,600, filed Aug. 2, 2018, Vivek Natarajan.
U.S. Appl. No. 16/057,414, filed Aug. 7, 2018, Jeremy Gillmor Kahn.
U.S. Appl. No. 16/103,775, filed Aug. 14, 2018, Zheng Zhou.
U.S. Appl. No. 16/107,601, filed Aug. 21, 2018, Rajesh Krishna Shenoy.
U.S. Appl. No. 16/107,847, filed Aug. 21, 2018, Rajesh Krishna Shenoy.
U.S. Appl. No. 16/118,169, filed Aug. 30, 2018, Baiyang Liu.
U.S. Appl. No. 16/121,393, filed Sep. 4, 2018, Zheng Zhou.
U.S. Appl. No. 16/127,173, filed Sep. 10, 2018, Zheng Zhou.
U.S. Appl. No. 16/129,638, filed Sep. 12, 2018, Vivek Natarajan.
U.S. Appl. No. 16/135,752, filed Sep. 19, 2018, Xiaohu Liu.
U.S. Appl. No. 16/150,069, filed Oct. 2, 2018, Jiedan Zhu.
U.S. Appl. No. 16/150,184, filed Oct. 2, 2018, Francislav P. Penov.
U.S. Appl. No. 16/151,040, filed Oct. 3, 2018, Brian Nelson.
U.S. Appl. No. 16/168,536, filed Oct. 23, 2018, Benoit F. Dumoulin.
U.S. Appl. No. 16/176,081, filed Oct. 31, 2018, Anusha Balakrishnan.
U.S. Appl. No. 16/176,312, filed Oct. 31, 2018, Emmanouil Koukoumidis.
U.S. Appl. No. 16/182,542, filed Nov. 6, 2018, Michael Robert Hanson.
U.S. Appl. No. 16/183,650, filed Nov. 7, 2018, Xiaohu Liu.
U.S. Appl. No. 16/192,538, filed Nov. 15, 2018, Emmanouil Koukoumidis.
U.S. Appl. No. 16/222,923, filed Dec. 17, 2018, Jason Schissel.
U.S. Appl. No. 16/222,957, filed Dec. 17, 2018, Emmanouil Koukoumidis.
U.S. Appl. No. 16/229,828, filed Dec. 21, 2018, Xiaohu Liu.
U.S. Appl. No. 16/247,439, filed Jan. 14, 2019, Xiaohu Liu.
U.S. Appl. No. 16/264,173, filed Jan. 31, 2019, Ashwini Challa.
U.S. Appl. No. 16/376,832, filed Apr. 5, 2019, Honglei Liu.
U.S. Appl. No. 16/389,769, filed Apr. 19, 2019, Honglei Liu.
U.S. Appl. No. 16/389,634, filed Apr. 19, 2019, Paul Anthony Crook.
U.S. Appl. No. 16/389,738, filed Apr. 19, 2019, Fuchun Peng.
U.S. Appl. No. 16/389,728, filed Apr. 19, 2019, William Crosby Presant.
U.S. Appl. No. 16/388,130, filed Apr. 18, 2019, Xiaohu Liu.
U.S. Appl. No. 16/389,708, filed Apr. 19, 2019, William Crosby Presant.
U.S. Appl. No. 16/434,010, filed Jun. 6, 2019, Sergiu Dogaru.
U.S. Appl. No. 16/552,559, filed Aug. 27, 2019, Seungwhan Moon.
U.S. Appl. No. 16/557,055, filed Aug. 30, 2019, Seungwhan Moon.
U.S. Appl. No. 16/659,070, filed Oct. 21, 2019, Lisa Xiaoyi Huang.
U.S. Appl. No. 16/659,203, filed Oct. 21, 2019, Lisa Xiaoyi Huang.
U.S. Appl. No. 16/659,363, filed Oct. 21, 2019, Lisa Xiaoyi Huang.
U.S. Appl. No. 16/659,419, filed Oct. 21, 2019, Lisa Xiaoyi Huang.
U.S. Appl. No. 16/703,700, filed Dec. 4, 2019, Ahmed Aly.
U.S. Appl. No. 16/733,044, filed Jan. 2, 2020, Francislav P. Penov.
U.S. Appl. No. 16/741,630, filed Jan. 13, 2020, Paul Anthony Crook.
U.S. Appl. No. 16/741,642, filed Jan. 13, 2020, Fuchun Peng.
U.S. Appl. No. 16/742,769, filed Jan. 14, 2020, Xiaohu Liu.
U.S. Appl. No. 62/660,876, filed Apr. 20, 2018, Anuj Kumar.
U.S. Appl. No. 62/675,090, filed May 22, 2018, Michael Robert Hanson.
U.S. Appl. No. 62/747,628, filed Oct. 18, 2018, Honglei Liu.
U.S. Appl. No. 62/749,608, filed Oct. 23, 2018, Ashwini Challa.
U.S. Appl. No. 62/750,746, filed Oct. 25, 2018, Honglei Liu.
U.S. Appl. No. 62/923,342, filed Oct. 18, 2019, Michael Robert Hanson.
Mari Ostendorf, et al.: Human Language Technology: Opportunities and Challenges, IEEE International Conference on Acoustics, Speech, and Signal Processing, 2005, Mar. 23, 2005.
Adam Poliak, et al.: Efficient, Compositional, Order-Sensitive n-gram Embeddings, Proceedings of the 15th Conference of the European Chapter of the Association for Computational Linguistics: vol. 2, Short Papers, pp. 503-508, Valencia, Spain, 2017, Apr. 3-7, 2017.
Chris Dyer, et al.: Recurrent Neural Network Grammars, Proceedings of NAACL-HLT 2016, pp. 199-209, San Diego, California, 2016, Jun. 12-17, 2016.
Overview of Language Technology, https://www.dfki.de/lt/lt-general.php, Feb. 15, 2018.
Jim Glass: A Brief Introduction to Automatic Speech Recognition, http://www.cs.columbia.edu/~mcollins/6864/slides/asr.pdf, Feb. 15, 2018.
Speech Synthesis, https://en.wikipedia.org/wiki/Speech_synthesis, Feb. 15, 2018.
Natural-language Understanding, https://en.wikipedia.org/wiki/Natural-language_understanding, Feb. 15, 2018.
Conversational AI and the Road Ahead, https://techcrunch.com/2017/02/25/conversational-ai-and-the-road-ahead/, Feb. 15, 2018.
What is Conversational AI? https://blog.salemove.com/what-is-conversational-ai/, Feb. 15, 2018.
Question Answering, https://en.wikipedia.org/wiki/Question_answering, Feb. 15, 2018.
Dialog Manager, https://en.wikipedia.org/wiki/Dialog_manager, Feb. 15, 2018.
Dialog Management, https://tutorials.botsfloor.com/dialog-management-799c20a39aad, Feb. 15, 2018.
Steeve Huang, Word2Vec and FastText Word Embedding with Gensim, https://towardsdatascience.com/word-embedding-with-word2vec-and-fasttext-a209c1d3e12c, Mar. 13, 2018.
Ashwini Challa, et al.: Generate, Filter, and Rank: Grammaticality Classification for Production-Ready NLG Systems, arXiv:1904.03279, Apr. 9, 2019.
Honglei Liu, et al.: Explore-Exploit: A Framework for Interactive and Online Learning, arXiv:1812.00116, Dec. 1, 2018.
Turniški, Filip, et al. "Analysis of 3G and 4G download throughput in pedestrian zones." 2016 International Symposium ELMAR. IEEE, 2016, Sep. 12, 2016.
Dubin, Ran, et al. "Adaptation Logic for HTTP Dynamic Adaptive Streaming using Geo-Predictive Crowdsourcing." arXiv preprint arXiv:1602.02030 (2016), Feb. 5, 2016.
Chat Extensions, https://developers.facebook.com/docs/messenger-platform/guides/chat-extensions, Apr. 18, 2017.
Google Allo Makes Conversations Eeasier, Productive, and more Expressive, https://www.trickyways.com/2016/05/google-allo-makes-conversations-eeasier-productive-expressive/, May 19, 2016.
Agrawal, Aishwarya, et al. "VQA: Visual Question Answering." *International Journal of Computer Vision* 1.123 (2016): 4-31, Oct. 27, 2016.
Bast, Hannah, et al. "Easy access to the freebase dataset." Proceedings of the 23rd International Conference on World Wide Web. ACM, 2014, Apr. 7-11, 2014.
Bauer, Lisa, Yicheng Wang, and Mohit Bansal. "Commonsense for generative multi-hop question answering tasks." arXiv preprint arXiv:1809.06309 (2018), Jun. 1, 2019.

(56) References Cited

OTHER PUBLICATIONS

Bordes, Antoine, et al. "Large-scale simple question answering with memory networks." arXiv preprint arXiv:1506.02075 (2015), Jun. 5, 2015.

Bordes, Antoine, et al. "Translating embeddings for modeling multi-relational data." Advances in neural information processing systems. 2013, Dec. 5, 2013.

Bordes, Antoine, Y-Lan Boureau, and Jason Weston. "Learning end-to-end goal-oriented dialog." arXiv preprint arXiv:1605.07683 (2016), Mar. 30, 2017.

Choi, Eunsol, et al. "Quac: Question answering in context." arXiv preprint arXiv:1808.07036 (2018), Aug. 28, 2018.

Clark, Peter, et al. "Think you have solved question answering? try arc, the ai2 reasoning challenge." arXiv preprint arXiv:1803.05457 (2018), Mar. 14, 2018.

Conneau, Alexis, et al. "Supervised Learning of Universal Sentence Representations from Natural Language Inference Data," (2018), Jul. 8, 2018.

Dalton, Jeffrey, Victor Ajayi, and Richard Main. "Vote Goat: Conversational Movie Recommendation." The 41st International ACM SIGIR Conference on Research & Development in Information Retrieval. ACM, 2018, May 15, 2018.

de Vries, Harm, et al. "Talk the walk: Navigating new york city through grounded dialogue." arXiv preprint arXiv:1807.03367 (2018), Dec. 23, 2018.

Dubey, Mohnish, et al. "Earl: Joint entity and relation linking for question answering over knowledge graphs." International Semantic Web Conference. Springer, Cham, 2018, Jun. 25, 2018.

Duchi, John, Elad Hazan, and Yoram Singer. "Adaptive subgradient methods for online learning and stochastic optimization." Journal of Machine Learning Research (Jul. 12, 2011): 2121-2159, Jul. 11, 2011.

Hudson, Drew A., and Christopher D. Manning. "Gqa: A new dataset for real-world visual reasoning and compositional question answering." Proceedings of the IEEE Conference on Computer Vision and Pattern Recognition. 2019, May 10, 2019.

Jiang, Lu, et al. "Memexqa: Visual memex question answering." arXiv preprint arXiv:1708.01336 (2017), Aug. 4, 2017.

Jung, Hyunwoo, et al. "Learning What to Remember: Long-term Episodic Memory Networks for Learning from Streaming Data." arXiv preprint arXiv:1812.04227 (2018), Dec. 11, 2018.

Kottur, Satwik, et al. "Visual coreference resolution in visual dialog using neural module networks." Proceedings of the European Conference on Computer Vision (ECCV). 2018, Sep. 8-14, 2018.

Kumar, Ankit, et al. "Ask me anything: Dynamic memory networks for natural language processing." International conference on machine learning. 2016, Jan. 6, 2016.

Li, Jiwei, et al. "A persona-based neural conversation model." arXiv preprint arXiv:1603.06155 (2016), Jun. 8, 2016.

Pennington, Jeffrey, Richard Socher, and Christopher Manning. "Glove: Global vectors for word representation." Proceedings of the 2014 conference on empirical methods in natural language processing (EMNLP). 2014, Oct. 25-29, 2014.

Rajpurkar, Pranav, et al. "Squad: 100,000+ questions for machine comprehension of text." arXiv preprint arXiv:1606.05250 (2016), Oct. 11, 2016.

Rajpurkar, Pranav, Robin Jia, and Percy Liang. "Know What You Don't Know: Unanswerable Questions for SQuAD." arXiv preprint arXiv:1806.03822 (2018), Jun. 11, 2018.

Reddy, Siva, Danqi Chen, and Christopher D. Manning, "Coqa: A conversational question answering challenge." Transactions of the Association for Computational Linguistics 7 (2019): 249-266, May 29, 2019.

Seo, Minjoon, et al. "Bidirectional attention flow for machine comprehension." arXiv preprint arXiv:1611.01603 (2016), Jun. 21, 2018.

Sukhbaatar, Sainbayar, Jason Weston, and Rob Fergus. "End-to-end memory networks." Advances in neural information processing systems. 2015, Nov. 24, 2015.

Tran, Ke, Arianna Bisazza, and Christof Monz. "Recurrent memory networks for language modeling." arXiv preprint arXiv:1601.01272 (2016), Apr. 22, 2016.

Wang, Peng, et al. "Fvqa: Fact-based visual question answering." IEEE transactions on pattern analysis and machine intelligence 40.10 (2018): 2413-2427, Aug. 8, 2017.

Welbl, Johannes, Pontus Stenetorp, and Sebastian Riedel. "Constructing datasets for multi-hop reading comprehension across documents." Transactions of the Association for Computational Linguistics 6 (2018): 287-302, Jun. 11, 2018.

Salem, Yasser, Jun Hong, and Weiru Liu. "History-guided conversational recommendation." Proceedings of the 23rd International Conference on World Wide Web. ACM, 2014. Apr. 7-11, 2014.

Sun. Yueming, and Yi Zhang. "Conversational recommender system." The 41st International ACM SIGIR Conference on Research & Development in Information Retrieval. ACM, 2018, Jul. 8-12, 2018.

Wei, Wei, et al. "Airdialogue: An environment for goal-oriented dialogue research." Proceedings of the 2018 Conference on Empirical Methods in Natural Language Processing. 2018, Nov. 4, 2018.

Weston, Jason, Sumit Chopra, and Antoine Bordes. "Memory networks." arXiv preprint arXiv:1410.3916 (2014), Nov. 29, 2015.

Williams, Jason D., Kavosh Asadi, and Geoffrey Zweig. "Hybrid code networks: practical and efficient end-to-end dialog control with supervised and reinforcement learning." arXiv preprint arXiv:1702.03274 (2017), Apr. 24, 2017.

Wu, Qi, et al. "Image Captioning and Visual Question Answering Based on Attributes and External Knowledge." arXiv preprint arXiv:1603.02814 (2016), Dec. 16, 2016.

Xu, Kun, et al. "Question answering on freebase via relation extraction and textual evidence." arXiv preprint arXiv:1603.00957 (2016), Jun. 9, 2016.

Yang, Zhili, et al. "Hotpotqa: A dataset for diverse, explainable multi-hop question answering." arXiv preprint arXiv:1809.09600 (2018), Sep. 25, 2018.

Yin, Wenpeng, et al. "Simple question answering by attentive convolutional neural network." arXiv preprint arXiv:1606.03391 (2016), Oct. 11, 2016.

Zhang, Saizheng, et al. "Personalizing Dialogue Agents: I have a dog, do you have pets too?." arXiv preprint arXiv:1801.07243 (2018), Sep. 25, 2018.

Carlson, Andrew, et al. "Toward an architecture: for never-ending language learning." Twenty-Fourth AAAI Conference on Artificial Intelligence. 2010, Jul. 5, 2010.

Chen, Chun-Yen, et al. "Gunrock: Building a Human-Like Social Bot by Leveraging Large Scale Real User Data." (2018), 2018.

Chen, Yun-Hung, William Yang Wang, and Alexander Rudnicky. "Jointly modeling inter-slot relations by random walk on knowledge graphs for unsupervised spoken language understanding." *Proceedings of the 2015 Conference of the North American Chapter of the Association for Computational Linguistics: Human Language Technologies*. 2015, May 31-Jun. 5, 2015.

Dettmers, Tim, et al. "Convolutional 2d knowledge graph embeddings." *Thirty-Second AAAI Conference on Artificial Intelligence*, 2018, Apr. 25, 2018.

Duchi, John, Elad Hazan, and Yoram Singer. "Adap we subgradient methods for online learning and stochastic optimization." *Journal of Machine Learning Research* (Jul. 12, 2011): 2121-2159, Jul. 12, 2011.

Ganin, Yaroslav, et al. "Domain-adversarial training of neural networks." *The Journal of Machine Learning Research* 17.1 (2016): 2096-2030, Jan. 1, 2016.

Ghazvininejad, Marjan, et al. "A knowledge-grounded neural conversation model." *Thirty-Second AAAI Conference on Artificial Intelligence*. 2018, Apr. 27, 2018.

He, He, et al. "Learning symmetric: collaborative dialogue agents with dynamic knowledge graph embeddings." *arXiv preprint arXiv: 1704.07130* (2017), Apr. 24, 2017.

Henderson, Matthew, Blaise Thomson, and Jason D. Williams. "The second dialog state tracking challenge," *Proceedings of the 15th Annual Meeting of the Special Interest Group on Discourse and Dialogue (SIGDIAL)*. 2014, Jun. 18-20, 2014.

(56) References Cited

OTHER PUBLICATIONS

Kartsaklis, Dimitri, Mohammad Taher Pilehvar, and Nigel Collier. "Mapping text to knowledge graph entities using multi-sense lstms." arXiv preprint arXiv:1808.07724 (2018), Aug. 23, 2018.
Lao, Ni, Tom Mitchell, and William W. Cohen. "Random walk inference and learning in a large scale knowledge base." Proceedings of the Conference on Empirical Methods in Natural Language Processing. Association for Computational Linguistics, 2011, Jul. 27, 2011.
Long, Yinong, et al. "A knowledge enhanced generative conversational service agent." DSTC6 Workshop. 2017, Dec. 2017.
Miller, Alexander H., et al. "Parlai: A dialog research software platform." arXiv preprint arXiv:1705.06476 (2017), May 18, 2017.
Moon, Seungwhan, and Jaime G. Carbonell. "Completely Heterogeneous Transfer Learning with Attention—What and What Not to Transfer." IJCAI. 2017, Aug. 19, 2017.
Moon, Seungwhan, Suyoun Kim, and Haohan Wang. "Multimodal transfer deep learning with applications in audio-visual recognition." arXiv preprint arXiv:1412.3121 (2014), Dec. 9, 2014.
Moon, Seungwhan, Leonardo Neves, and Vitor Carvalho. "Multimodal named entity recognition for short social media posts." arXiv preprint arXiv:1802.07862 (2018), Feb. 22, 2018.
Moon, Seungwhan, Leonardo Neves, and Vitor Carvalho. "Zeroshot Multimodal Named Entity Disambiguation for Noisy Social Media Posts." Proceedings of the 56th Annual Meeting of the Association for Computational Linguistics (vol. 1: Long Papers). 2018, Jul. 15-20, 2018.
Nickel, Maximilian, Lorenzo Rosasco, and Tomaso Poggio. "'Holographic embeddings of knowledge graphs." Thirtieth Aaai conference on artificial intelligence. 2016, Mar. 2, 2016.
Parthasarathi, Prasanna, and Joelle Pineau. "Extending neural generative conversational model using external knowledge sources." arXiv preprint arXiv:1809.05524 (2018), Sep. 14, 2018.
Salem, Yasser, Jun Hong, and Weiru Liu. "History-guided conversational recommendation." Proceedings of the 23rd International Conference on World Wide Web. ACM, 2014, Apr. 7, 2014.
Shah, Pararth, et al. "Bootstrapping a neural conversational agent with dialogue self-play, crowdsourcing and on-line reinforcement learning." Proceedings of the 2018 Conference of the North American Chapter of the Association for Computational Linguistics: Human Language Technologies, vol. 3 (Industry Papers). 2018, Jun. 1-6, 2018.
Sutskever, Ilya, Oriol Vinyals, and Quoc V. Le. "Sequence to sequence learning with neural networks." Advances in neural information processing systems. 2014, Sep. 10, 2014.
Wang, Zhen, et al. "Knowledge graph embedding by translating on hyperplanes." Twenty-Eighth AAAI conference on artificial intelligence. 2014, Jun. 21, 2014.
Yang, Zichao, et al. "Hierarchical attention networks for document classification." Proceedings of the 2016 conference of the North American chapter of the association for computational linguistics: human language technologies. 2016, Jun. 12-17, 2016.
Young, Tom, et al. "Augmenting end-to-end dialogue systems with commonsense knowledge." Thirty-Second AAAI Conference on Artificial Intelligence. 2018, Apr. 26, 2018.
Bui, Duc, et al. "Federated User Representation Learning" arXiv. 1909.12535, Sep. 27, 2019.
Goetz, Jack, et al. "Active Federated Learning" arXiv.1909.12641, Sep. 27, 2019.
Hsiao, Wei-Lin, et al. "Fashion++: Minimal Edits for Outfit Improvement." arXiv preprint arXiv:1904.09261 (2019), Apr. 19, 2019.
Dinan, Emily, et al. "Advances in Conversational AI" https://ai.facebook.com/blog/advances-in-conversational-ai/?_xtx_%5b0%5d=68.ARDgZpslcbW2Y4dGWBF1BBfrsZkeNMXeTFXLveffyaOCRJ0iNA80NOfAJ9Y6urka2DI6EQcbA0JoTxUuSGUFT-BkfYahB6ILnX-UMQR5tBiRXkYbJ43fS6THchGawfWiM4ESBHe_Ok7V7IUT97zwgqpCzg6vrR0EQTvuELallEkfW1sb7BGN16RGomEiQCRC38TiqG3U-3Vk0Mns4L-esrTNWyC3RoyMpYGOFkTwMwb2q8yHbkVod9ZwDKi6XC01CIhVlwa_BAz3zINOR-FV4z-1kOf7M-xGMuXDbTjDgf7nhCeOmiY4Afa-Dcf6OVbG2dKgFXztbN3Jqin0iVPBw_nVkQ&_tn_=-UK-R, Aug. 2, 2019.
Ott, Myle, et al. "New advances in natural language processing to better connect people" https://ai.facebook.com/blog/new-advances-in-natural-language-processing-to-better-connect-people/?_xtx_%5b0%5d=68.ARBpsX-0s8sV0sN3kxbWpoyzVrkSOpnfR5CANgCyVPB6BtolxwZpobEfG1XdGEOnfVPVTA3-LJPx6L1COHs5_Kqixd4ZXIjEssji04COGloA0SmwZeEDo2tSV4hCmYGJTKMotQzPWB6QA9iS_e5_13t_m4jANArPOC6M9tzzXxfmixtWiYv-Zkvc2dJ-9MFVyXrv2vxijvqLOat3oKUvmwPQ5Gzny2vjqjE6JT8uuXmXvBJgxSJqrHZYvhoaP6sEWsMt6LOBtC_DzR7nIlbgSBAIdbh2EYVHRLJzdp7flnuepGacg7ZmKHJ4P235Qvi6fv06TFynBX7x8AErGZAqI5dbkg&_tn_=-UK-R, Aug. 14, 2019.
Lee C.C., et al., "Emotion Recognition using a Hierarchical Binary Decision Tree Approach," Speech Communication, Nov. 1, 2011, vol. 53, pp. 1162-1171.
Li Y., et al., "Adaptive Batch Normalization for Practical Domain Adaptation," Pattern Recognition, Aug. 2018, vol. 80, pp. 109-117.
Locatello F., et al., "Challenging Common Assumptions in the Unsupervised Learning of Disentangled Representations," ICLR 2019, Nov. 29, 2018, 37 Pages.
Mamou J., et al., "System Combination and Score Normalization for Spoken Term Detection," IEEE International Conference on Accoustics and Speech and Signal Processing, Proceedings 1999, May 26, 2013, pp. 8272-8276, XP032508928.
Martin S., et al., "MuDoCo: Corpus for Multidomain Coreference Resolution and Referring Expression Generation," In Proceedings of the 12th Conference on Language Resources and Evaluation Conference, May 16, 2020, pp. 104-111.
Moon S., et al., "Situated and Interactive Multimodal Conversations," Facebook AI Research, Jun. 2, 2020, pp. 1-16.
Mower E., et al., "A Framework for Automatic Human Emotion Classification using Emotion Profiles," IEEE Transactions on Audio, Speech and Language Processing, 2011, vol. 19.5, pp. 1057-1070.
"Social Context Reminder", An IP.com Prior Art Database Technical Disclosure [Online], Aug. 4, 2017 [Retrieved on Oct. 27, 2020], 3 Pages, Retrieved from Internet: URL: https://priorart.ip.com/IPCOM/000250582.
Oord A.V.D., et al., "WaveNet: A Generative Model for Raw Audio," arXiv preprint, arXiv: 1609.03499, 2016, pp. 1-15.
Ostendorf M., et al., "Continuous-Space Language Processing: Beyond Word Embeddings," Springer International Publishing, Sep. 21, 2016, 13 Pages, XP047356965.
Pavel M., et al., "Behavioral Informatics and Computational Modeling in Support of Proactive Health Management and Care," IEEE Transactions on Biomedical Engineering, IEEE Service Center, Piscataway, NJ, USA, Dec. 1, 2015, vol. 62 (12), 32 Pages, XP011590079.
Planells J., et al., "A Multi-domain Dialog System to Integrate Heterogeneous Spoken Dialog Systems," Interspeech [Online], Aug. 25, 2013, 5 Pages, XP055650758, Retrieved from the Internet: URL: https://www.isca-speech.org/archive/archive_papers/interspeech_2013/i13_1891.pdf.
Sarikaya R., "The Technology Behind Personal Digital Assistants: An Overview of the System Architecture and Key Components," IEEE Signal Processing Magazine, Jan. 1, 2017, vol. 34 (1), pp. 67-81, XP011639190.
Scherer K.R., et al., "Vocal Cues in Emotion Encoding and Decoding," Motivation and emotion, Jun. 1, 1991, vol. 15 (2), 27 Pages.
Shen J., et al., "Natural TTS Synthesis by Conditioning Wavenet on Mel Spectrogram Predictions," 2018 IEEE International Conference on Acoustics Speech and Signal Processing, Apr. 15, 2018, 5 Pages.
Shiee N., et al., "Take Your Best Selfie Automatically, with Photobooth on Pixel 3," Google AI Blog [Online], Apr. 1, 2019 [Retrieved on Nov. 24, 2020], pp. 1-4, XP055753559, Retrieved from the Internet: URL: https://ai.googleblog.com/2019/04/take-your-best-selfie-automatically.html.
Skerry-Ryan R.J., et al., "Towards End-to-End Prosody Transfer for Expressive Speech Synthesis with Tacotron," ICML 2018, Mar. 24, 2018, 11 Pages.

(56) References Cited

OTHER PUBLICATIONS

Tachibana M., et al., "HMM-based Speech Synthesis with Various Speaking Styles using Model Interpolation," Speech Prosody, 2004, 4 Pages.
Tepper N., et al., "Collabot: Personalized Group Chat Summarization," In Proceedings of the Eleventh ACM International Conference on Web Search and Data Mining, Feb. 5, 2018, pp. 771-774.
Tits N., et al., "Visualization and Interpretation of Latent Spaces for Controlling Expressive Speech Synthesis Through Audio Analysis," Interspeech 2019, Mar. 27, 2019, 5 Pages.
Tran K., et al., "Recurrent Memory Networks for Language Modeling," arXiv preprint arXiv: 1601.01272, Apr. 22, 2016, 11 Pages.
Trigeorgis G., et al., "Adieu Features? End-to-End Speech Emotion Recognition Using a Deep Convolutional Recurrent Network," 2016 IEEE International Conference on Acoustics, Speech and Signal Processing (ICASSP), Mar. 20, 2016, 5 Pages.
Vaswani A., et al., "Attention Is All You Need," Advances in Neural Information Processing Systems, 2017, pp. 5998-6008.
Wang Y., et al., "Dialogue Intent Classification with Character-CNN-BGRU Networks," Multimedia Tools and Applications, Jun. 11, 2019, vol. 79 (8), pp. 4553-4572, XP037048798.
Wang Y., et al., "Style Tokens: Unsupervised Style Modeling, Control and Transfer in End-to-End Speech Synthesis," ICML 2018, Mar. 23, 2018, 11 Pages.
Wang Y., et al., "Uncovering Latent Style Factors for Expressive Speech Synthesis," arXiv pre print arXiv: 1711.00520, Nov. 1, 2017, 5 Pages.
Xu P., et al., "Convolutional Neural Network Based Triangular CRF for Joint Intent Detection and Slot Filling," 2013 IEEE Workshop on Automatic Speech Recognition and Understanding, Dec. 8, 2013, pp. 78-83, XP032544418.
Yamagishi J., et al., "Modeling of Various Speaking Styles and Emotions for HMM-based Speech Synthesis," 8th European Conference on Speech Communication and Technology, 2003, 4 Pages.
Yamagishi J., et al., "Speaking Style Adaptation using Context Clustering Decision Tree for HMM-based Speech Synthesis," 2004 IEEE International Conference on Acoustics, Speech, and Signal Processing, May 17, 2004, vol. 1, 4 Pages.
Yeung K.F., et al., "A Proactive Personalised Mobile Recommendation System Using Analytic Hierarchy Process and Bayesian Network," Journal of Internet Services and Applications, Jul. 20, 2012, vol. 3 (2), pp. 195-214, XP055754649.
Yoon S., et al., "Multimodal Speech Emotion Recognition Using Audio and Text," 2018 IEEE Spoken Language Technology Workshop (SET), Dec. 18, 2018, 7 Pages.
Zhu M.H., et al., "To Prune, or Not to Prune: Exploring the Efficacy of Pruning for Model Compression," Cornell University Library, NY 14853, Oct. 5, 2017, 11 Pages, XP081283371.
International Search Report and Written Opinion for PCT Application No. PCT/US2020/052866, dated Dec. 9, 2020.
Betermieux, Stefan et al: "Finalizing Dialog Models at Runtime" Jul. 16, 2007 (Jul. 16, 2007), BIG Data Analytics in the Social and Ubiquitous Context: $5^{th}$ International Workshop on Modeling Social Media, MSM 2014, $5^{th}$ International Workshop on Mining Ubiquitous and Social Environments, Muse 2014 and First International Workshop on Machine Le, XP047417162, ISBN: 978-3-642-17318-9, abstract, pp. 139-140; Figure 2, 4 Abstract Dialog Model; p. 142, p. 144, p. 146-148; figure 7, Jul. 16, 2007.
Paul C. Constantinides et al: "A Schema Based Approach to Dialog Control", Oct. 1, 1998, Oct. 1, 1998 (Oct. 1, 1998), p. P637, XP007000460, Abstract, 1. Introduction, 2. The scheduler domain; p. 1-2, Oct. 1, 1998.
Anonymous, "Make it Famous ( Experiential photography platform)," Jun. 1, 2019 [Retrieved on Nov. 23, 2020], pp. 1-9, XP055753168, Retrieved from the Internet: URL: https://www.miracam.com/wp-content/themes/mira/assets/pdf/Mira_SpecSheet_201906.pdf.
Bahdanau D., et al., "Neural Machine Translation by Jointly Learning to Align and Translate," Conference paper at International Conference on Learning Representations, arXiv preprint arXiv:1409.0473v7, 2015, 15 pages.
Banse R., et al., "Acoustic Profiles in Vocal Emotion Expression," Journal of Personality and Social Psychology, Mar. 1996, vol. 70 (3), pp. 614-636.
Billsus D., et al., "Improving Proactive Information Systems," 2005 International Conference on Intelligent User Interfaces, IUI 05, Jan. 9-12, 2005, pp. 159-166, XP058319582.
Bonnington C., "Google Clips Smart Camera isn't Smart Enough, But its Aims are Still Worth Considering," Slate [Online], Feb. 27, 2018 [Retrieved on Nov. 23, 2020], pp. 1-3, XP055753206, Retrieved from the Internet: URL: https://slate.com/technology/2018/02/google-clips-smart-camera-isnt-smart-enough-but-its-aims-are-still-worth-considering.html.
Busso C., et al., "IEMOCAP: Interactive Emotional Dyadic Motion Capture Database," Language Resources and Evaluation, Dec. 1, 2008, vol. 42 (4), 30 Pages.
Co-Pending U.S. Appl. No. 15/949,011, inventors Jason; Francis Harrison et al., filed Apr. 9, 2018.
Co-Pending U.S. Appl. No. 16/153,574, filed Oct. 5, 2018, 94 pages.
Co-Pending U.S. Appl. No. 16/153,574, inventors Jason; Harrison et al., filed Oct. 5, 2018.
Co-Pending U.S. Appl. No. 16/790,497, inventors Gao; Yang et al., filed Feb. 13, 2020.
Co-Pending U.S. Appl. No. 16/815,960, inventors Malik; Kshitiz et al., filed Mar. 11, 2020.
Co-Pending U.S. Appl. No. 16/815,990, inventors Kshitiz; Malik et al., filed Mar. 11, 2020.
Co-Pending U.S. Appl. No. 16/842,366, inventors Sravani; Kamisetty et al., filed Apr. 7, 2020.
Co-Pending U.S. Appl. No. 16/914,966, inventor Behar; Noam Yakob, filed Jun. 29, 2020.
Co-Pending U.S. Appl. No. 16/917,664, inventors Liu; Xiaohu et al., filed Jun. 30, 2020.
Co-Pending U.S. Appl. No. 16/921,665, inventors Liu; Honglei et al., filed Jul. 6, 2020.
Co-Pending U.S. Appl. No. 16/998,423, filed Aug. 20, 2020, 124 pages.
Co-pending U.S. Appl. No. 16/998,423, inventors Armen; Aghajanyan et al., filed Aug. 20, 2020.
Co-pending U.S. Appl. No. 17/006,260, filed Aug. 28, 2020, 103 pages.
Co-pending U.S. Appl. No. 17/006,260, inventors William; Presant et al., filed Aug. 28, 2020.
Co-pending U.S. Appl. No. 17/006,339, filed Aug. 28, 2020, 132 pages.
Co-pending U.S. Appl. No. 17/006,339, inventors Shivani; Poddar et al., filed Aug. 28, 2020.
Co-pending U.S. Appl. No. 17/006,377, filed Aug. 28, 2020, 132 pages.
Co-pending U.S. Appl. No. 17/006,377, inventors Shivani; Poddar et al., filed Aug. 28, 2020.
Co-pending U.S. Appl. No. 17/009,542, inventor Kottur; Satwik, filed Sep. 1, 2020.
Co-pending U.S. Appl. No. 17/035,253, inventors Khemka; Piyush et al., filed Sep. 28, 2020.
Co-pending U.S. Appl. No. 17/120,013, inventors Botros; Fadi et al., filed Dec. 11, 2020.
Co-pending U.S. Appl. No. 17/136,636, filed Dec. 29, 2020, 119 pages.
Co-pending U.S. Appl. No. 17/136,636, inventors Greenberg; Michael et al., filed Dec. 29, 2020.
Co-pending U.S. Appl. No. 17/139,363, inventors Cheng; Daniel Manhon et al., filed Dec. 31, 2020.
Co-pending U.S. Appl. No. 17/186,459, inventors Liu; Bing et al., filed Feb. 26, 2021.
Daha F.Z., et al., "Deep Neural Architecture with Character Embedding for Semantic Frame Detection," 2019 IEEE 13th International Conference on Semantic Computing (ICSC), Jan. 30, 2019, pp. 302-307, XP033529242.

(56) References Cited

OTHER PUBLICATIONS

Dauphin Y.N., et al., "Language Modeling with Gated Convolutional Networks," Cornell University Library, NY 14853, Dec. 23, 2016, 9 Pages, XP080742751.
Duong L., et al., "An Adaptable Task-Oriented Dialog System for Stand-alone Embedded Devices," Proceedings of the 57th Annual Meeting of the Association for Computational Linguistics, System Demonstrations, Jul. 28, 2019, pp. 49-57, XP055767185.
Elgan M., "How Lifelogging Will Become Easy and Automatic," Computerworld [Online], Nov. 19, 2016 [Retrieved on Nov. 23, 2020], pp. 1-7, XP055753230, Retrieved from the Internet: URL: https://www.computerworld.com/article/3143115/how-lifelogging-will-become-easy-and-automatic.html.
Fiscus J.G., et al., "A Post-processing System to Yield Reduced Word Error Rates: Recognizer Output Voting Error Reduction (ROVER)," Automatic Speech Recognition and Understanding, Dec. 14-17, 1997, pp. 347-354, XP010267529.
Gao Y., "Demo for Interactive Text-to-Speech via Semi-Supervised Style Transfer Learning," Interspeech [Online], 2019 [Retrieved on Oct. 21, 2019], 3 Pages, Retrieved from Internet: URL: https://yolanda-gao.github.io/Interactive-Style-TTS/.
Han K., et al., "Speech Emotion Recognition using Deep Neural Network and Extreme Learning Machine," Fifteenth Annual Conference of the International Speech Communication Association, 2014, 5 Pages.
Henter G.E., et al., "Principles for Learning Controllable TTS from Annotated and Latent Variation," Interspeech, Aug. 20-24, 2017, 5 Pages.
Hodari Z., et al., "Learning Interpretable Control Dimensions for Speech Synthesis by Using External Data," Interspeech, Sep. 2-6, 2018, 5 Pages.
Hubara I., et al., "Quantized Neural Networks: Training Neural Networks with Low Precision Weights and Activations," Journal of Machine Learning Research [Online], Sep. 22, 2016 [Retrieved on Jan. 20, 2021], vol. 18, 30 Pages, XP055611103, Retrieved from the Internet: URL: https://arxiv.org/pdf/1609.07061.pdf.
International Search Report and Written Opinion for International Application No. PCT/US2020/052955, dated Nov. 27, 2020, 12 Pages.
International Search Report and Written Opinion for International Application No. PCT/US2020/052966, dated Dec. 14, 2020, 12 Pages.
International Search Report and Written Opinion for International Application No. PCT/US2020/052969, dated Dec. 9, 2020, 11 Pages.
International Search Report and Written Opinion for International Application No. PCT/US2020/054604, dated Jan. 29, 2021, 17 Pages.
International Search Report and Written Opinion for International Application No. PCT/US2020/056144, dated Mar. 30, 2021, 8 Pages.
International Search Report and Written Opinion for International Application No. PCT/US2020/056188, dated Dec. 9, 2020, 12 Pages.
Kim Y., et al., "Character-Aware Neural Language Models," Proceedings of the Thirtieth AAAI Conference on Artificial Intelligence [Online], Oct. 16, 2015 [Retrieved on Apr. 12, 2018], 9 Pages, XP055466626, Retrieved from the Internet: URL: https://arxiv.org/pdf/1508.06615.pdf.
King S., "The Blizzard Challenge 2017," In Proceedings Blizzard Challenge, 2017, pp. 1-17.
Laddha A., et al., "Understanding Chat Messages for Sticker Recommendation in Messaging Apps," Cornell University Library, NY 14853, Feb. 7, 2019, 8 Pages, XP081537983.
PR Newswire, "FaceCake Releases First Online, Mobile and In-Store Augmented Reality Shopping Platform for Jewelry at NRF 2018: Dangle Earring App Lets Shoppers Find, Try and Buy Their Statement Style," ProQuest, Jan. 16, 2018, 3 pages.

\* cited by examiner

USER CONTROLLED TASK EXECUTION WITH TASK PERSISTENCE FOR ASSISTANT SYSTEMS

PRIORITY

This application claims the benefit under 35 U.S.C. § 119(e) of U.S. Provisional Patent Application No. 62/923,342, filed 18 Oct. 2019, which is incorporated herein by reference.

TECHNICAL FIELD

This disclosure generally relates to databases and file management within network environments, and in particular relates to hardware and software for smart assistant systems.

BACKGROUND

An assistant system can provide information or services on behalf of a user based on a combination of user input, location awareness, and the ability to access information from a variety of online sources (such as weather conditions, traffic congestion, news, stock prices, user schedules, retail prices, etc.). The user input may include text (e.g., online chat), especially in an instant messaging application or other applications, voice, images, motion, or a combination of them. The assistant system may perform concierge-type services (e.g., making dinner reservations, purchasing event tickets, making travel arrangements) or provide information based on the user input. The assistant system may also perform management or data-handling tasks based on online information and events without user initiation or interaction. Examples of those tasks that may be performed by an assistant system may include schedule management (e.g., sending an alert to a dinner date that a user is running late due to traffic conditions, update schedules for both parties, and change the restaurant reservation time). The assistant system may be enabled by the combination of computing devices, application programming interfaces (APIs), and the proliferation of applications on user devices.

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. profile/news feed posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

SUMMARY OF PARTICULAR EMBODIMENTS

In particular embodiments, the assistant system may assist a user to obtain information or services. The assistant system may enable the user to interact with it with multi-modal user input (such as voice, text, image, video, motion) in stateful and multi-turn conversations to get assistance. As an example and not by way of limitation, the assistant system may support both audio (verbal) input and nonverbal input, such as vision, location, gesture, motion, or hybrid/multi-modal input. The assistant system may create and store a user profile comprising both personal and contextual information associated with the user. In particular embodiments, the assistant system may analyze the user input using natural-language understanding. The analysis may be based on the user profile of the user for more personalized and context-aware understanding. The assistant system may resolve entities associated with the user input based on the analysis. In particular embodiments, the assistant system may interact with different agents to obtain information or services that are associated with the resolved entities. The assistant system may generate a response for the user regarding the information or services by using natural-language generation. Through the interaction with the user, the assistant system may use dialog-management techniques to manage and advance the conversation flow with the user. In particular embodiments, the assistant system may further assist the user to effectively and efficiently digest the obtained information by summarizing the information. The assistant system may also assist the user to be more engaging with an online social network by providing tools that help the user interact with the online social network (e.g., creating posts, comments, messages). The assistant system may additionally assist the user to manage different tasks such as keeping track of events. In particular embodiments, the assistant system may proactively execute, without a user input, tasks that are relevant to user interests and preferences based on the user profile, at a time relevant for the user. In particular embodiments, the assistant system may check privacy settings to ensure that accessing a user's profile or other user information and executing different tasks are permitted subject to the user's privacy settings.

In particular embodiments, the assistant system may assist the user via a hybrid architecture built upon both client-side processes and server-side processes. The client-side processes and the server-side processes may be two parallel workflows for processing a user input and providing assistance to the user. In particular embodiments, the client-side processes may be performed locally on a client system associated with a user. By contrast, the server-side processes may be performed remotely on one or more computing systems. In particular embodiments, an arbitrator on the client system may coordinate receiving user input (e.g., an audio signal), determine whether to use a client-side process, a server-side process, or both, to respond to the user input, and analyze the processing results from each process. The arbitrator may instruct agents on the client-side or server-side to execute tasks associated with the user input based on the aforementioned analyses. The execution results may be further rendered as output to the client system. By leveraging both client-side and server-side processes, the assistant system can effectively assist a user with optimal usage of computing resources while at the same time protecting user privacy and enhancing security.

In particular embodiment, the assistant system may enable users to control a task flow by various suspending and resuming commands via a dialog session with the assistant system. The assistant system may support task persistence, based on which a user may be able to re-start a suspended task at a later time. A user may use various commands in different modalities (e.g., voice commands, gesture commands) to suspend an ongoing task flow. As an example and not by way of limitation, the suspend command may be verbal, such as "hold on", "I will be right back", or "give me a minute", or the may be a gesture, such as the user holding up their hand with the palm out and fingers up in a stop gesture. After receiving such commands, the assistant system may save the current dialog state of the task in a data store. Later when the user wants to resume the task flow, the assistant system may check the dialog history including the stored dialog state to retrieve the suspended task and resume from there. Similarly, a user may resume previously suspended tasks with various commands. As an example and not by way of limitation, the resume command may be verbal, such as "where were we?", "let's go back previous task", "let's continue previous dialog", "I am back", or may be a gesture, such as the user raising their hand with the palm up and fingers flat in a start gesture. Maintaining task persistence may be useful for the following scenarios. Firstly, when users interact with the assistant system, they sometimes get stressed that they have to do everything right and get everything ready in one dialog session. A natural conservation should give users freedom to stop a conversation and resume it later in a subsequent session with the assistant. Secondly, users may need additional time to complete a task, e.g., the users get interrupted. Thirdly, users may need additional information to complete a task, e.g., users may want to ask someone for opinions or gather additional information from other resources. As an example and not by way of limitation, when a user is in a conversation with the assistant system for setting up a meeting, the user may need to check his/her calendar or check with someone else's schedule before completing the setup of the meeting. Although this disclosure describes maintaining particular task persistence by particular systems in a particular manner, this disclosure contemplates maintaining any suitable task persistence by any suitable system in any suitable manner.

In particular embodiments, the assistant system may receive, from a client system associated with a user, a first user request to execute a first task comprising one or more sub-tasks. The assistant system may then receive, from the client system, a second user request to suspend the first task. In particular embodiments, the assistant system may store a dialog state for the first task in response to the second user request. The dialog state may comprise results of executed sub-tasks and a status indicating the first task is suspended. In particular embodiments, the assistant system may receive a third user request to resume the first task. The assistant system may then access the dialog state for the first task. In particular embodiments, the assistant system may further provide, at the client system, a prompt to resume the first task.

Certain technical challenges exist for achieving task persistence. One technical challenge may include accurately identifying a user request as suspending/resuming a task. The solution presented by the embodiments disclosed herein to address this challenge may be training models based on various utterances from users for determining such intents, since these utterances may provide reliable data for training models that are particularly used for determining user's suspending/resuming requests. Another technical challenge may include accurately determining whether subsequent user requests after a user request for a task are associated with the suspended task. The solutions presented by the embodiments disclosed herein to address the above challenge may be making such determination based on current dialog states and contextual information associated with these subsequent user requests as current dialog states and contextual information may provide information of the connection between the user's current interaction with the assistant system and the previous task. Another technical challenge may include efficiently resuming a suspended task. The solutions presented by the embodiments disclosed herein to address this challenge may be storing the dialog state for the suspended task with task identifier or task name and storing the dialog state in a dialog state based on the priority of the suspended task, since the task identifier, task name, or priority may help the assistant system efficiently locate the dialog state of the suspended task, which may further speed up the execution of the remaining sub-tasks.

Certain embodiments disclosed herein may provide one or more technical advantages. A technical advantage of the embodiments may include enhancing user control of task execution as the user may be able to easily suspend a task and resume the task without starting it all over, thereby improving user experience with the assistant system. Another technical advantage of the embodiments may include improving efficiency for responding to a user request for one or more tasks as the assistant system may create task-functions or reusable sessions for the user based on the user's prior interactions with the assistant system, which may be easily called by the user for execution based on task identifiers or session identifiers. Certain embodiments disclosed herein may provide none, some, or all of the above technical advantages. One or more other technical advantages may be readily apparent to one skilled in the art in view of the figures, descriptions, and claims of the present disclosure.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

System Overview

Figure 1:
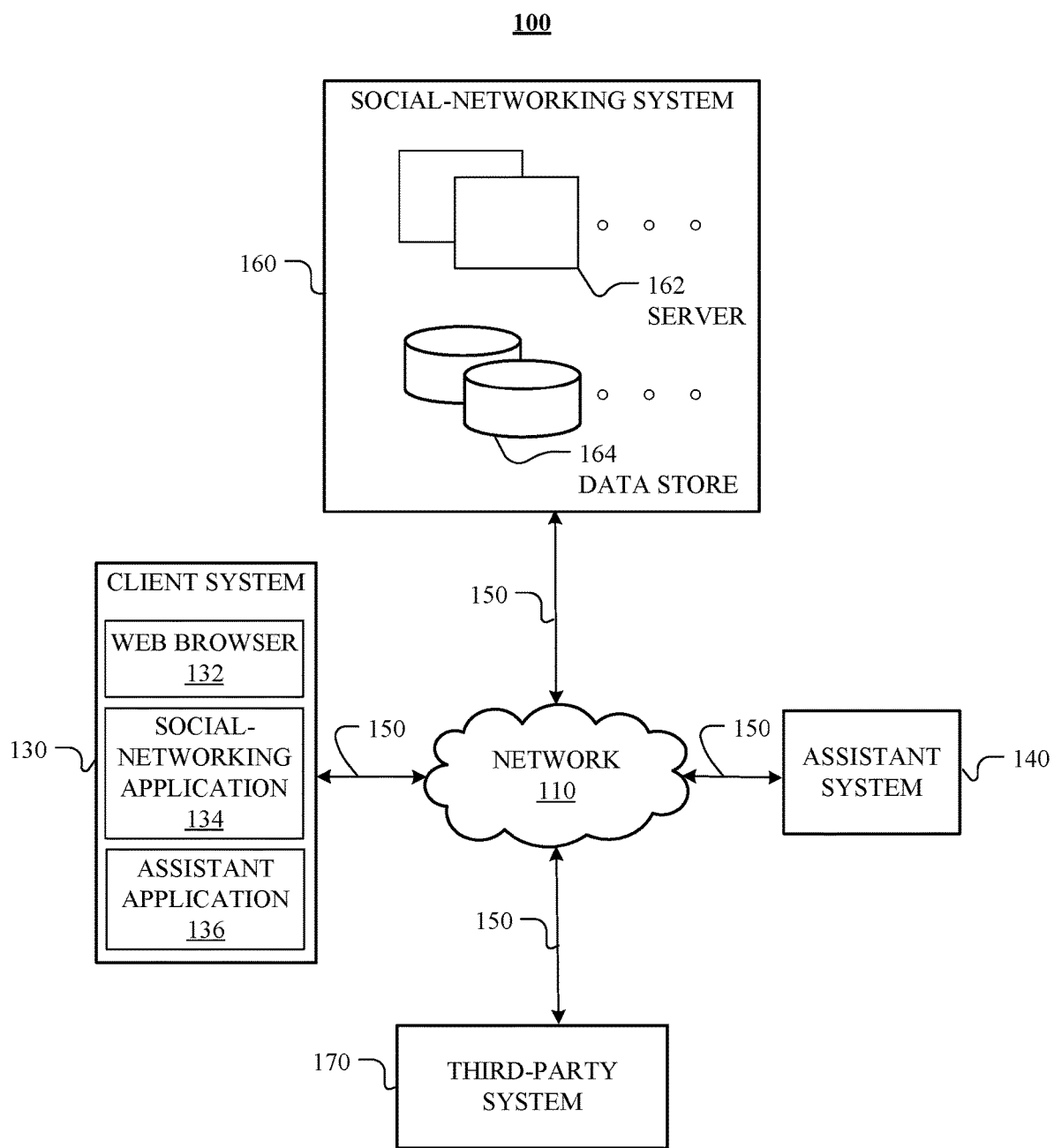
FIG. 1 illustrates an example network environment associated with an assistant system.

FIG. 1 illustrates an example network environment 100 associated with an assistant system. Network environment 100 includes a client system 130, an assistant system 140, a social-networking system 160, and a third-party system 170 connected to each other by a network 110. Although FIG. 1 illustrates a particular arrangement of a client system 130, an assistant system 140, a social-networking system 160, a third-party system 170, and a network 110, this disclosure contemplates any suitable arrangement of a client system 130, an assistant system 140, a social-networking system 160, a third-party system 170, and a network 110. As an example and not by way of limitation, two or more of a client system 130, a social-networking system 160, an assistant system 140, and a third-party system 170 may be connected to each other directly, bypassing a network 110. As another example, two or more of a client system 130, an assistant system 140, a social-networking system 160, and a third-party system 170 may be physically or logically co-located with each other in whole or in part. Moreover, although FIG. 1 illustrates a particular number of client systems 130, assistant systems 140, social-networking systems 160, third-party systems 170, and networks 110, this disclosure contemplates any suitable number of client systems 130, assistant systems 140, social-networking systems 160, third-party systems 170, and networks 110. As an example and not by way of limitation, network environment 100 may include multiple client systems 130, assistant systems 140, social-networking systems 160, third-party systems 170, and networks 110.

This disclosure contemplates any suitable network 110. As an example and not by way of limitation, one or more portions of a network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. A network 110 may include one or more networks 110.

Links 150 may connect a client system 130, an assistant system 140, a social-networking system 160, and a third-party system 170 to a communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout a network environment 100. One or more first links 150 may differ in one or more respects from one or more second links 150.

In particular embodiments, a client system 130 may be an electronic device including hardware, software, or embedded logic components or a combination of two or more such components and capable of carrying out the appropriate functionalities implemented or supported by a client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, smart speaker, virtual reality (VR) headset, augment reality (AR) smart glasses, other suitable electronic device, or any suitable combination thereof. In particular embodiments, the client system 130 may be a smart assistant device. More information on smart assistant devices may be found in U.S. patent application Ser. No. 15/949,011, filed 9 Apr. 2018, U.S. patent application Ser. No. 16/153,574, filed 5 Oct. 2018, U.S. Design patent application Ser. No. 29/631,910, filed 3 Jan. 2018, U.S. Design patent application Ser. No. 29/631,747, filed 2 Jan. 2018, U.S. Design patent application Ser. No. 29/631,913, filed 3 Jan. 2018, and U.S. Design patent application Ser. No. 29/631,914, filed 3 Jan. 2018, each of which is incorporated by reference. This disclosure contemplates any suitable client systems 130. A client system 130 may enable a network user at a client system 130 to access a network 110. A client system 130 may enable its user to communicate with other users at other client systems 130.

In particular embodiments, a client system 130 may include a web browser 132, and may have one or more add-ons, plug-ins, or other extensions. A user at a client system 130 may enter a Uniform Resource Locator (URL) or other address directing a web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to a client system 130 one or more Hyper Text Markup Language (HTML) files responsive to the HTTP request. The client system 130 may render a web interface (e.g. a webpage) based on the HTML files from the server for presentation to the user. This disclosure contemplates any suitable source files. As an example and not by way of limitation, a web interface may be rendered from HTML files, Extensible Hyper Text Markup Language (XHTML) files, or Extensible Markup Language (XML) files, according to particular needs. Such interfaces may also execute scripts, combinations of markup language and scripts, and the like. Herein, reference to a web interface encompasses one or more corresponding source files (which a browser may use to render the web interface) and vice versa, where appropriate.

In particular embodiments, a client system 130 may include a social-networking application 134 installed on the client system 130. A user at a client system 130 may use the social-networking application 134 to access on online social network. The user at the client system 130 may use the social-networking application 134 to communicate with the user's social connections (e.g., friends, followers, followed accounts, contacts, etc.). The user at the client system 130 may also use the social-networking application 134 to interact with a plurality of content objects (e.g., posts, news articles, ephemeral content, etc.) on the online social network. As an example and not by way of limitation, the user may browse trending topics and breaking news using the social-networking application 134.

In particular embodiments, a client system 130 may include an assistant application 136. A user at a client system 130 may use the assistant application 136 to interact with the assistant system 140. In particular embodiments, the assistant application 136 may comprise a stand-alone application. In particular embodiments, the assistant application 136 may be integrated into the social-networking application 134 or another suitable application (e.g., a messaging application). In particular embodiments, the assistant application 136 may be also integrated into the client system 130, an assistant hardware device, or any other suitable hardware devices. In particular embodiments, the assistant application 136 may be accessed via the web browser 132. In particular embodiments, the user may provide input via different modalities. As an example and not by way of limitation, the modalities may include audio, text, image, video, motion, orientation, etc. The assistant application 136 may communicate the user input to the assistant system 140. Based on the user input, the assistant system 140 may generate responses. The assistant system 140 may send the generated responses to the assistant application 136. The assistant application 136 may then present the responses to the user at the client system 130. The presented responses may be based on different modalities such as audio, text, image, and video. As an example and not by way of limitation, the user may verbally ask the assistant application 136 about the traffic information (i.e., via an audio modality) by speaking into a microphone of the client system 130. The assistant application 136 may then communicate the request to the assistant system 140. The assistant system 140 may accordingly generate a response and send it back to the assistant application 136. The assistant application 136 may further present the response to the user in text and/or images on a display of the client system 130.

In particular embodiments, an assistant system 140 may assist users to retrieve information from different sources. The assistant system 140 may also assist user to request services from different service providers. In particular embodiments, the assist system 140 may receive a user request for information or services via the assistant application 136 in the client system 130. The assist system 140 may use natural-language understanding to analyze the user request based on user's profile and other relevant information. The result of the analysis may comprise different entities associated with an online social network. The assistant system 140 may then retrieve information or request services associated with these entities. In particular embodiments, the assistant system 140 may interact with the social-networking system 160 and/or third-party system 170 when retrieving information or requesting services for the user. In particular embodiments, the assistant system 140 may generate a personalized communication content for the user using natural-language generating techniques. The personalized communication content may comprise, for example, the retrieved information or the status of the requested services. In particular embodiments, the assistant system 140 may enable the user to interact with it regarding the information or services in a stateful and multi-turn conversation by using dialog-management techniques. The functionality of the assistant system 140 is described in more detail in the discussion of FIG. 2 below.

In particular embodiments, the social-networking system 160 may be a network-addressable computing system that can host an online social network. The social-networking system 160 may generate, store, receive, and send social-networking data, such as, for example, user profile data, concept-profile data, social-graph information, or other suitable data related to the online social network. The social-networking system 160 may be accessed by the other components of network environment 100 either directly or via a network 110. As an example and not by way of limitation, a client system 130 may access the social-networking system 160 using a web browser 132, or a native application associated with the social-networking system 160 (e.g., a mobile social-networking application, a messaging application, another suitable application, or any combination thereof) either directly or via a network 110. In particular embodiments, the social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, the social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, an assistant system 140, or a third-party system 170 to manage, retrieve, modify, add, or delete, the information stored in data store 164.

In particular embodiments, the social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. The social-networking system 160 may provide users of the online social network the ability to communicate and interact with other users. In particular embodiments, users may join the online social network via the social-networking system 160 and then add connections (e.g., relationships) to a number of other users of the social-networking system 160 whom they want to be connected to. Herein, the term "friend" may refer to any other user of the social-networking system 160 with whom a user has formed a connection, association, or relationship via the social-networking system 160.

In particular embodiments, the social-networking system 160 may provide users with the ability to take actions on various types of items or objects, supported by the social-networking system 160. As an example and not by way of limitation, the items and objects may include groups or social networks to which users of the social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in the social-networking system 160 or by an external system of a third-party system 170, which is separate from the social-networking system 160 and coupled to the social-networking system 160 via a network 110.

In particular embodiments, the social-networking system 160 may be capable of linking a variety of entities. As an example and not by way of limitation, the social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating the social-networking system 160. In particular embodiments, however, the social-networking system 160 and third-party systems 170 may operate in conjunction with each other to provide social-networking services to users of the social-networking system 160 or third-party systems 170. In this sense, the social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects. In particular embodiments, a third-party content provider may use one or more third-party agents to provide content objects and/or services. A third-party agent may be an implementation that is hosted and executing on the third-party system 170.

In particular embodiments, the social-networking system 160 also includes user-generated content objects, which may enhance a user's interactions with the social-networking system 160. User-generated content may include anything a user can add, upload, send, or "post" to the social-networking system 160. As an example and not by way of limitation, a user communicates posts to the social-networking system 160 from a client system 130. Posts may include data such as status updates or other textual data, location information, photos, videos, links, music or other similar data or media. Content may also be added to the social-networking system 160 by a third-party through a "communication channel," such as a newsfeed or stream.

In particular embodiments, the social-networking system 160 may include a variety of servers, sub-systems, programs, modules, logs, and data stores. In particular embodiments, the social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. The social-networking system 160 may also include suitable components such as network interfaces, security mechanisms, load balancers, failover servers, management-and-network-operations consoles, other suitable components, or any suitable combination thereof. In particular embodiments, the social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking the social-networking system 160 to one or more client systems 130 or one or more third-party systems 170 via a network 110. The web server may include a mail server or other messaging functionality for receiving and routing messages between the social-networking system 160 and one or more client systems 130. An API-request server may allow, for example, an assistant system 140 or a third-party system 170 to access information from the social-networking system 160 by calling one or more APIs. An action logger may be used to receive communications from a web server about a user's actions on or off the social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from a client system 130 responsive to a request received from a client system 130. Authorization servers may be used to enforce one or more privacy settings of the users of the social-networking system 160. A privacy setting of a user determines how particular information associated with a user can be shared. The authorization server may allow users to opt in to or opt out of having their actions logged by the social-networking system 160 or shared with other systems (e.g., a third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Assistant Systems

Figure 2:
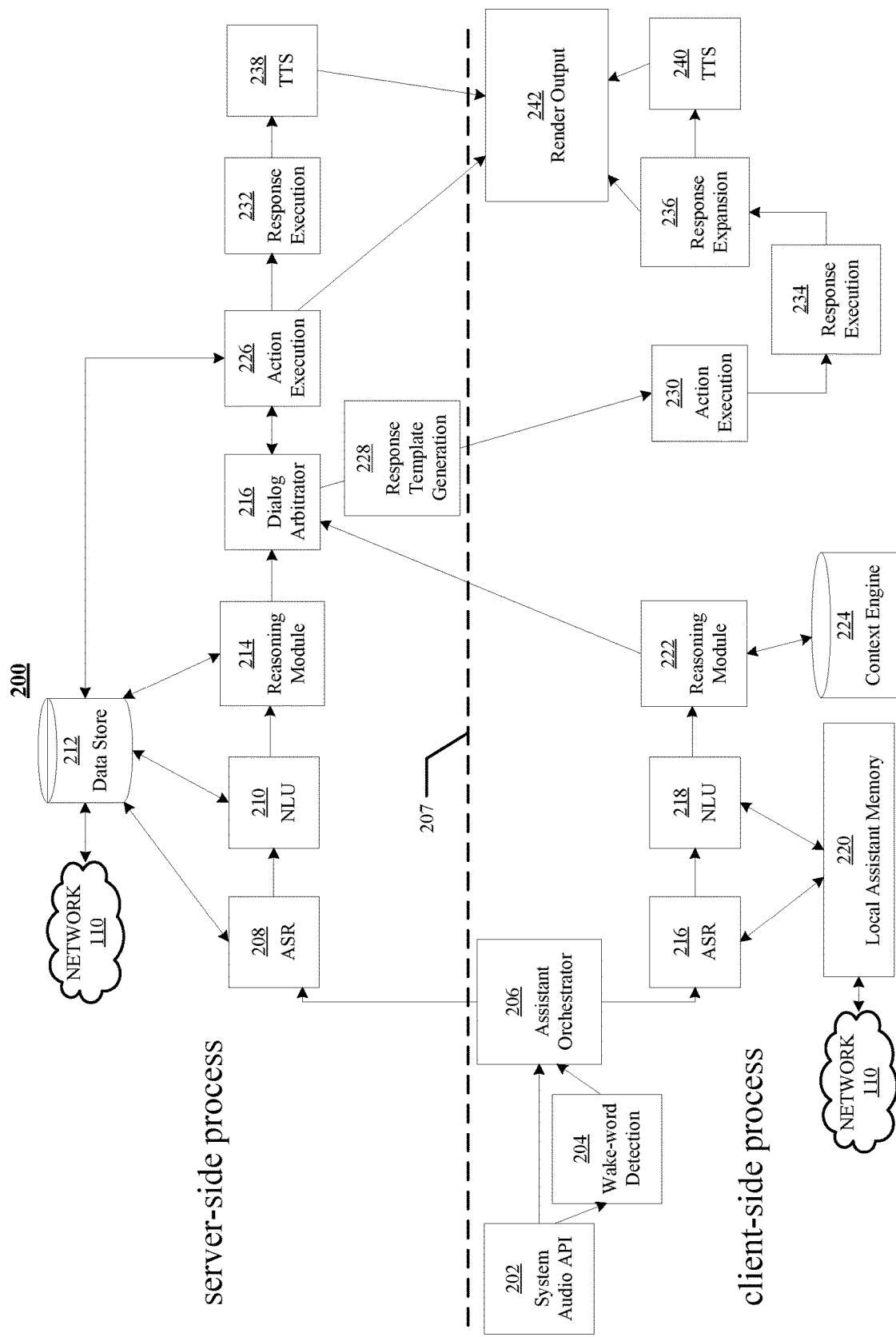
FIG. 2 illustrates an example architecture of the assistant system.

FIG. 2 illustrates an example architecture of an assistant system 140. In particular embodiments, the assistant system 140 may assist a user to obtain information or services. The assistant system 140 may enable the user to interact with it with multi-modal user input (such as voice, text, image, video, motion) in stateful and multi-turn conversations to get assistance. As an example and not by way of limitation, the assistant system 140 may support both audio input (verbal) and nonverbal input, such as vision, location, gesture, motion, or hybrid/multi-modal input. The assistant system 140 may create and store a user profile comprising both personal and contextual information associated with the user. In particular embodiments, the assistant system 140 may analyze the user input using natural-language understanding. The analysis may be based on the user profile of the user for more personalized and context-aware understanding. The assistant system 140 may resolve entities associated with the user input based on the analysis. In particular embodiments, the assistant system 140 may interact with different agents to obtain information or services that are associated with the resolved entities. The assistant system 140 may generate a response for the user regarding the information or services by using natural-language generation. Through the interaction with the user, the assistant system 140 may use dialog management techniques to manage and forward the conversation flow with the user. In particular embodiments, the assistant system 140 may further assist the user to effectively and efficiently digest the obtained information by summarizing the information. The assistant system 140 may also assist the user to be more engaging with an online social network by providing tools that help the user interact with the online social network (e.g., creating posts, comments, messages). The assistant system 140 may additionally assist the user to manage different tasks such as keeping track of events. In particular embodiments, the assistant system 140 may proactively execute, without a user input, pre-authorized tasks that are relevant to user interests and preferences based on the user profile, at a time relevant for the user. In particular embodiments, the assistant system 140 may check privacy settings to ensure that accessing a user's profile or other user information and executing different tasks are permitted subject to the user's privacy settings. More information on assisting users subject to privacy settings may be found in U.S. patent application Ser. No. 16/182,542, filed 6 Nov. 2018, which is incorporated by reference.

In particular embodiments, the assistant system 140 may assist the user via a hybrid architecture built upon both client-side processes and server-side processes. The client-side processes and the server-side processes may be two parallel workflows for processing a user input and providing assistances to the user. In particular embodiments, the client-side processes may be performed locally on a client system 130 associated with a user. By contrast, the server-side processes may be performed remotely on one or more computing systems. In particular embodiments, an assistant orchestrator on the client system 130 may coordinate receiving user input (e.g., audio signal) and determine whether to use client-side processes, server-side processes, or both, to respond to the user input. A dialog arbitrator may analyze the processing results from each process. The dialog arbitrator may instruct agents on the client-side or server-side to execute tasks associated with the user input based on the aforementioned analyses. The execution results may be further rendered as output to the client system 130. By leveraging both client-side and server-side processes, the assistant system 140 can effectively assist a user with optimal usage of computing resources while at the same time protecting user privacy and enhancing security.

In particular embodiments, the assistant system 140 may receive a user input from a client system 130 associated with the user. In particular embodiments, the user input may be a user-generated input that is sent to the assistant system 140 in a single turn. The user input may be verbal, nonverbal, or a combination thereof. As an example and not by way of limitation, the nonverbal user input may be based on the user's voice, vision, location, activity, gesture, motion, or a combination thereof. If the user input is based on the user's voice (e.g., the user may speak to the client system 130), such user input may be first processed by a system audio API 202 (application programming interface). The system audio API 202 may conduct echo cancellation, noise removal, beam forming, and self-user voice activation, speaker identification, voice activity detection (VAD), and any other acoustic techniques to generate audio data that is readily processable by the assistant system 140. In particular embodiments, the system audio API 202 may perform wake-word detection 204 from the user input. As an example and not by way of limitation, a wake-word may be "hey assistant". If such wake-word is detected, the assistant system 140 may be activated accordingly. In alternative embodiments, the user may activate the assistant system 140 via a visual signal without a wake-word. The visual signal may be received at a low-power sensor (e.g., a camera) that can detect various visual signals. As an example and not by way of limitation, the visual signal may be a barcode, a QR code or a universal product code (UPC) detected by the client system 130. As another example and not by way of limitation, the visual signal may be the user's gaze at an object. As yet another example and not by way of limitation, the visual signal may be a user gesture, e.g., the user pointing at an object.

In particular embodiments, the audio data from the system audio API 202 may be sent to an assistant orchestrator 206. The assistant orchestrator 206 may be executing on the client system 130. In particular embodiments, the assistant orchestrator 206 may determine whether to respond to the user input by using client-side processes, server-side processes, or both. As indicated in FIG. 2, the client-side processes are illustrated below the dashed line 207 whereas the server-side processes are illustrated above the dashed line 207. The assistant orchestrator 206 may also determine to respond to the user input by using both the client-side processes and the server-side processes simultaneously. Although FIG. 2 illustrates the assistant orchestrator 206 as being a client-side process, the assistant orchestrator 206 may be a server-side process or may be a hybrid process split between client- and server-side processes.

In particular embodiments, the server-side processes may be as follows after audio data is generated from the system audio API 202. The assistant orchestrator 206 may send the audio data to a remote computing system that hosts different modules of the assistant system 140 to respond to the user input. In particular embodiments, the audio data may be received at a remote automatic speech recognition (ASR) module 208. The ASR module 208 may allow a user to dictate and have speech transcribed as written text, have a document synthesized as an audio stream, or issue commands that are recognized as such by the system. The ASR module 208 may use statistical models to determine the most likely sequences of words that correspond to a given portion of speech received by the assistant system 140 as audio input. The models may include one or more of hidden Markov models, neural networks, deep learning models, or any combination thereof. The received audio input may be encoded into digital data at a particular sampling rate (e.g., 16, 44.1, or 96 kHz) and with a particular number of bits representing each sample (e.g., 8, 16, of 24 bits).

In particular embodiments, the ASR module 208 may comprise different components. The ASR module 208 may comprise one or more of a grapheme-to-phoneme (G2P) model, a pronunciation learning model, a personalized acoustic model, a personalized language model (PLM), or an end-pointing model. In particular embodiments, the G2P model may be used to determine a user's grapheme-to-phoneme style, e.g., what it may sound like when a particular user speaks a particular word. The personalized acoustic model may be a model of the relationship between audio signals and the sounds of phonetic units in the language. Therefore, such personalized acoustic model may identify how a user's voice sounds. The personalized acoustical model may be generated using training data such as training speech received as audio input and the corresponding phonetic units that correspond to the speech. The personalized acoustical model may be trained or refined using the voice of a particular user to recognize that user's speech. In particular embodiments, the personalized language model may then determine the most likely phrase that corresponds to the identified phonetic units for a particular audio input. The personalized language model may be a model of the probabilities that various word sequences may occur in the language. The sounds of the phonetic units in the audio input may be matched with word sequences using the personalized language model, and greater weights may be assigned to the word sequences that are more likely to be phrases in the language. The word sequence having the highest weight may be then selected as the text that corresponds to the audio input. In particular embodiments, the personalized language model may be also used to predict what words a user is most likely to say given a context. In particular embodiments, the end-pointing model may detect when the end of an utterance is reached.

In particular embodiments, the output of the ASR module 208 may be sent to a remote natural-language understanding (NLU) module 210. The NLU module 210 may perform named entity resolution (NER). The NLU module 210 may additionally consider contextual information when analyzing the user input. In particular embodiments, an intent and/or a slot may be an output of the NLU module 210. An intent may be an element in a pre-defined taxonomy of semantic intentions, which may indicate a purpose of a user interacting with the assistant system 140. The NLU module 210 may classify a user input into a member of the pre-defined taxonomy, e.g., for the input "Play Beethoven's 5th," the NLU module 210 may classify the input as having the intent [IN:play_music]. In particular embodiments, a domain may denote a social context of interaction, e.g., education, or a namespace for a set of intents, e.g., music. A slot may be a named sub-string corresponding to a character string within the user input, representing a basic semantic entity. For example, a slot for "pizza" may be [SL:dish]. In particular embodiments, a set of valid or expected named slots may be conditioned on the classified intent. As an example and not by way of limitation, for the intent [IN:play_music], a valid slot may be [SL: song_name]. In particular embodiments, the NLU module 210 may additionally extract information from one or more of a social graph, a knowledge graph, or a concept graph, and retrieve a user's profile from one or more remote data stores 212. The NLU module 210 may further process information from these different sources by determining what information to aggregate, annotating n-grams of the user input, ranking the n-grams with confidence scores based on the aggregated information, and formulating the ranked n-grams into features that can be used by the NLU module 210 for understanding the user input.

In particular embodiments, the NLU module 210 may identify one or more of a domain, an intent, or a slot from the user input in a personalized and context-aware manner. As an example and not by way of limitation, a user input may comprise "show me how to get to the coffee shop". The NLU module 210 may identify the particular coffee shop that the user wants to go based on the user's personal information and the associated contextual information. In particular embodiments, the NLU module 210 may comprise a lexicon of a particular language and a parser and grammar rules to partition sentences into an internal representation. The NLU module 210 may also comprise one or more programs that perform naive semantics or stochastic semantic analysis to the use of pragmatics to understand a user input. In particular embodiments, the parser may be based on a deep learning architecture comprising multiple long-short term memory (LSTM) networks. As an example and not by way of limitation, the parser may be based on a recurrent neural network grammar (RNNG) model, which is a type of recurrent and recursive LSTM algorithm. More information on natural-language understanding may be found in U.S. patent application Ser. No. 16/011,062, filed 18 Jun. 2018, U.S. patent application Ser. No. 16/025,317, filed 2 Jul. 2018, and U.S. patent application Ser. No. 16/038,120, filed 17 Jul. 2018, each of which is incorporated by reference.

In particular embodiments, the output of the NLU module 210 may be sent to a remote reasoning module 214. The reasoning module 214 may comprise a dialog manager and an entity resolution component. In particular embodiments, the dialog manager may have complex dialog logic and product-related business logic. The dialog manager may manage the dialog state and flow of the conversation between the user and the assistant system 140. The dialog manager may additionally store previous conversations between the user and the assistant system 140. In particular embodiments, the dialog manager may communicate with the entity resolution component to resolve entities associated with the one or more slots, which supports the dialog manager to advance the flow of the conversation between the user and the assistant system 140. In particular embodiments, the entity resolution component may access one or more of the social graph, the knowledge graph, or the concept graph when resolving the entities. Entities may include, for example, unique users or concepts, each of which may have a unique identifier (ID). As an example and not by way of limitation, the knowledge graph may comprise a plurality of entities. Each entity may comprise a single record associated with one or more attribute values. The particular record may be associated with a unique entity identifier. Each record may have diverse values for an attribute of the entity. Each attribute value may be associated with a confidence probability. A confidence probability for an attribute value represents a probability that the value is accurate for the given attribute. Each attribute value may be also associated with a semantic weight. A semantic weight for an attribute value may represent how the value semantically appropriate for the given attribute considering all the available information. For example, the knowledge graph may comprise an entity of a book "Alice's Adventures", which includes information that has been extracted from multiple content sources (e.g., an online social network, online encyclopedias, book review sources, media databases, and entertainment content sources), and then deduped, resolved, and fused to generate the single unique record for the knowledge graph. The entity may be associated with a "fantasy" attribute value which indicates the genre of the book "Alice's Adventures". More information on the knowledge graph may be found in U.S. patent application Ser. No. 16/048,049, filed 27 Jul. 2018, and U.S. patent application Ser. No. 16/048,101, filed 27 Jul. 2018, each of which is incorporated by reference.

In particular embodiments, the entity resolution component may check the privacy constraints to guarantee that the resolving of the entities does not violate privacy policies. As an example and not by way of limitation, an entity to be resolved may be another user who specifies in his/her privacy settings that his/her identity should not be searchable on the online social network, and thus the entity resolution component may not return that user's identifier in response to a request. Based on the information obtained from the social graph, the knowledge graph, the concept graph, and the user profile, and subject to applicable privacy policies, the entity resolution component may therefore resolve the entities associated with the user input in a personalized, context-aware, and privacy-aware manner. In particular embodiments, each of the resolved entities may be associated with one or more identifiers hosted by the social-networking system 160. As an example and not by way of limitation, an identifier may comprise a unique user identifier (ID) corresponding to a particular user (e.g., a unique username or user ID number). In particular embodiments, each of the resolved entities may be also associated with a confidence score. More information on resolving entities may be found in U.S. patent application Ser. No. 16/048,049, filed 27 Jul. 2018, and U.S. patent application Ser. No. 16/048,072, filed 27 Jul. 2018, each of which is incorporated by reference.

In particular embodiments, the dialog manager may conduct dialog optimization and assistant state tracking. Dialog optimization is the problem of using data to understand what the most likely branching in a dialog should be. As an example and not by way of limitation, with dialog optimization the assistant system 140 may not need to confirm who a user wants to call because the assistant system 140 has high confidence that a person inferred based on dialog optimization would be very likely whom the user wants to call. In particular embodiments, the dialog manager may use reinforcement learning for dialog optimization. Assistant state tracking aims to keep track of a state that changes over time as a user interacts with the world and the assistant system 140 interacts with the user. As an example and not by way of limitation, assistant state tracking may track what a user is talking about, whom the user is with, where the user is, what tasks are currently in progress, and where the user's gaze is at, etc., subject to applicable privacy policies. In particular embodiments, the dialog manager may use a set of operators to track the dialog state. The operators may comprise the necessary data and logic to update the dialog state. Each operator may act as delta of the dialog state after processing an incoming request. In particular embodiments, the dialog manager may further comprise a dialog state tracker and an action selector. In alternative embodiments, the dialog state tracker may replace the entity resolution component and resolve the references/mentions and keep track of the state.

In particular embodiments, the reasoning module 214 may further conduct false trigger mitigation. The goal of false trigger mitigation is to detect false triggers (e.g., wake-word) of assistance requests and to avoid generating false records when a user actually does not intend to invoke the assistant system 140. As an example and not by way of limitation, the reasoning module 214 may achieve false trigger mitigation based on a nonsense detector. If the nonsense detector determines that a wake-word makes no sense at this point in the interaction with the user, the reasoning module 214 may determine that inferring the user intended to invoke the assistant system 140 may be incorrect. In particular embodiments, the output of the reasoning module 214 may be sent a remote dialog arbitrator 216.

In particular embodiments, each of the ASR module 208, NLU module 210, and reasoning module 214 may access the remote data store 212, which comprises user episodic memories to determine how to assist a user more effectively. More information on episodic memories may be found in U.S. patent application Ser. No. 16/552,559, filed 27 Aug. 2019, which is incorporated by reference. The data store 212 may additionally store the user profile of the user. The user profile of the user may comprise user profile data including demographic information, social information, and contextual information associated with the user. The user profile data may also include user interests and preferences on a plurality of topics, aggregated through conversations on news feed, search logs, messaging platforms, etc. The usage of a user profile may be subject to privacy constraints to ensure that a user's information can be used only for his/her benefit, and not shared with anyone else. More information on user profiles may be found in U.S. patent application Ser. No. 15/967,239, filed 30 Apr. 2018, which is incorporated by reference.

In particular embodiments, parallel to the aforementioned server-side process involving the ASR module 208, NLU module 210, and reasoning module 214, the client-side process may be as follows. In particular embodiments, the output of the assistant orchestrator 206 may be sent to a local ASR module 216 on the client system 130. The ASR module 216 may comprise a personalized language model (PLM), a G2P model, and an end-pointing model. Because of the limited computing power of the client system 130, the assistant system 140 may optimize the personalized language model at run time during the client-side process. As an example and not by way of limitation, the assistant system 140 may pre-compute a plurality of personalized language models for a plurality of possible subjects a user may talk about. When a user requests assistance, the assistant system 140 may then swap these pre-computed language models quickly so that the personalized language model may be optimized locally by the assistant system 140 at run time based on user activities. As a result, the assistant system 140 may have a technical advantage of saving computational resources while efficiently determining what the user may be talking about. In particular embodiments, the assistant system 140 may also re-learn user pronunciations quickly at run time.

In particular embodiments, the output of the ASR module 216 may be sent to a local NLU module 218. In particular embodiments, the NLU module 218 herein may be more compact compared to the remote NLU module 210 supported on the server-side. When the ASR module 216 and NLU module 218 process the user input, they may access a local assistant memory 220. The local assistant memory 220 may be different from the user memories stored on the data store 212 for the purpose of protecting user privacy. In particular embodiments, the local assistant memory 220 may be syncing with the user memories stored on the data store 212 via the network 110. As an example and not by way of limitation, the local assistant memory 220 may sync a calendar on a user's client system 130 with a server-side calendar associate with the user. In particular embodiments, any secured data in the local assistant memory 220 may be only accessible to the modules of the assistant system 140 that are locally executing on the client system 130.

In particular embodiments, the output of the NLU module 218 may be sent to a local reasoning module 222. The reasoning module 222 may comprise a dialog manager and an entity resolution component. Due to the limited computing power, the reasoning module 222 may conduct on-device learning that is based on learning algorithms particularly tailored for client systems 130. As an example and not by way of limitation, federated learning may be used by the reasoning module 222. Federated learning is a specific category of distributed machine learning approaches which trains machine learning models using decentralized data residing on end devices such as mobile phones. In particular embodiments, the reasoning module 222 may use a particular federated learning model, namely federated user representation learning, to extend existing neural-network personalization techniques to federated learning. Federated user representation learning can personalize models in federated learning by learning task-specific user representations (i.e., embeddings) or by personalizing model weights. Federated user representation learning is a simple, scalable, privacy-preserving, and resource-efficient. Federated user representation learning may divide model parameters into federated and private parameters. Private parameters, such as private user embeddings, may be trained locally on a client system 130 instead of being transferred to or averaged on a remote server. Federated parameters, by contrast, may be trained remotely on the server. In particular embodiments, the reasoning module 222 may use another particular federated learning model, namely active federated learning to transmit a global model trained on the remote server to client systems 130 and calculate gradients locally on these client systems 130. Active federated learning may enable the reasoning module to minimize the transmission costs associated with downloading models and uploading gradients. For active federated learning, in each round client systems are selected not uniformly at random, but with a probability conditioned on the current model and the data on the client systems to maximize efficiency. In particular embodiments, the reasoning module 222 may use another particular federated learning model, namely federated Adam. Conventional federated learning model may use stochastic gradient descent (SGD) optimizers. By contrast, the federated Adam model may use moment-based optimizers. Instead of using the averaged model directly as what conventional work does, federated Adam model may use the averaged model to compute approximate gradients. These gradients may be then fed into the federated Adam model, which may de-noise stochastic gradients and use a per-parameter adaptive learning rate. Gradients produced by federated learning may be even noisier than stochastic gradient descent (because data may be not independent and identically distributed), so federated Adam model may help even more deal with the noise. The federated Adam model may use the gradients to take smarter steps towards minimizing the objective function. The experiments show that conventional federated learning on a benchmark has 1.6% drop in ROC (Receiver Operating Characteristics) curve whereas federated Adam model has only 0.4% drop. In addition, federated Adam model has no increase in communication or on-device computation. In particular embodiments, the reasoning module 222 may also perform false trigger mitigation. This false trigger mitigation may help detect false activation requests, e.g., wake-word, on the client system 130 when the user's speech input comprises data that is subject to privacy constraints. As an example and not by way of limitation, when a user is in a voice call, the user's conversation is private and the false trigger detection based on such conversation can only occur locally on the user's client system 130.

In particular embodiments, the assistant system 140 may comprise a local context engine 224. The context engine 224 may process all the other available signals to provide more informative cues to the reasoning module 222. As an example and not by way of limitation, the context engine 224 may have information related to people, sensory data from client system 130 sensors (e.g., microphone, camera) that are further analyzed by computer vision technologies, geometry constructions, activity data, inertial data (e.g., collected by a VR headset), location, etc. In particular embodiments, the computer vision technologies may comprise human skeleton reconstruction, face detection, facial recognition, hand tracking, eye tracking, etc. In particular embodiments, geometry constructions may comprise constructing objects surrounding a user using data collected by a client system 130. As an example and not by way of limitation, the user may be wearing AR glasses and geometry construction may aim to determine where the floor is, where the wall is, where the user's hands are, etc. In particular embodiments, inertial data may be data associated with linear and angular motions. As an example and not by way of limitation, inertial data may be captured by AR glasses which measures how a user's body parts move.

In particular embodiments, the output of the local reasoning module 222 may be sent to the dialog arbitrator 216. The dialog arbitrator 216 may function differently in three scenarios. In the first scenario, the assistant orchestrator 206 determines to use server-side process, for which the dialog arbitrator 216 may transmit the output of the reasoning module 214 to a remote action execution module 226. In the second scenario, the assistant orchestrator 206 determines to use both server-side processes and client-side processes, for which the dialog arbitrator 216 may aggregate output from both reasoning modules (i.e., remote reasoning module 214 and local reasoning module 222) of both processes and analyze them. As an example and not by way of limitation, the dialog arbitrator 216 may perform ranking and select the best reasoning result for responding to the user input. In particular embodiments, the dialog arbitrator 216 may further determine whether to use agents on the server-side or on the client-side to execute relevant tasks based on the analysis. In the third scenario, the assistant orchestrator 206 determines to use client-side processes and the dialog arbitrator 216 needs to evaluate the output of the local reasoning module 222 to determine if the client-side processes can complete the task of handling the user input.

In particular embodiments, for the first and second scenarios mentioned above, the dialog arbitrator 216 may determine that the agents on the server-side are necessary to execute tasks responsive to the user input. Accordingly, the dialog arbitrator 216 may send necessary information regarding the user input to the action execution module 226. The action execution module 226 may call one or more agents to execute the tasks. In alternative embodiments, the action selector of the dialog manager may determine actions to execute and instruct the action execution module 226 accordingly. In particular embodiments, an agent may be an implementation that serves as a broker across a plurality of content providers for one domain. A content provider may be an entity responsible for carrying out an action associated with an intent or completing a task associated with the intent. In particular embodiments, the agents may comprise first-party agents and third-party agents. In particular embodiments, first-party agents may comprise internal agents that are accessible and controllable by the assistant system 140 (e.g. agents associated with services provided by the online social network, such as messaging services or photo-share services). In particular embodiments, third-party agents may comprise external agents that the assistant system 140 has no control over (e.g., third-party online music application agents, ticket sales agents). The first-party agents may be associated with first-party providers that provide content objects and/or services hosted by the social-networking system 160. The third-party agents may be associated with third-party providers that provide content objects and/or services hosted by the third-party system 170. In particular embodiments, each of the first-party agents or third-party agents may be designated for a particular domain. As an example and not by way of limitation, the domain may comprise weather, transportation, music, etc. In particular embodiments, the assistant system 140 may use a plurality of agents collaboratively to respond to a user input. As an example and not by way of limitation, the user input may comprise "direct me to my next meeting." The assistant system 140 may use a calendar agent to retrieve the location of the next meeting. The assistant system 140 may then use a navigation agent to direct the user to the next meeting.

In particular embodiments, for the second and third scenarios mentioned above, the dialog arbitrator 216 may determine that the agents on the client-side are capable of executing tasks responsive to the user input but additional information is needed (e.g., response templates) or that the tasks can be only handled by the agents on the server-side. If the dialog arbitrator 216 determines that the tasks can be only handled by the agents on the server-side, the dialog arbitrator 216 may send necessary information regarding the user input to the action execution module 226. If the dialog arbitrator 216 determines that the agents on the client-side are capable of executing tasks but response templates are needed, the dialog arbitrator 216 may send necessary information regarding the user input to a remote response template generation module 228. The output of the response template generation module 228 may be further sent to a local action execution module 230 executing on the client system 130.

In particular embodiments, the action execution module 230 may call local agents to execute tasks. A local agent on the client system 130 may be able to execute simpler tasks compared to an agent on the server-side. As an example and not by way of limitation, multiple device-specific implementations (e.g., real-time calls for a client system 130 or a messaging application on the client system 130) may be handled internally by a single agent. Alternatively, these device-specific implementations may be handled by multiple agents associated with multiple domains. In particular embodiments, the action execution module 230 may additionally perform a set of general executable dialog actions. The set of executable dialog actions may interact with agents, users and the assistant system 140 itself. These dialog actions may comprise dialog actions for slot request, confirmation, disambiguation, agent execution, etc. The dialog actions may be independent of the underlying implementation of the action selector or dialog policy. Both tree-based policy and model-based policy may generate the same basic dialog actions, with a callback function hiding any action selector specific implementation details.

In particular embodiments, the output from the remote action execution module 226 on the server-side may be sent to a remote response execution module 232. In particular embodiments, the action execution module 226 may communicate back to the dialog arbitrator 216 for more information. The response execution module 232 may be based on a remote conversational understanding (CU) composer. In particular embodiments, the output from the action execution module 226 may be formulated as a <k, c, u, d> tuple, in which k indicates a knowledge source, c indicates a communicative goal, u indicates a user model, and d indicates a discourse model. In particular embodiments, the CU composer may comprise a natural-language generation (NLG) module and a user interface (UI) payload generator. The natural-language generator may generate a communication content based on the output of the action execution module 226 using different language models and/or language templates. In particular embodiments, the generation of the communication content may be application specific and also personalized for each user. The CU composer may also determine a modality of the generated communication content using the UI payload generator. In particular embodiments, the NLG module may comprise a content determination component, a sentence planner, and a surface realization component. The content determination component may determine the communication content based on the knowledge source, communicative goal, and the user's expectations. As an example and not by way of limitation, the determining may be based on a description logic. The description logic may comprise, for example, three fundamental notions which are individuals (representing objects in the domain), concepts (describing sets of individuals), and roles (representing binary relations between individuals or concepts). The description logic may be characterized by a set of constructors that allow the natural-language generator to build complex concepts/roles from atomic ones. In particular embodiments, the content determination component may perform the following tasks to determine the communication content. The first task may comprise a translation task, in which the input to the natural-language generator may be translated to concepts. The second task may comprise a selection task, in which relevant concepts may be selected among those resulted from the translation task based on the user model. The third task may comprise a verification task, in which the coherence of the selected concepts may be verified. The fourth task may comprise an instantiation task, in which the verified concepts may be instantiated as an executable file that can be processed by the natural-language generator. The sentence planner may determine the organization of the communication content to make it human understandable. The surface realization component may determine specific words to use, the sequence of the sentences, and the style of the communication content. The UI payload generator may determine a preferred modality of the communication content to be presented to the user. In particular embodiments, the CU composer may check privacy constraints associated with the user to make sure the generation of the communication content follows the privacy policies. More information on natural-language generation may be found in U.S. patent application Ser. No. 15/967,279, filed 30 Apr. 2018, and U.S. patent application Ser. No. 15/966,455, filed 30 Apr. 2018, each of which is incorporated by reference.

In particular embodiments, the output from the local action execution module 230 on the client system 130 may be sent to a local response execution module 234. The response execution module 234 may be based on a local conversational understanding (CU) composer. The CU composer may comprise a natural-language generation (NLG) module. As the computing power of a client system 130 may be limited, the NLG module may be simple for the consideration of computational efficiency. Because the NLG module may be simple, the output of the response execution module 234 may be sent to a local response expansion module 236. The response expansion module 236 may further expand the result of the response execution module 234 to make a response more natural and contain richer semantic information.

In particular embodiments, if the user input is based on audio signals, the output of the response execution module 232 on the server-side may be sent to a remote text-to-speech (TTS) module 238. Similarly, the output of the response expansion module 236 on the client-side may be sent to a local TTS module 240. Both TTS modules may convert a response to audio signals. In particular embodiments, the output from the response execution module 232, the response expansion module 236, or the TTS modules on both sides, may be finally sent to a local render output module 242. The render output module 242 may generate a response that is suitable for the client system 130. As an example and not by way of limitation, the output of the response execution module 232 or the response expansion module 236 may comprise one or more of natural-language strings, speech, actions with parameters, or rendered images or videos that can be displayed in a VR headset or AR smart glasses. As a result, the render output module 242 may determine what tasks to perform based on the output of CU composer to render the response appropriately for displaying on the VR headset or AR smart glasses. For example, the response may be visual-based modality (e.g., an image or a video clip) that can be displayed via the VR headset or AR smart glasses. As another example, the response may be audio signals that can be played by the user via VR headset or AR smart glasses. As yet another example, the response may be augmented-reality data that can be rendered VR headset or AR smart glasses for enhancing user experience.

In particular embodiments, the assistant system 140 may have a variety of capabilities including audio cognition, visual cognition, signals intelligence, reasoning, and memories. In particular embodiments, the capability of audio recognition may enable the assistant system 140 to understand a user's input associated with various domains in different languages, understand a conversation and be able to summarize it, perform on-device audio cognition for complex commands, identify a user by voice, extract topics from a conversation and auto-tag sections of the conversation, enable audio interaction without a wake-word, filter and amplify user voice from ambient noise and conversations, understand which client system 130 (if multiple client systems 130 are in vicinity) a user is talking to.

In particular embodiments, the capability of visual cognition may enable the assistant system 140 to perform face detection and tracking, recognize a user, recognize most people of interest in major metropolitan areas at varying angles, recognize majority of interesting objects in the world through a combination of existing machine-learning models and one-shot learning, recognize an interesting moment and auto-capture it, achieve semantic understanding over multiple visual frames across different episodes of time, provide platform support for additional capabilities in people, places, objects recognition, recognize full set of settings and micro-locations including personalized locations, recognize complex activities, recognize complex gestures to control a client system 130, handle images/videos from egocentric cameras (e.g., with motion, capture angles, resolution, etc.), accomplish similar level of accuracy and speed regarding images with lower resolution, conduct one-shot registration and recognition of people, places, and objects, and perform visual recognition on a client system 130.

In particular embodiments, the assistant system 140 may leverage computer vision techniques to achieve visual cognition. Besides computer vision techniques, the assistant system 140 may explore options that can supplement these techniques to scale up the recognition of objects. In particular embodiments, the assistant system 140 may use supplemental signals such as optical character recognition (OCR) of an object's labels, GPS signals for places recognition, signals from a user's client system 130 to identify the user. In particular embodiments, the assistant system 140 may perform general scene recognition (home, work, public space, etc.) to set context for the user and reduce the computer-vision search space to identify top likely objects or people. In particular embodiments, the assistant system 140 may guide users to train the assistant system 140. For example, crowdsourcing may be used to get users to tag and help the assistant system 140 recognize more objects over time. As another example, users can register their personal objects as part of initial setup when using the assistant system 140. The assistant system 140 may further allow users to provide positive/negative signals for objects they interact with to train and improve personalized models for them.

In particular embodiments, the capability of signals intelligence may enable the assistant system 140 to determine user location, understand date/time, determine family locations, understand users' calendars and future desired locations, integrate richer sound understanding to identify setting/context through sound alone, build signals intelligence models at run time which may be personalized to a user's individual routines.

In particular embodiments, the capability of reasoning may enable the assistant system 140 to have the ability to pick up any previous conversation threads at any point in the future, synthesize all signals to understand micro and personalized context, learn interaction patterns and preferences from users' historical behavior and accurately suggest interactions that they may value, generate highly predictive proactive suggestions based on micro-context understanding, understand what content a user may want to see at what time of a day, understand the changes in a scene and how that may impact the user's desired content.

In particular embodiments, the capabilities of memories may enable the assistant system 140 to remember which social connections a user previously called or interacted with, write into memory and query memory at will (i.e., open dictation and auto tags), extract richer preferences based on prior interactions and long-term learning, remember a user's life history, extract rich information from egocentric streams of data and auto catalog, and write to memory in structured form to form rich short, episodic and long-term memories.

Figure 3:
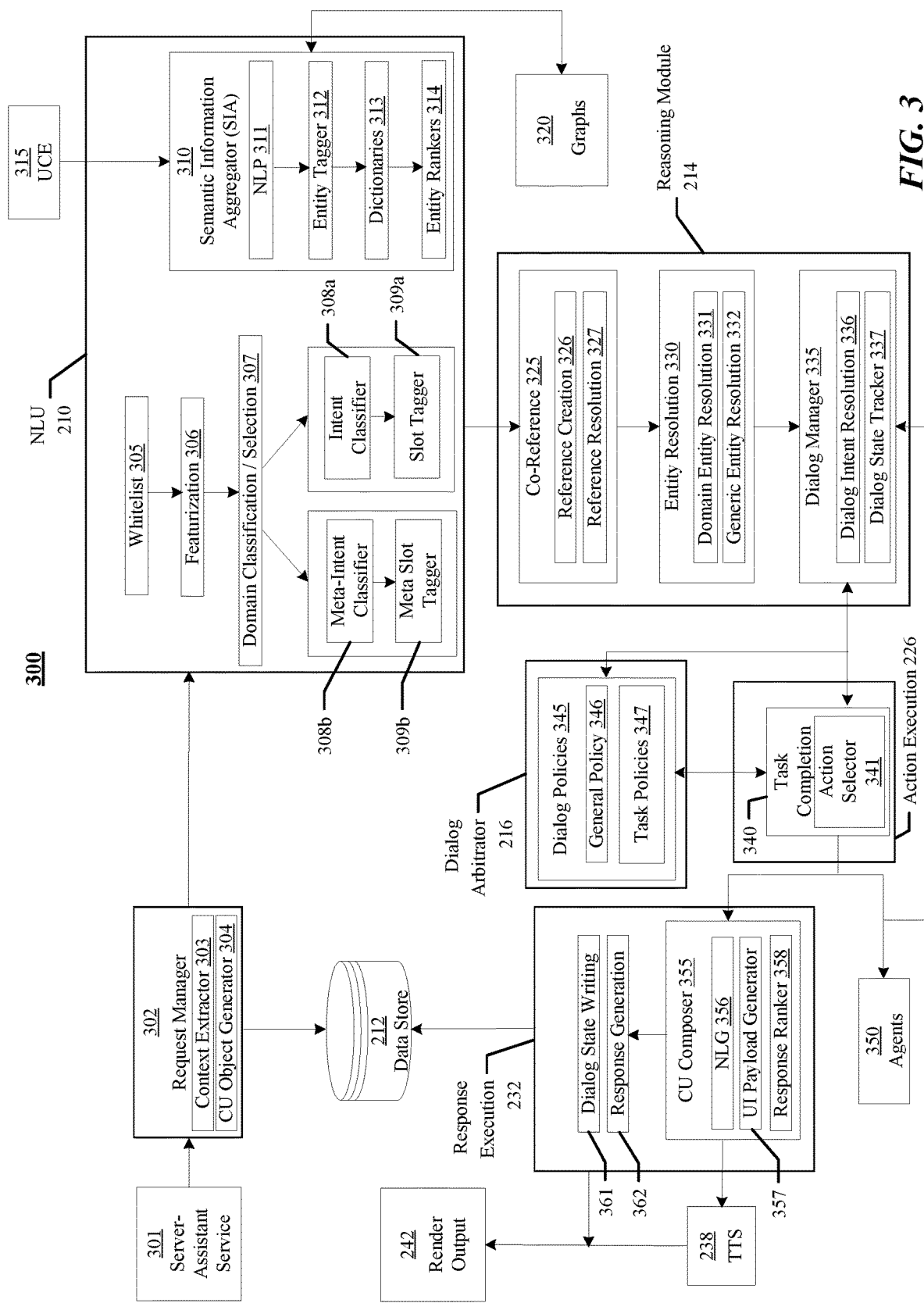
FIG. 3 illustrates an example diagram flow of server-side processes of the assistant system.

FIG. 3 illustrates an example diagram flow of server-side processes of the assistant system 140. In particular embodiments, a server-assistant service module 301 may access a request manager 302 upon receiving a user request. In alternative embodiments, the user request may be first processed by the remote ASR module 208 if the user request is based on audio signals. In particular embodiments, the request manager 302 may comprise a context extractor 303 and a conversational understanding object generator (CU object generator) 304. The context extractor 303 may extract contextual information associated with the user request. The context extractor 303 may also update contextual information based on the assistant application 136 executing on the client system 130. As an example and not by way of limitation, the update of contextual information may comprise content items are displayed on the client system 130. As another example and not by way of limitation, the update of contextual information may comprise whether an alarm is set on the client system 130. As another example and not by way of limitation, the update of contextual information may comprise whether a song is playing on the client system 130. The CU object generator 304 may generate particular content objects relevant to the user request. The content objects may comprise dialog-session data and features associated with the user request, which may be shared with all the modules of the assistant system 140. In particular embodiments, the request manager 302 may store the contextual information and the generated content objects in data store 212 which is a particular data store implemented in the assistant system 140.

In particular embodiments, the request manger 302 may send the generated content objects to the remote NLU module 210. The NLU module 210 may perform a plurality of steps to process the content objects. At step 305, the NLU module 210 may generate a whitelist for the content objects. In particular embodiments, the whitelist may comprise interpretation data matching the user request. At step 306, the NLU module 210 may perform a featurization based on the whitelist. At step 307, the NLU module 210 may perform domain classification/selection on user request based on the features resulted from the featurization to classify the user request into predefined domains. The domain classification/selection results may be further processed based on two related procedures. At step 308a, the NLU module 210 may process the domain classification/selection result using an intent classifier. The intent classifier may determine the user's intent associated with the user request. In particular embodiments, there may be one intent classifier for each domain to determine the most possible intents in a given domain. As an example and not by way of limitation, the intent classifier may be based on a machine-learning model that may take the domain classification/selection result as input and calculate a probability of the input being associated with a particular predefined intent. At step 308b, the NLU module 210 may process the domain classification/selection result using a meta-intent classifier. The meta-intent classifier may determine categories that describe the user's intent. In particular embodiments, intents that are common to multiple domains may be processed by the meta-intent classifier. As an example and not by way of limitation, the meta-intent classifier may be based on a machine-learning model that may take the domain classification/selection result as input and calculate a probability of the input being associated with a particular predefined meta-intent. At step 309a, the NLU module 210 may use a slot tagger to annotate one or more slots associated with the user request. In particular embodiments, the slot tagger may annotate the one or more slots for the n-grams of the user request. At step 309b, the NLU module 210 may use a meta slot tagger to annotate one or more slots for the classification result from the meta-intent classifier. In particular embodiments, the meta slot tagger may tag generic slots such as references to items (e.g., the first), the type of slot, the value of the slot, etc. As an example and not by way of limitation, a user request may comprise "change 500 dollars in my account to Japanese yen." The intent classifier may take the user request as input and formulate it into a vector. The intent classifier may then calculate probabilities of the user request being associated with different predefined intents based on a vector comparison between the vector representing the user request and the vectors representing different predefined intents. In a similar manner, the slot tagger may take the user request as input and formulate each word into a vector. The intent classifier may then calculate probabilities of each word being associated with different predefined slots based on a vector comparison between the vector representing the word and the vectors representing different predefined slots. The intent of the user may be classified as "changing money". The slots of the user request may comprise "500", "dollars", "account", and "Japanese yen". The meta-intent of the user may be classified as "financial service". The meta slot may comprise "finance".

In particular embodiments, the NLU module 210 may comprise a semantic information aggregator 310. The semantic information aggregator 310 may help the NLU module 210 improve the domain classification/selection of the content objects by providing semantic information. In particular embodiments, the semantic information aggregator 310 may aggregate semantic information in the following way. The semantic information aggregator 310 may first retrieve information from a user context engine 315. In particular embodiments, the user context engine 315 may comprise offline aggregators and an online inference service. The offline aggregators may process a plurality of data associated with the user that are collected from a prior time window. As an example and not by way of limitation, the data may include news feed posts/comments, interactions with news feed posts/comments, search history, etc., that are collected during a predetermined timeframe (e.g., from a prior 90-day window). The processing result may be stored in the user context engine 315 as part of the user profile. The online inference service may analyze the conversational data associated with the user that are received by the assistant system 140 at a current time. The analysis result may be stored in the user context engine 315 also as part of the user profile. In particular embodiments, both the offline aggregators and online inference service may extract personalization features from the plurality of data. The extracted personalization features may be used by other modules of the assistant system 140 to better understand user input. In particular embodiments, the semantic information aggregator 310 may then process the retrieved information, i.e., a user profile, from the user context engine 315 in the following steps. At step 311, the semantic information aggregator 310 may process the retrieved information from the user context engine 315 based on natural-language processing (NLP). In particular embodiments, the semantic information aggregator 310 may tokenize text by text normalization, extract syntax features from text, and extract semantic features from text based on NLP. The semantic information aggregator 310 may additionally extract features from contextual information, which is accessed from dialog history between a user and the assistant system 140. The semantic information aggregator 310 may further conduct global word embedding, domain-specific embedding, and/or dynamic embedding based on the contextual information. At step 312, the processing result may be annotated with entities by an entity tagger. Based on the annotations, the semantic information aggregator 310 may generate dictionaries for the retrieved information at step 313. In particular embodiments, the dictionaries may comprise global dictionary features which can be updated dynamically offline. At step 314, the semantic information aggregator 310 may rank the entities tagged by the entity tagger. In particular embodiments, the semantic information aggregator 310 may communicate with different graphs 320 including one or more of the social graph, the knowledge graph, or the concept graph to extract ontology data that is relevant to the retrieved information from the user context engine 315. In particular embodiments, the semantic information aggregator 310 may aggregate the user profile, the ranked entities, and the information from the graphs 320. The semantic information aggregator 310 may then provide the aggregated information to the NLU module 210 to facilitate the domain classification/selection.

In particular embodiments, the output of the NLU module 210 may be sent to the remote reasoning module 214. The reasoning module 214 may comprise a co-reference component 325, an entity resolution component 330, and a dialog manager 335. The output of the NLU module 210 may be first received at the co-reference component 325 to interpret references of the content objects associated with the user request. In particular embodiments, the co-reference component 325 may be used to identify an item to which the user request refers. The co-reference component 325 may comprise reference creation 326 and reference resolution 327. In particular embodiments, the reference creation 326 may create references for entities determined by the NLU module 210. The reference resolution 327 may resolve these references accurately. As an example and not by way of limitation, a user request may comprise "find me the nearest grocery store and direct me there". The co-reference component 325 may interpret "there" as "the nearest grocery store". In particular embodiments, the co-reference component 325 may access the user context engine 315 and the dialog manager 335 when necessary to interpret references with improved accuracy.

In particular embodiments, the identified domains, intents, meta-intents, slots, and meta slots, along with the resolved references may be sent to the entity resolution component 330 to resolve relevant entities. The entity resolution component 330 may execute generic and domain-specific entity resolution. In particular embodiments, the entity resolution component 330 may comprise domain entity resolution 331 and generic entity resolution 332. The domain entity resolution 331 may resolve the entities by categorizing the slots and meta slots into different domains. In particular embodiments, entities may be resolved based on the ontology data extracted from the graphs 320. The ontology data may comprise the structural relationship between different slots/meta-slots and domains. The ontology may also comprise information of how the slots/meta-slots may be grouped, related within a hierarchy where the higher level comprises the domain, and subdivided according to similarities and differences. The generic entity resolution 332 may resolve the entities by categorizing the slots and meta slots into different generic topics. In particular embodiments, the resolving may be also based on the ontology data extracted from the graphs 320. The ontology data may comprise the structural relationship between different slots/meta-slots and generic topics. The ontology may also comprise information of how the slots/meta-slots may be grouped, related within a hierarchy where the higher level comprises the topic, and subdivided according to similarities and differences. As an example and not by way of limitation, in response to the input of an inquiry of the advantages of a particular brand of electric car, the generic entity resolution 332 may resolve the referenced brand of electric car as vehicle and the domain entity resolution 331 may resolve the referenced brand of electric car as electric car.

In particular embodiments, the output of the entity resolution component 330 may be sent to the dialog manager 335 to advance the flow of the conversation with the user. The dialog manager 335 may be an asynchronous state machine that repeatedly updates the state and selects actions based on the new state. The dialog manager 335 may comprise dialog intent resolution 336 and dialog state tracker 337. In particular embodiments, the dialog manager 335 may execute the selected actions and then call the dialog state tracker 337 again until the action selected requires a user response, or there are no more actions to execute. Each action selected may depend on the execution result from previous actions. In particular embodiments, the dialog intent resolution 336 may resolve the user intent associated with the current dialog session based on dialog history between the user and the assistant system 140. The dialog intent resolution 336 may map intents determined by the NLU module 210 to different dialog intents. The dialog intent resolution 336 may further rank dialog intents based on signals from the NLU module 210, the entity resolution component 330, and dialog history between the user and the assistant system 140. In particular embodiments, instead of directly altering the dialog state, the dialog state tracker 337 may be a side-effect free component and generate n-best candidates of dialog state update operators that propose updates to the dialog state. The dialog state tracker 337 may comprise intent resolvers containing logic to handle different types of NLU intent based on the dialog state and generate the operators. In particular embodiments, the logic may be organized by intent handler, such as a disambiguation intent handler to handle the intents when the assistant system 140 asks for disambiguation, a confirmation intent handler that comprises the logic to handle confirmations, etc. Intent resolvers may combine the turn intent together with the dialog state to generate the contextual updates for a conversation with the user. A slot resolution component may then recursively resolve the slots in the update operators with resolution providers including the knowledge graph and domain agents. In particular embodiments, the dialog state tracker 337 may update/rank the dialog state of the current dialog session. As an example and not by way of limitation, the dialog state tracker 337 may update the dialog state as "completed" if the dialog session is over. As another example and not by way of limitation, the dialog state tracker 337 may rank the dialog state based on a priority associated with it.

In particular embodiments, the reasoning module 214 may communicate with the remote action execution module 226 and the dialog arbitrator 216, respectively. In particular embodiments, the dialog manager 335 of the reasoning module 214 may communicate with a task completion component 340 of the action execution module 226 about the dialog intent and associated content objects. In particular embodiments, the task completion module 340 may rank different dialog hypotheses for different dialog intents. The task completion module 340 may comprise an action selector 341. In alternative embodiments, the action selector 341 may be comprised in the dialog manager 335. In particular embodiments, the dialog manager 335 may additionally check against dialog policies 345 comprised in the dialog arbitrator 216 regarding the dialog state. In particular embodiments, a dialog policy 345 may comprise a data structure that describes an execution plan of an action by an agent 350. The dialog policy 345 may comprise a general policy 346 and task policies 347. In particular embodiments, the general policy 346 may be used for actions that are not specific to individual tasks. The general policy 346 may comprise handling low confidence intents, internal errors, unacceptable user response with retries, skipping or inserting confirmation based on ASR or NLU confidence scores, etc. The general policy 346 may also comprise the logic of ranking dialog state update candidates from the dialog state tracker 337 output and pick the one to update (such as picking the top ranked task intent). In particular embodiments, the assistant system 140 may have a particular interface for the general policy 346, which allows for consolidating scattered cross-domain policy/business-rules, especial those found in the dialog state tracker 337, into a function of the action selector 341. The interface for the general policy 346 may also allow for authoring of self-contained sub-policy units that may be tied to specific situations or clients, e.g., policy functions that may be easily switched on or off based on clients, situation, etc. The interface for the general policy 346 may also allow for providing a layering of policies with back-off, i.e. multiple policy units, with highly specialized policy units that deal with specific situations being backed up by more general policies 346 that apply in wider circumstances. In this context the general policy 346 may alternatively comprise intent or task specific policy. In particular embodiments, a task policy 347 may comprise the logic for action selector 341 based on the task and current state. In particular embodiments, there may be the following four types of task policies 347: 1) manually crafted tree-based dialog plans; 2) coded policy that directly implements the interface for generating actions; 3) configurator-specified slot-filling tasks; and 4) machine-learning model based policy learned from data. In particular embodiments, the assistant system 140 may bootstrap new domains with rule-based logic and later refine the task policies 347 with machine-learning models. In particular embodiments, a dialog policy 345 may a tree-based policy, which is a pre-constructed dialog plan. Based on the current dialog state, a dialog policy 345 may choose a node to execute and generate the corresponding actions. As an example and not by way of limitation, the tree-based policy may comprise topic grouping nodes and dialog action (leaf) nodes.

In particular embodiments, the action selector 341 may take candidate operators of dialog state and consult the dialog policy 345 to decide what action should be executed. The assistant system 140 may use a hierarchical dialog policy with general policy 346 handling the cross-domain business logic and task policies 347 handles the task/domain specific logic. In particular embodiments, the general policy 346 may pick one operator from the candidate operators to update the dialog state, followed by the selection of a user facing action by a task policy 347. Once a task is active in the dialog state, the corresponding task policy 347 may be consulted to select right actions. In particular embodiments, both the dialog state tracker 337 and the action selector 341 may not change the dialog state until the selected action is executed. This may allow the assistant system 140 to execute the dialog state tracker 337 and the action selector 341 for processing speculative ASR results and to do n-best ranking with dry runs. In particular embodiments, the action selector 341 may take the dialog state update operators as part of the input to select the dialog action. The execution of the dialog action may generate a set of expectation to instruct the dialog state tracker 337 to handler future turns. In particular embodiments, an expectation may be used to provide context to the dialog state tracker 337 when handling the user input from next turn. As an example and not by way of limitation, slot request dialog action may have the expectation of proving a value for the requested slot.

In particular embodiments, the dialog manager 335 may support multi-turn compositional resolution of slot mentions. For a compositional parse from the NLU 210, the resolver may recursively resolve the nested slots. The dialog manager 335 may additionally support disambiguation for the nested slots. As an example and not by way of limitation, the user request may be "remind me to call Alex". The resolver may need to know which Alex to call before creating an actionable reminder to-do entity. The resolver may halt the resolution and set the resolution state when further user clarification is necessary for a particular slot. The general policy 346 may examine the resolution state and create corresponding dialog action for user clarification. In dialog state tracker 337, based on the user request and the last dialog action, the dialog manager may update the nested slot. This capability may allow the assistant system 140 to interact with the user not only to collect missing slot values but also to reduce ambiguity of more complex/ambiguous utterances to complete the task. In particular embodiments, the dialog manager may further support requesting missing slots in a nested intent and multi-intent user requests (e.g., "take this photo and send it to Dad"). In particular embodiments, the dialog manager 335 may support machine-learning models for more robust dialog experience. As an example and not by way of limitation, the dialog state tracker 337 may use neural network based models (or any other suitable machine-learning models) to model belief over task hypotheses. As another example and not by way of limitation, for action selector 341, highest priority policy units may comprise white-list/black-list overrides, which may have to occur by design; middle priority units may comprise machine-learning models designed for action selection; and lower priority units may comprise rule-based fallbacks when the machine-learning models elect not to handle a situation. In particular embodiments, machine-learning model based general policy unit may help the assistant system 140 reduce redundant disambiguation or confirmation steps, thereby reducing the number of turns to execute the user request.

In particular embodiments, the action execution module 226 may call different agents 350 for task execution. An agent 350 may select among registered content providers to complete the action. The data structure may be constructed by the dialog manager 335 based on an intent and one or more slots associated with the intent. A dialog policy 345 may further comprise multiple goals related to each other through logical operators. In particular embodiments, a goal may be an outcome of a portion of the dialog policy and it may be constructed by the dialog manager 335. A goal may be represented by an identifier (e.g., string) with one or more named arguments, which parameterize the goal. As an example and not by way of limitation, a goal with its associated goal argument may be represented as {confirm artist, args: {artist: "Madonna"}}. In particular embodiments, a dialog policy may be based on a tree-structured representation, in which goals are mapped to leaves of the tree. In particular embodiments, the dialog manager 335 may execute a dialog policy 345 to determine the next action to carry out. The dialog policies 345 may comprise generic policy 346 and domain specific policies 347, both of which may guide how to select the next system action based on the dialog state. In particular embodiments, the task completion component 340 of the action execution module 226 may communicate with dialog policies 345 comprised in the dialog arbitrator 216 to obtain the guidance of the next system action. In particular embodiments, the action selection component 341 may therefore select an action based on the dialog intent, the associated content objects, and the guidance from dialog policies 345.

In particular embodiments, the output of the action execution module 226 may be sent to the remote response execution module 232. Specifically, the output of the task completion component 340 of the action execution module 226 may be sent to the CU composer 355 of the response execution module 226. In alternative embodiments, the selected action may require one or more agents 350 to be involved. As a result, the task completion module 340 may inform the agents 350 about the selected action. Meanwhile, the dialog manager 335 may receive an instruction to update the dialog state. As an example and not by way of limitation, the update may comprise awaiting agents' 350 response. In particular embodiments, the CU composer 355 may generate a communication content for the user using a natural-language generation (NLG) module 356 based on the output of the task completion module 340. In particular embodiments, the NLG module 356 may use different language models and/or language templates to generate natural language outputs. The generation of natural language outputs may be application specific. The generation of natural language outputs may be also personalized for each user. The CU composer 355 may also determine a modality of the generated communication content using the UI payload generator 357. Since the generated communication content may be considered as a response to the user request, the CU composer 355 may additionally rank the generated communication content using a response ranker 358. As an example and not by way of limitation, the ranking may indicate the priority of the response.

In particular embodiments, the response execution module 232 may perform different tasks based on the output of the CU composer 355. These tasks may include writing (i.e., storing/updating) the dialog state 361 retrieved from data store 212 and generating responses 362. In particular embodiments, the output of CU composer 355 may comprise one or more of natural-language strings, speech, actions with parameters, or rendered images or videos that can be displayed in a VR headset or AR smart glass. As a result, the response execution module 232 may determine what tasks to perform based on the output of CU composer 355. In particular embodiments, the generated response and the communication content may be sent to the local render output module 242 by the response execution module 232. In alternative embodiments, the output of the CU composer 355 may be additionally sent to the remote TTS module 238 if the determined modality of the communication content is audio. The speech generated by the TTS module 238 and the response generated by the response execution module 232 may be then sent to the render output module 242.

Figure 4:
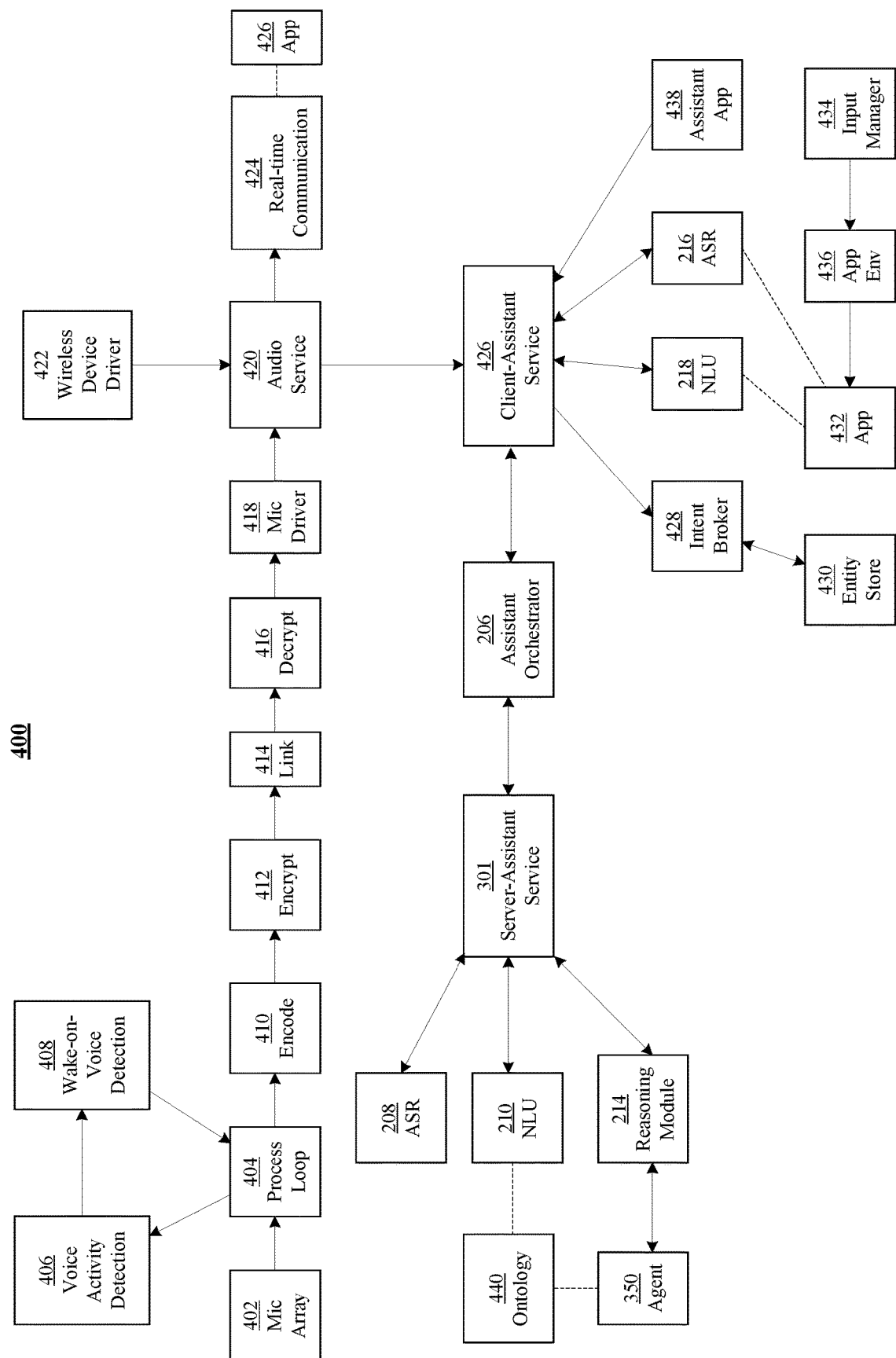
FIG. 4 illustrates an example diagram flow of processing a user input by the assistant system.

FIG. 4 illustrates an example diagram flow of processing a user input by the assistant system 140. As an example and not by way of limitation, the user input may be based on audio signals. In particular embodiments, a mic array 402 of the client system 130 may receive the audio signals (e.g., speech). The audio signals may be transmitted to a process loop 404 in a format of audio frames. In particular embodiments, the process loop 404 may send the audio frames for voice activity detection (VAD) 406 and wake-on-voice (WoV) detection 408. The detection results may be returned to the process loop 404. If the WoV detection 408 indicates the user wants to invoke the assistant system 140, the audio frames together with the VAD 406 result may be sent to an encode unit 410 to generate encoded audio data. After encoding, the encoded audio data may be sent to an encrypt unit 412 for privacy and security purpose, followed by a link unit 414 and decrypt unit 416. After decryption, the audio data may be sent to a mic driver 418, which may further transmit the audio data to an audio service module 420. In alternative embodiments, the user input may be received at a wireless device (e.g., Bluetooth device) paired with the client system 130. Correspondingly, the audio data may be sent from a wireless-device driver 422 (e.g., Bluetooth driver) to the audio service module 420. In particular embodiments, the audio service module 420 may determine that the user input can be fulfilled by an application executing on the client system 130. Accordingly, the audio service module 420 may send the user input to a real-time communication (RTC) module 424. The RTC module 424 may deliver audio packets to a video or audio communication system (e.g., VOIP or video call). The RTC module 424 may call a relevant application (App) 426 to execute tasks related to the user input.

In particular embodiments, the audio service module 420 may determine that the user is requesting assistance that needs the assistant system 140 to respond. Accordingly, the audio service module 420 may inform the client-assistant service module 426. In particular embodiments, the client-assistant service module 426 may communicate with the assistant orchestrator 206. The assistant orchestrator 206 may determine whether to use client-side processes or server-side processes to respond to the user input. In particular embodiments, the assistant orchestrator 206 may determine to use client-side processes and inform the client-assistant service module 426 about such decision. As a result, the client-assistant service module 426 may call relevant modules to respond to the user input.

In particular embodiments, the client-assistant service module 426 may use the local ASR module 216 to analyze the user input. The ASR module 216 may comprise a grapheme-to-phoneme (G2P) model, a pronunciation learning model, a personalized language model (PLM), an end-pointing model, and a personalized acoustic model. In particular embodiments, the client-assistant service module 426 may further use the local NLU module 218 to understand the user input. The NLU module 218 may comprise a named entity resolution (NER) component and a contextual session-based NLU component. In particular embodiments, the client-assistant service module 426 may use an intent broker 428 to analyze the user's intent. To be accurate about the user's intent, the intent broker 428 may access an entity store 430 comprising entities associated with the user and the world. In alternative embodiments, the user input may be submitted via an application 432 executing on the client system 130. In this case, an input manager 434 may receive the user input and analyze it by an application environment (App Env) module 436. The analysis result may be sent to the application 432 which may further send the analysis result to the ASR module 216 and NLU module 218. In alternative embodiments, the user input may be directly submitted to the client-assistant service module 426 via an assistant application 438 executing on the client system 130. Then the client-assistant service module 426 may perform similar procedures based on modules as aforementioned, i.e., the ASR module 216, the NLU module 218, and the intent broker 428.

In particular embodiments, the assistant orchestrator 206 may determine to user server-side process. Accordingly, the assistant orchestrator 206 may send the user input to one or more computing systems that host different modules of the assistant system 140. In particular embodiments, a server-assistant service module 301 may receive the user input from the assistant orchestrator 206. The server-assistant service module 301 may instruct the remote ASR module 208 to analyze the audio data of the user input. The ASR module 208 may comprise a grapheme-to-phoneme (G2P) model, a pronunciation learning model, a personalized language model (PLM), an end-pointing model, and a personalized acoustic model. In particular embodiments, the server-assistant service module 301 may further instruct the remote NLU module 210 to understand the user input. In particular embodiments, the server-assistant service module 301 may call the remote reasoning model 214 to process the output from the ASR module 208 and the NLU module 210. In particular embodiments, the reasoning model 214 may perform entity resolution and dialog optimization. In particular embodiments, the output of the reasoning model 314 may be sent to the agent 350 for executing one or more relevant tasks.

In particular embodiments, the agent 350 may access an ontology module 440 to accurately understand the result from entity resolution and dialog optimization so that it can execute relevant tasks accurately. The ontology module 440 may provide ontology data associated with a plurality of predefined domains, intents, and slots. The ontology data may also comprise the structural relationship between different slots and domains. The ontology data may further comprise information of how the slots may be grouped, related within a hierarchy where the higher level comprises the domain, and subdivided according to similarities and differences. The ontology data may also comprise information of how the slots may be grouped, related within a hierarchy where the higher level comprises the topic, and subdivided according to similarities and differences. Once the tasks are executed, the agent 350 may return the execution results together with a task completion indication to the reasoning module 214.

The embodiments disclosed herein may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

User Controlled Task Execution with Task Persistence

In particular embodiment, the assistant system 140 may enable users to control a task flow by various suspending and resuming commands via a dialog session with the assistant system 140. The assistant system 140 may support task persistence, based on which a user may be able to re-start a suspended task at a later time. A user may use various commands in different modalities (e.g., voice commands, gesture commands) to suspend an ongoing task flow. As an example and not by way of limitation, the suspend command may be verbal, such as "hold on", "I will be right back", or "give me a minute", or the may be a gesture, such as the user holding up their hand with the palm out and fingers up in a stop gesture. After receiving such commands, the assistant system 140 may save the current dialog state of the task in a data store. Later when the user wants to resume the task flow, the assistant system 140 may check the dialog history including the stored dialog state to retrieve the suspended task and resume from there. Similarly, a user may resume previously suspended tasks with various commands. As an example and not by way of limitation, the resume command may be verbal, such as "where were we?", "let's go back previous task", "let's continue previous dialog", "I am back", or may be a gesture, such as the user raising their hand with the palm up and fingers flat in a start gesture. Maintaining task persistence may be useful for the following scenarios. Firstly, when users interact with the assistant system 140, they sometimes get stressed that they have to do everything right and get everything ready in one dialog session. A natural conservation should give users freedom to stop a conversation and resume it later in a subsequent session with the assistant. Secondly, users may need additional time to complete a task, e.g., the users get interrupted. Thirdly, users may need additional information to complete a task, e.g., users may want to ask someone for opinions or gather additional information from other resources. As an example and not by way of limitation, when a user is in a conversation with the assistant system 140 for setting up a meeting, the user may need to check his/her calendar or check with someone else's schedule before completing the setup of the meeting. Although this disclosure describes maintaining particular task persistence by particular systems in a particular manner, this disclosure contemplates maintaining any suitable task persistence by any suitable system in any suitable manner.

In particular embodiments, the assistant system 140 may receive, from a client system 130 associated with a user, a first user request to execute a first task comprising one or more sub-tasks. The assistant system 140 may then receive, from the client system 130, a second user request to suspend the first task. In particular embodiments, the assistant system 140 may store a dialog state for the first task in response to the second user request. The dialog state may comprise results of executed sub-tasks and a status indicating the first task is suspended. In particular embodiments, the assistant system 140 may receive a third user request to resume the first task. The assistant system 140 may then access the dialog state for the first task. In particular embodiments, the assistant system 140 may further provide, at the client system 130, a prompt to resume the first task.

In particular embodiments, the assistant system 140 may support different types of task persistence. As an example and not by way of limitation, one type may be task persistence based on suspending a task and resuming the task in a later time. Under such condition, the assistant system 140 may execute one or more of the one or more sub-tasks of the first task. The assistant system 140 may execute the remaining sub-tasks when resuming the first task in a later time. As another example and not by way of limitation, one type may be task persistence based on suspending a first task, switching to a second task which is different from the first task, and resuming the first task in a later time. Under such condition, the assistant system 140 may receive, from the client system 130, a fourth user request to execute a second task. The assistant system 140 may then execute the second task. In particular embodiments, the assistant system 140 may further resume the first task based on execution results of the second task. As a result, the assistant system 140 may have a technical advantage of enhancing user control of task execution as the user may be able to easily suspend a task and resume the task without starting it all over, thereby improving user experience with the assistant system 140. Although this disclosure describes particular task persistence in a particular manner, this disclosure contemplates any suitable task persistence in any suitable manner.

In particular embodiments, the following example scenarios may be supported for task persistence. As an example and not by way of limitation, when a user asks the assistant system 140 to call a person, the user may suspend such task since he/she may want to verify the contact is correct or realize this is not a good time to call. The user may resume the call after verifying the contact or at a better time. As another example and not by way of limitation, when booking a trip using the assistant system 140, the user may suspend such task as he/she may want to check his/her calendar or compare the price with other travel agents. The user may be able to save the task at any time and come back at any time to continue booking the trip later. Although this disclosure describes particular task persistence scenarios in a particular manner, this disclosure contemplates any suitable task persistence scenario in any suitable manner.

In particular embodiments, the assistant system 140 may support multi-modal user requests for controlling a task flow. As an example and not by way of limitation, the first, second, or third user requests may be based on one or more of a textual input, an image input, a video input, an audio input, or a gesture input. In particular embodiments, the assistant system 140 may use the NLU module 210 to determine the suspending intent and resuming intent. Various utterances from users (e.g., "hold on") may be used to train models in the NLU module 210 for determining such intents. In particular embodiments, the assistant system 140 may determine, by a natural-language understanding module 210, the second user request is associated with a meta-intent to suspend the first task. The assistant system 140 may determine, by the natural-language understanding module 210, the third user request is associated with a meta-intent to resume the first task. In particular embodiments, meta-intents may include resume, suspend, next, previous, cancel, repeat, summarize, etc. In addition, meta-intents may cross different domains. Unlike normal intents, which are used to determine which tasks/agents should be executed, meta-intents may be used to determine how the tasks are handled by the assistant system 140 (e.g., to control the dialog intent, handle current processing of a task, or provide slot values). Training models based on various utterances from users for determining suspending/resuming intents may be an effective solution for addressing the technical challenge of accurately identifying a user request as suspending/resuming a task, since these utterances may provide reliable data for training models that are particularly used for determining user's suspending/resuming requests. In particular embodiments, when saving an unfinished task after receiving a user's suspending request, the task may be assigned a name. In addition, a slot for the name of the task may be allocated, based on which the NLU module 210 may be able to identify a to-be-resumed task based on the user's resuming request. Alternatively, the NLU module 210 may support task identifier (ID), which means the NLU module 210 may identify the task ID for a suspended task and also identify the task ID for a to-be-resumed task. Although this disclosure describes determining particular intents by particular systems in a particular manner, this disclosure contemplates determining any suitable intent by any suitable system in any suitable manner.

In particular embodiments, the assistant system 140 may determine, based on a current dialog state and contextual information associated with the second user request, that the first task is associated with the second user request. As an example and not by way of limitation, the first task may be buying chocolate as a gift. The current dialog state and contextual information may indicate that the user is also checking other options such as flowers. As a result, when receiving the second user request, the assistant system 140 may determine it to be associated with the first task as the user may have changed his/her mind to buy flowers instead. In particular embodiments, the assistant system 140 may determine, based on a current dialog state and contextual information associated with the third user request, that the suspended first task is associated with the third user request. As an example and not by way of limitation, the suspended first task may be making a lunch reservation with a coworker. The current dialog state and contextual information may indicate that the user is asking about the coworker's schedule. As a result, when receiving the third user request, the assistant system 140 may determine it to be associated with the suspended first task as the user may validated with the assistant system 140 that the coworker is available for lunch. Using current dialog states and contextual information associated with subsequent user requests after a user request for a task may be effective solutions for addressing the technical challenge of accurately determining whether these subsequent user requests are associated with the suspended task, as current dialog states and contextual information may provide information of the connection between the user's current interaction with the assistant system 140 and the previous task. Although this disclosure describes determining particular tasks are associated with particular user requests by particular systems in a particular manner, this disclosure contemplates determining any suitable task is associated with any suitable user request by any suitable system in any suitable manner.

In particular embodiments, the assistant system 140 may store the dialog state for the first task as follows. The assistant system 140 may allocate a particular portion of the dialog state to the first task. The particular portion may be associated with one or more of a task identifier or a task name associated with the first task. Accordingly, accessing the dialog state for the first task may comprise the following steps. The assistant system 140 may first identify the particular portion of the dialog state based on one or more of the task identifier or the task name associated with the first task. The assistant system 140 may then retrieve the particular portion of the stored dialog state. In particular embodiments, the retrieved portion may comprise the dialog state for the first task. In particular embodiments, the dialog state for the first task may be stored in a dialog state stack. The structure of the dialog state may be that within the dialog state stack different dialog states are stacked based on their respective priorities. Therefore, the storing of the dialog state in the dialog state stack may be based on a priority associated with the first task. As an example and not by way of limitation, an ongoing task may have a higher priority than a suspended task. The dialog state stack may prevent the assistant system 140 from automatically going back to a previously suspended task. Instead, the assistant system 140 may check the dialog state stack and retrieve a previously suspended task if it is on top of the dialog state stack. In particular embodiments, when a user comes back to interact with the assistant system 140, the assistant system may take the initiative to remind the user about the suspended task after checking the dialog state stack. Storing the dialog state for the suspended task with task identifier or task name and storing the dialog state in a dialog state based on the priority of the suspended task may be effective solutions for addressing the technical challenge of efficiently resuming a suspended task, since the task identifier, task name, or priority may help the assistant system 140 efficiently locate the dialog state of the suspended task, which may further speed up the execution of the remaining sub-tasks. Although this disclosure describes storing particular dialog states by particular systems in a particular manner, this disclosure contemplates storing any suitable dialog state by any suitable system in any suitable manner.

In particular embodiments, the assistant system 140 may additionally use different task policies to achieve the goal of task persistence. In particular embodiments, storing the dialog state for the first task may be based on one or more task policies. As an example and not by way of limitation, for the reminder task, the task policy may specify that storing the dialog state for such task may have lower priority in a dialog state stack. Similarly, accessing the dialog state for the first task may be based on one or more task policies. Continuing with the previous example, when accessing the dialog state for the reminder task, the assistant system 140 may start searching for it from the bottom of the dialog state based on the task policy which specifies that the reminder task may have lower priority. Some other task policies may allow users to start new tasks after a task is suspended. In particular embodiments, the assistant system 140 may determine, based on one or more of contextual information associated with the user or a policy associated with the first task, that the user needs to be reminded of the suspended task. As an example and not by way of limitation, the contextual information may indicate that the user hasn't interacted with the assistant system 140 regarding a suspended task for over a threshold amount of time. Accordingly, the assistant system 140 may determine to remind to the user about such task. As another example and not by way of limitation, a policy associated with flight-booking task may require the assistant system 140 to remind the user as the price varies from time to time and the assistant system 140 should help the user lock down the best deal. In particular embodiments, the assistant system 140 may then provide a notification reminding the user of the suspended first task. The assistant system 140 may also determine when or how to remind the user to resume a suspended task. As an example and not by way of limitation, the assistant system 140 may determine to remind the user right after the user restarts interacting with the assistant system 140 or in 10 minutes after the user restarts interacting with the assistant system 140. As another example and not by way of limitation, the assistant system 140 may determine to remind the user by text, voice, image, video, AR/VR overlay, or any suitable manner. Although this disclosure describes using particular policies by particular systems in a particular manner, this disclosure contemplates using any suitable policy by any suitable system in any suitable manner.

In particular embodiments, when saving a dialog state, the assistant system 140 may use a natural-language generation (NLG) module 356 to generate a notification notifying a user what task is suspended so the user can resume it later. As an example and not by way of limitation, the notification may be "I'm saving the unfinished flight booking for you." In particular embodiments, the assistant system 140 may remind the user about a suspended task via a prompt. In particular embodiments, the prompt may comprise a summary of the first task. As an example and not by way of limitation, the summary may indicate which stage the user was at regarding the suspended task and the current status of the suspended task. As an example and not by way of limitation, the summary may be "we were making a dinner reservation for you. You already selected the restaurant but no the time yet." In particular embodiments, the summary may be generated based on the accessed dialog state. As an example and not by way of limitation, the accessed dialog state may comprise information regarding which stage the user was. In particular embodiments, the summary may have different levels of sophistication. At the minimum level, the summary may repeat last response generated by the assistant system 140. More sophisticatedly, the summary may be generated by a natural-language generation (NLG) module 356 based on one or more of a language-template or a language model. In particular embodiments, the NLG module 356 may further use a generic dialog act or a task-specific act so the summary may be more meaningful. As an example and not by way of limitation, when booking a flight, a user may suspend the task when trying to determine the dates. Later when the user determines to resume the suspended task, the NLG module 356 may generate a summary like "we were helping you choose the dates for your flight." Although this disclosure describes generating particular summaries by particular systems in a particular manner, this disclosure contemplates generating any suitable summary by any suitable system in any suitable manner.

In particular embodiments, the assistant system 140 may proactively keep track of a suspended task and carry out different actions regarding it. The assistant system 140 may constantly perform context tracking, assistant state tracking (AST), and dialog state tracking (DST). For assistant state tracking, the assistant system 140 may assign a new task operator to load the suspended dialog state and update it based on the current dialog state. The assistant system may also assign a new task operator to save the dialog state, allowing the suspended task to be resumed in the future. In particular embodiments, the assistant system 140 may set a time-to-leave for a dialog state to deprecate a task. The time-to-leave may determine how long a suspended task should be saved. As an example and not by way of limitation, the time-to-leave may be one day. If after one day the suspended task is still in the suspending status, the assistant system 140 may delete it. In particular embodiments, the assistant system 140 may use a proactive agent to remind users of suspended tasks. Although this disclosure describes tracking particular tasks by particular systems in a particular manner, this disclosure contemplates tracking any suitable task by any suitable system in any suitable manner.

In particular embodiments, the assistant system 140 may generate a task-function based on the suspension and resuming of the first task. Such task-function may be reusable, which indicates that the associated task can be saved and reused repeatedly. The task-function may be associated with a task ID. In particular embodiments, the task-function may comprise one or more default intents and one or more slot-values for one or more slots associated with the first task, respectively. The task-function may be also associated with a task alias. In particular embodiments, the assistant system 140 may receive a user call from the user. The user call may comprise the task alias. In particular embodiments, the assistant system 140 may then provide a summary of the task-function based on the default intents and the slot-values. The assistant system 140 may further execute the first task based on the default intents and the slot-values upon receiving a confirmation from the user. When a task-function is loaded, the assistant system 140 may notify a user with a summary of the task. The user may still be able to update the task-function by revising slots associated with the task. As an example and not by way of limitation, a user may create a task-function for pizza ordering, for which the assistant system 140 may save the task together with information such as pizza size, topping, drinks, etc. Later the user can ask the assistant system 140 to load the task and execute it. The user may also choose to update some slots such as topping (i.e., the user wants to change the topping). As a result, the assistant system 140 may have a technical advantage of improving efficiency for responding to a user request for a task as the assistant system 140 may create a task-function for the user based on the user's prior interactions with the assistant system, which may be easily called by the user for execution based on a task identifier. Although this disclosure describes generating particular task-functions by particular systems in a particular manner, this disclosure contemplates generating any suitable task-function by any suitable system in any suitable manner.

In particular embodiments, the assistant system 140 may allow a user to create a reusable session. A reusable session may include multiple tasks. The assistant system 140 may save task IDs for all these tasks and also a session ID. In this way, users may be able to customize their own macros via natural conversations with the assistant system 140. A macro may be defined as a sequence of tasks. When a reusable session is loaded, the assistant system 140 may notify users with a summary of the session. Users can still update the session by revising some slots. As an example and not by way of limitation, a user may define a personalized "good night" session including tasks such as closing curtains, turning off lights, playing some music, etc. As a result, the assistant system 140 may have a technical advantage of improving efficiency for responding to a user request for multiple tasks as the assistant system 140 may create a reusable session including these tasks for the user based on the user's prior interactions with the assistant system 140, which may be easily called by the user for execution based on a session identifier. Although this disclosure describes creating particular sessions by particular systems in a particular manner, this disclosure contemplates creating any suitable session by any suitable system in any suitable manner.

Figure 5A:
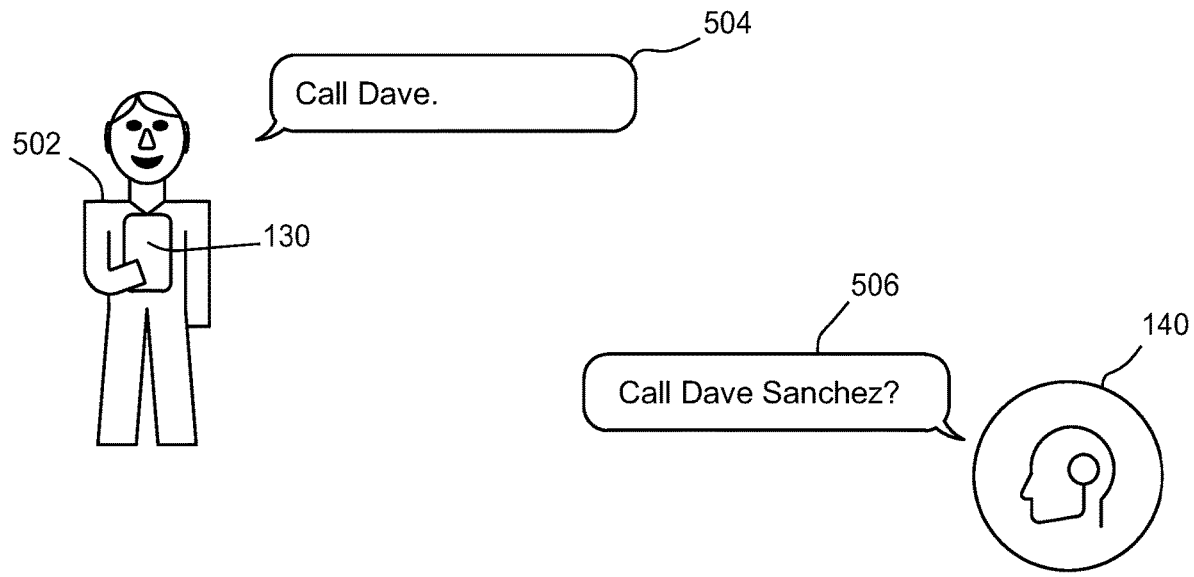
FIG. 5A illustrates an example user request for a calling task.
Figure 5B:
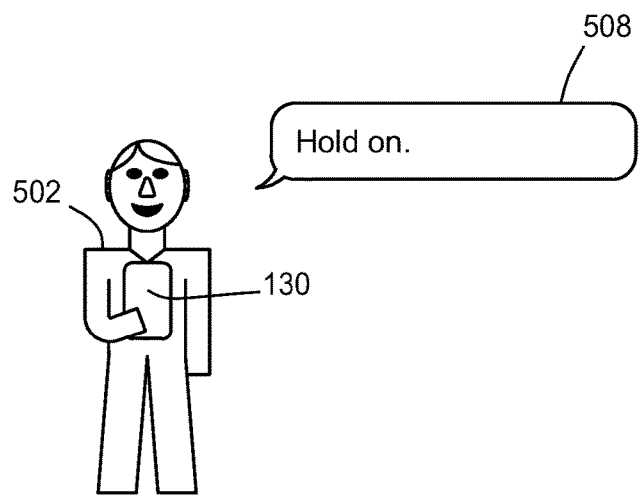
FIG. 5B illustrates an example user request to suspend the calling task.
Figure 5C:
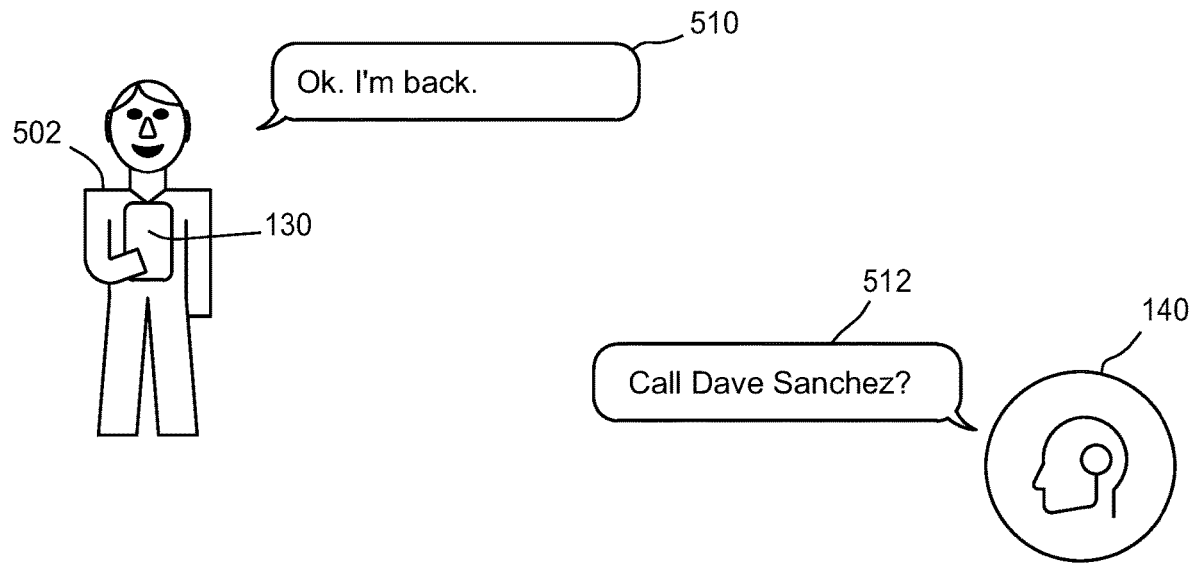
FIG. 5C illustrates an example reminder reminding the user about the suspended task.
Figure 5D:
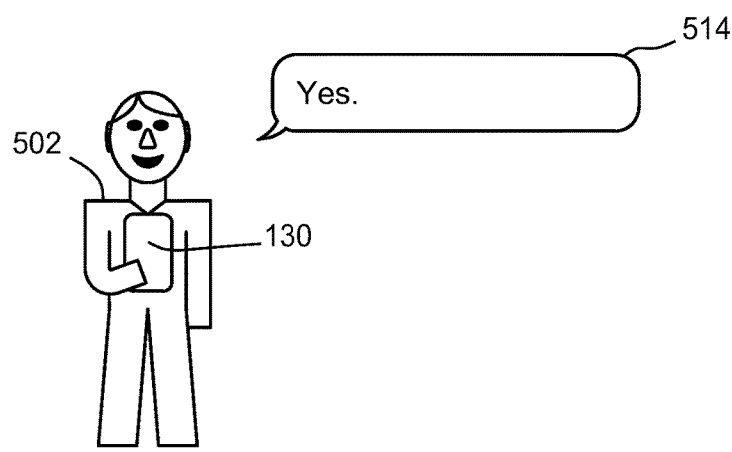
FIG. 5D illustrates an example confirmation from a user to resume a suspended task.

FIGS. 5A-5D illustrate an example scenario of task persistence supported by the assistant system 140. FIG. 5A illustrates an example user request for a calling task. In FIG. 5A, a user 502 may be interacting with the assistant system 140 via his client system 130. The user 502 may submit a request 504 as "call Dave." Responsive to the user request 504, the assistant system 140 may first determine that the user intended to call Dave Sanchez and then generate a confirmation request 506 as "call Dave Sanchez?" FIG. 5B illustrates an example user request to suspend the calling task. In FIG. 5B, after the assistant system 140 generates the confirmation request 506, the user 502 may submit a request 508 as "hold on", which aims to suspend the calling task. After that, the user 502 may stop the interaction with the assistant system 140. FIG. 5C illustrates an example reminder reminding the user about the suspended task. In FIG. 5C, the user 502 may continue the interaction with the assistant system 140. The user 502 may say "ok. I'm back" 510. The assistant system 140 may then determine to remind the user 502 about the previously suspended calling task. The reminder 512 may be "call Dave Sanchez?" FIG. 5D illustrates an example confirmation from a user to resume a suspended task. In FIG. 5D, after receiving the reminder 512, the user may say "yes" 514 as a confirmation to resume the calling task. Although this disclosure describes particular scenarios for task persistence in a particular manner, this disclosure contemplates any suitable scenario for task persistence in any suitable manner.

Figure 6A:
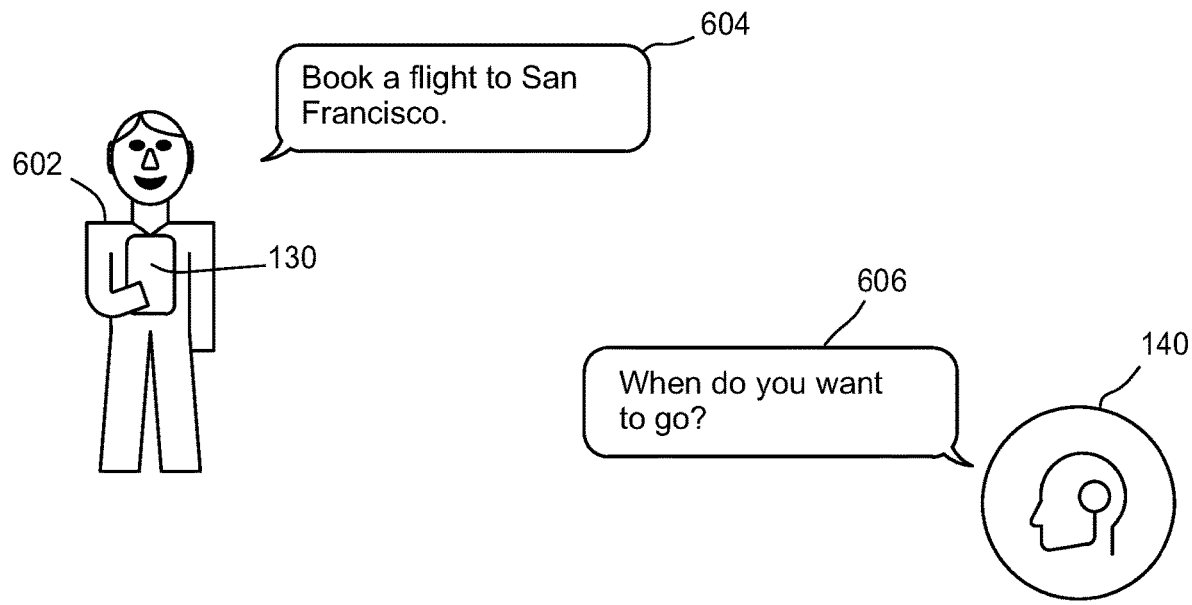
FIG. 6A illustrates an example user request for a flight-booking task.
Figure 6B:
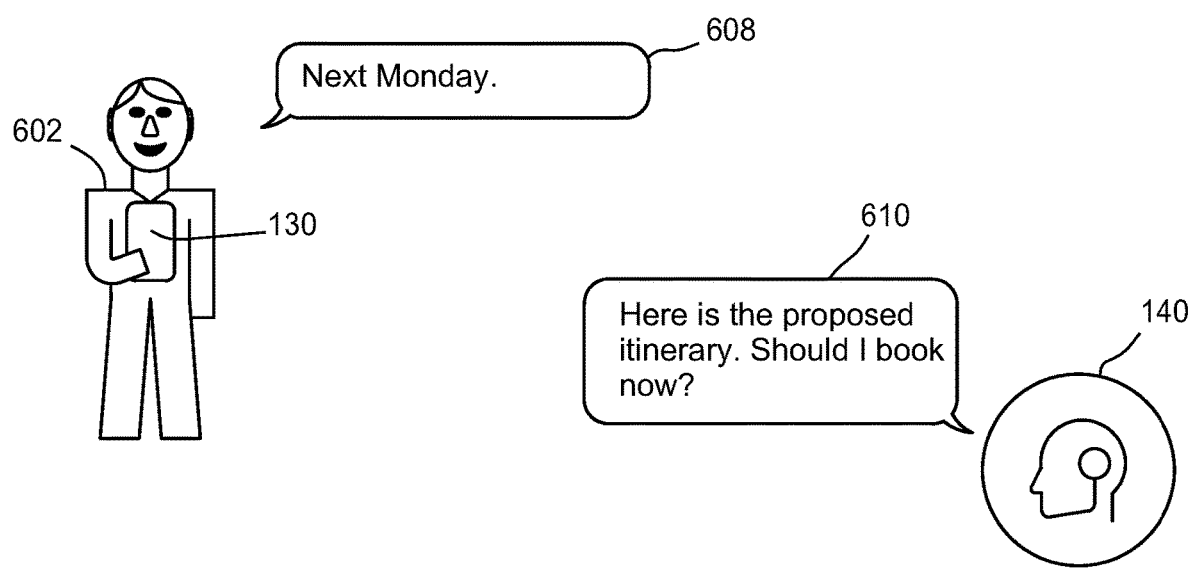
FIG. 6B illustrates an example user response to a question from the assistant system.
Figure 6C:
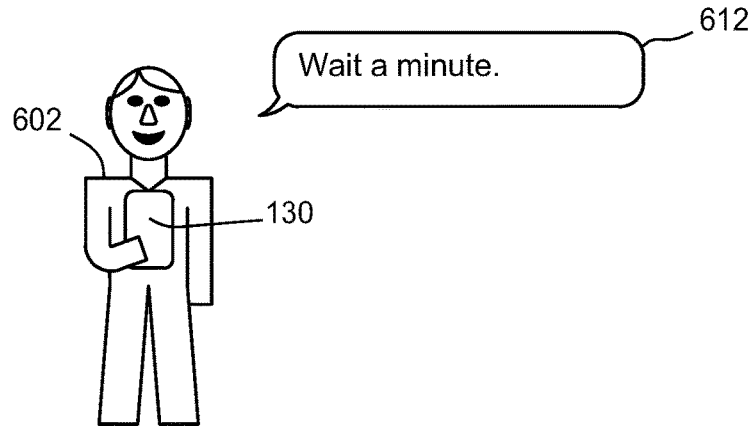
FIG. 6C illustrates an example user request to suspend the flight-booking task.
Figure 6D:
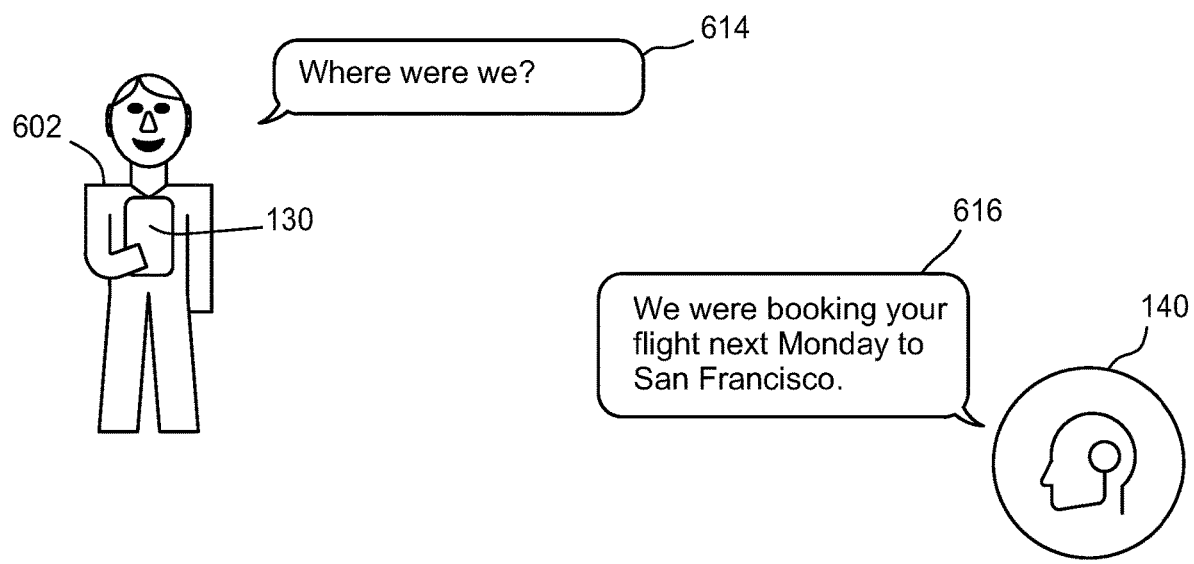
FIG. 6D illustrates an example user request to resume the flight-booking task.
Figure 6E:
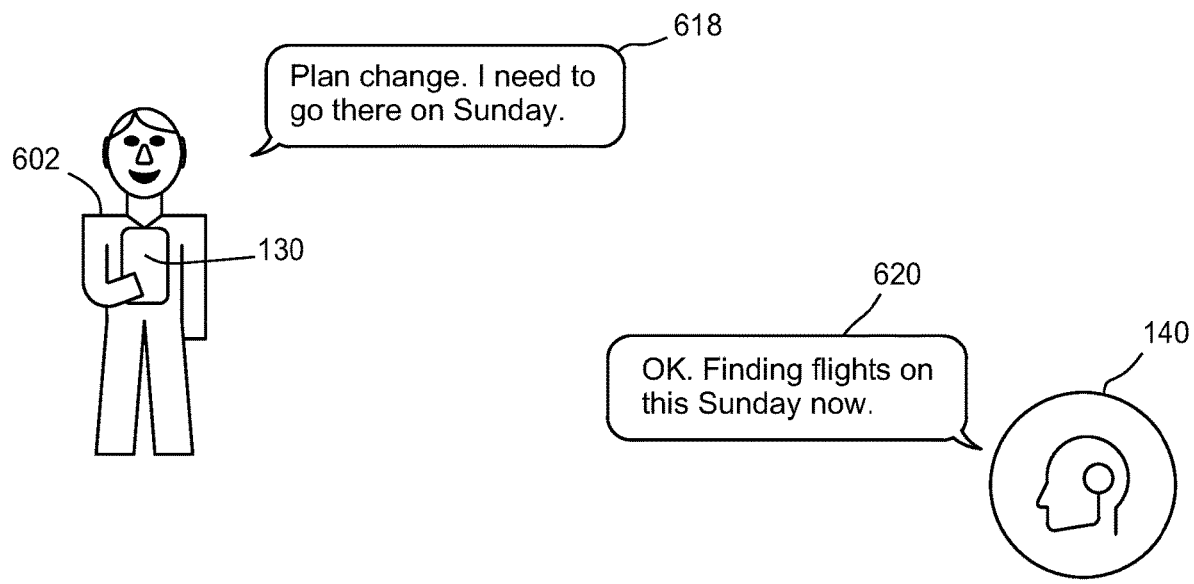
FIG. 6E illustrates an example user request to change the task.

FIGS. 6A-6E illustrate another example scenario of task persistence supported by the assistant system 140. FIG. 6A illustrates an example user request for a flight-booking task. In FIG. 6A, a user 602 may be interacting with the assistant system 140 via his client system 130. The user 602 may submit a request 604 as "book a flight to San Francisco." Responsive to the user request 604, the assistant system 140 may need more information from the user 602. Therefore, the assistant system 140 may generate a question 606 as "when do you want to go?" FIG. 6B illustrates an example user response to a question from the assistant system 140. In FIG. 6B, the user 602 may reply "next Monday" 608. Based on the reply 608, the assistant system 140 may search online and determine an itinerary for the user 602. The assistant system 140 may then generate a confirmation request 610 as "here is the proposed itinerary. Should I book now?" FIG. 6C illustrates an example user request to suspend the flight-booking task. In FIG. 6C, after the assistant system 140 generates the confirmation request 610, the user 602 may submit a request 612 as "wait a minute", which aims to suspend the flight-booking task. After that, the user 602 may stop the interaction with the assistant system 140. FIG. 6D illustrates an example user request to resume the flight-booking task. In FIG. 6D, the user 602 may continue the interaction with the assistant system 140. The user 602 may say "where were we?" 614, which may be determined by the assistant system 140 as an intent to resume the previously suspended flight-booking task. The assistant system 140 may further generate a summary 616 about the suspended flight-booking task. The summary 616 may be "we were booking your flight next Monday to San Francisco." FIG. 6E illustrates an example user request to change the task. In FIG. 6E, after receiving the summary 616, the user 602 may change the details of the flight-booking task. The user 602 may want to change the date and say "plan change. I need to go there on Sunday" 618. Responsive to the new user request 618, the assistant system 140 may generate a response 620 as "ok. Finding flights on this Sunday now." Although this disclosure describes particular scenarios for task persistence in a particular manner, this disclosure contemplates any suitable scenario for task persistence in any suitable manner.

Figure 7:
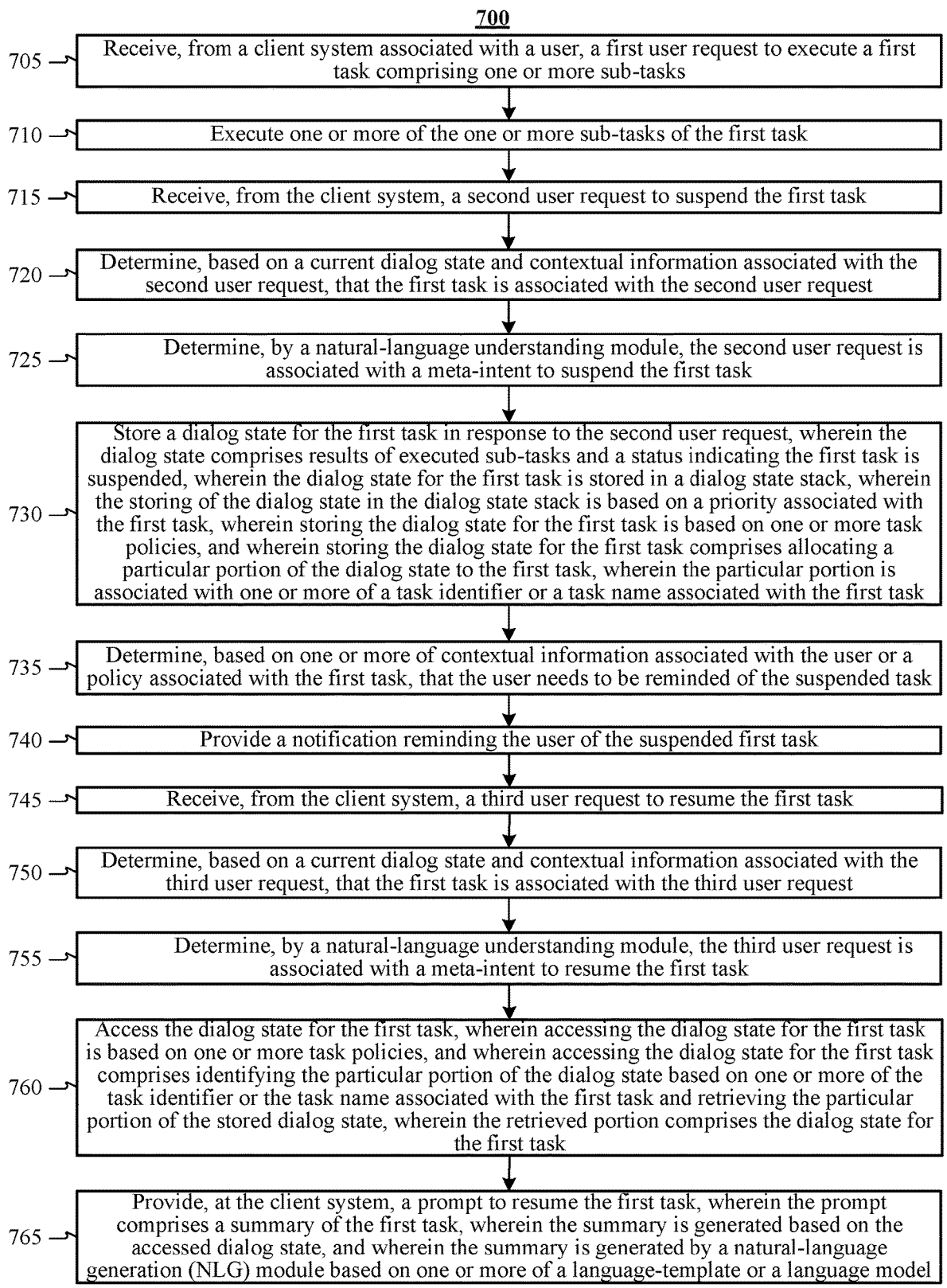
FIG. 7 illustrates an example method for achieving task persistence.

FIG. 7 illustrates an example method 700 for achieving task persistence. The method may begin at step 705, where the assistant system 140 may receive, from a client system 130 associated with a user, a first user request to execute a first task comprising one or more sub-tasks. At step 710, the assistant system 140 may execute one or more of the one or more sub-tasks of the first task. At step 715, the assistant system 140 may receive, from the client system 130, a second user request to suspend the first task. At step 720, the assistant system 140 may determine, based on a current dialog state and contextual information associated with the second user request, that the first task is associated with the second user request. At step 725, the assistant system 140 may determine, by a natural-language understanding module 210, the second user request is associated with a meta-intent to suspend the first task. At step 730, the assistant system 140 may store a dialog state for the first task in response to the second user request, wherein the dialog state comprises results of executed sub-tasks and a status indicating the first task is suspended, wherein the dialog state for the first task is stored in a dialog state stack, wherein the storing of the dialog state in the dialog state stack is based on a priority associated with the first task, wherein storing the dialog state for the first task is based on one or more task policies, and wherein storing the dialog state for the first task comprises allocating a particular portion of the dialog state to the first task, wherein the particular portion is associated with one or more of a task identifier or a task name associated with the first task. At step 735, the assistant system 140 may determine, based on one or more of contextual information associated with the user or a policy associated with the first task, that the user needs to be reminded of the suspended task. At step 740, the assistant system 140 may provide a notification reminding the user of the suspended first task. At step 745, the assistant system 140 may receive, from the client system 130, a third user request to resume the first task. At step 750, the assistant system 140 may determine, based on a current dialog state and contextual information associated with the third user request, that the first task is associated with the third user request. At step 755, the assistant system 140 may determine, by a natural-language understanding module 210, the third user request is associated with a meta-intent to resume the first task. At step 760, the assistant system 140 may access the dialog state for the first task, wherein accessing the dialog state for the first task is based on one or more task policies, and wherein accessing the dialog state for the first task comprises identifying the particular portion of the dialog state based on one or more of the task identifier or the task name associated with the first task and retrieving the particular portion of the stored dialog state, wherein the retrieved portion comprises the dialog state for the first task. At step 765, the assistant system 140 may provide, at the client system 130, a prompt to resume the first task, wherein the prompt comprises a summary of the first task, wherein the summary is generated based on the accessed dialog state, and wherein the summary is generated by a natural-language generation (NLG) module based on one or more of a language-template or a language model. Particular embodiments may repeat one or more steps of the method of FIG. 7, where appropriate. Although this disclosure describes and illustrates particular steps of the method of FIG. 7 as occurring in a particular order, this disclosure contemplates any suitable steps of the method of FIG. 7 occurring in any suitable order. Moreover, although this disclosure describes and illustrates an example method for achieving task persistence including the particular steps of the method of FIG. 7, this disclosure contemplates any suitable method for achieving task persistence including any suitable steps, which may include all, some, or none of the steps of the method of FIG. 7, where appropriate. Furthermore, although this disclosure describes and illustrates particular components, devices, or systems carrying out particular steps of the method of FIG. 7, this disclosure contemplates any suitable combination of any suitable components, devices, or systems carrying out any suitable steps of the method of FIG. 7.

Social Graphs

Figure 8:
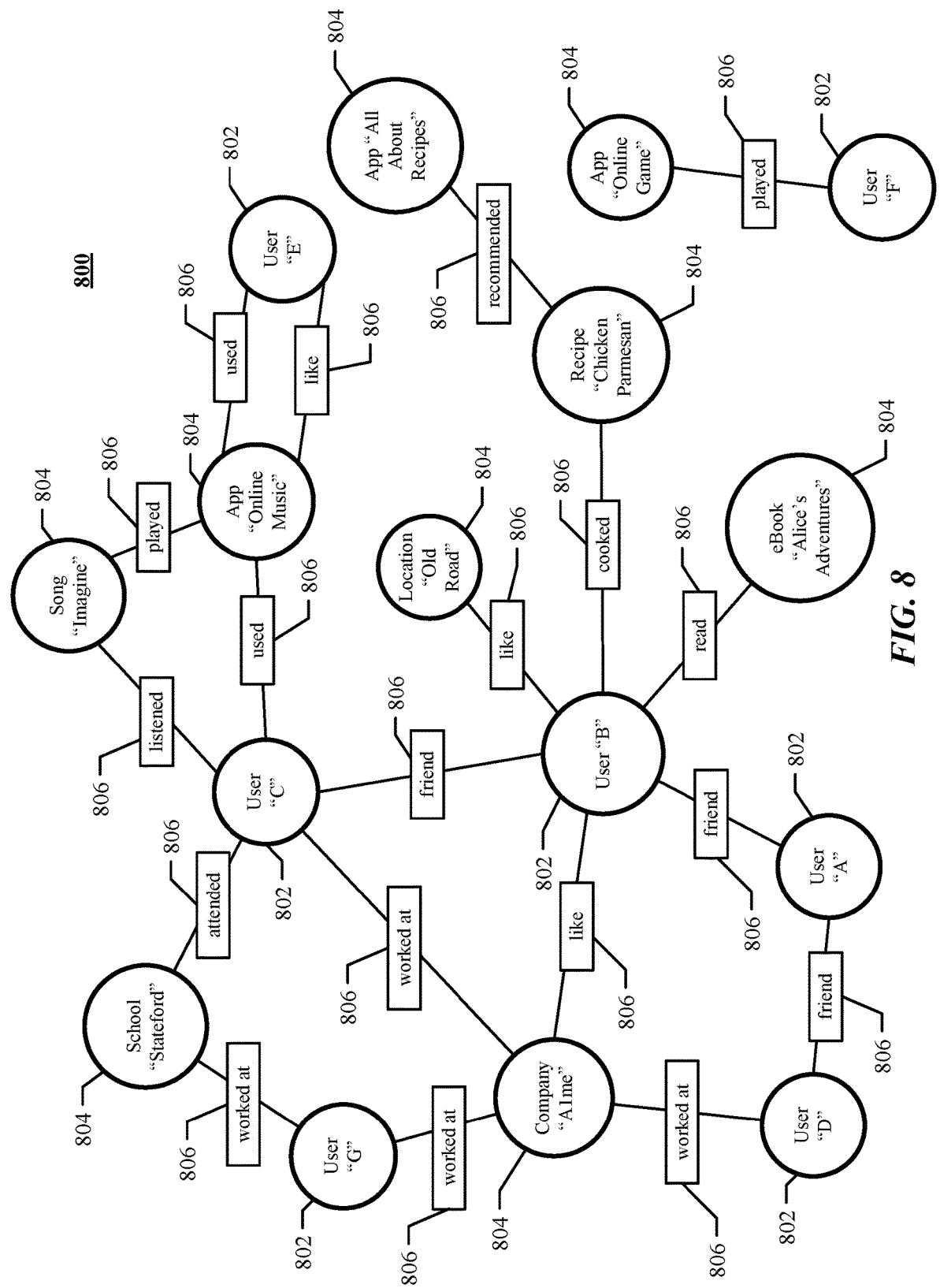
FIG. 8 illustrates an example social graph.

FIG. 8 illustrates an example social graph 800. In particular embodiments, the social-networking system 160 may store one or more social graphs 800 in one or more data stores. In particular embodiments, the social graph 800 may include multiple nodes—which may include multiple user nodes 802 or multiple concept nodes 804—and multiple edges 806 connecting the nodes. Each node may be associated with a unique entity (i.e., user or concept), each of which may have a unique identifier (ID), such as a unique number or username. The example social graph 800 illustrated in FIG. 8 is shown, for didactic purposes, in a two-dimensional visual map representation. In particular embodiments, a social-networking system 160, a client system 130, an assistant system 140, or a third-party system 170 may access the social graph 800 and related social-graph information for suitable applications. The nodes and edges of the social graph 800 may be stored as data objects, for example, in a data store (such as a social-graph database). Such a data store may include one or more searchable or queryable indexes of nodes or edges of the social graph 800.

In particular embodiments, a user node 802 may correspond to a user of the social-networking system 160 or the assistant system 140. As an example and not by way of limitation, a user may be an individual (human user), an entity (e.g., an enterprise, business, or third-party application), or a group (e.g., of individuals or entities) that interacts or communicates with or over the social-networking system 160 or the assistant system 140. In particular embodiments, when a user registers for an account with the social-networking system 160, the social-networking system 160 may create a user node 802 corresponding to the user, and store the user node 802 in one or more data stores. Users and user nodes 802 described herein may, where appropriate, refer to registered users and user nodes 802 associated with registered users. In addition or as an alternative, users and user nodes 802 described herein may, where appropriate, refer to users that have not registered with the social-networking system 160. In particular embodiments, a user node 802 may be associated with information provided by a user or information gathered by various systems, including the social-networking system 160. As an example and not by way of limitation, a user may provide his or her name, profile picture, contact information, birth date, sex, marital status, family status, employment, education background, preferences, interests, or other demographic information. In particular embodiments, a user node 802 may be associated with one or more data objects corresponding to information associated with a user. In particular embodiments, a user node 802 may correspond to one or more web interfaces.

In particular embodiments, a concept node 804 may correspond to a concept. As an example and not by way of limitation, a concept may correspond to a place (such as, for example, a movie theater, restaurant, landmark, or city); a website (such as, for example, a website associated with the social-networking system 160 or a third-party website associated with a web-application server); an entity (such as, for example, a person, business, group, sports team, or celebrity); a resource (such as, for example, an audio file, video file, digital photo, text file, structured document, or application) which may be located within the social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 804 may be associated with information of a concept provided by a user or information gathered by various systems, including the social-networking system 160 and the assistant system 140. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 804 may be associated with one or more data objects corresponding to information associated with concept node 804. In particular embodiments, a concept node 804 may correspond to one or more web interfaces.

In particular embodiments, a node in the social graph 800 may represent or be represented by a web interface (which may be referred to as a "profile interface"). Profile interfaces may be hosted by or accessible to the social-networking system 160 or the assistant system 140. Profile interfaces may also be hosted on third-party websites associated with a third-party system 170. As an example and not by way of limitation, a profile interface corresponding to a particular external web interface may be the particular external web interface and the profile interface may correspond to a particular concept node 804. Profile interfaces may be viewable by all or a selected subset of other users. As an example and not by way of limitation, a user node 802 may have a corresponding user-profile interface in which the corresponding user may add content, make declarations, or otherwise express himself or herself. As another example and not by way of limitation, a concept node 804 may have a corresponding concept-profile interface in which one or more users may add content, make declarations, or express themselves, particularly in relation to the concept corresponding to concept node 804.

In particular embodiments, a concept node 804 may represent a third-party web interface or resource hosted by a third-party system 170. The third-party web interface or resource may include, among other elements, content, a selectable or other icon, or other inter-actable object representing an action or activity. As an example and not by way of limitation, a third-party web interface may include a selectable icon such as "like," "check-in," "eat," "recommend," or another suitable action or activity. A user viewing the third-party web interface may perform an action by selecting one of the icons (e.g., "check-in"), causing a client system 130 to send to the social-networking system 160 a message indicating the user's action. In response to the message, the social-networking system 160 may create an edge (e.g., a check-in-type edge) between a user node 802 corresponding to the user and a concept node 804 corresponding to the third-party web interface or resource and store edge 806 in one or more data stores.

In particular embodiments, a pair of nodes in the social graph 800 may be connected to each other by one or more edges 806. An edge 806 connecting a pair of nodes may represent a relationship between the pair of nodes. In particular embodiments, an edge 806 may include or represent one or more data objects or attributes corresponding to the relationship between a pair of nodes. As an example and not by way of limitation, a first user may indicate that a second user is a "friend" of the first user. In response to this indication, the social-networking system 160 may send a "friend request" to the second user. If the second user confirms the "friend request," the social-networking system 160 may create an edge 806 connecting the first user's user node 802 to the second user's user node 802 in the social graph 800 and store edge 806 as social-graph information in one or more of data stores 164. In the example of FIG. 8, the social graph 800 includes an edge 806 indicating a friend relation between user nodes 802 of user "A" and user "B" and an edge indicating a friend relation between user nodes 802 of user "C" and user "B." Although this disclosure describes or illustrates particular edges 806 with particular attributes connecting particular user nodes 802, this disclosure contemplates any suitable edges 806 with any suitable attributes connecting user nodes 802. As an example and not by way of limitation, an edge 806 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in the social graph 800 by one or more edges 806. The degree of separation between two objects represented by two nodes, respectively, is a count of edges in a shortest path connecting the two nodes in the social graph 800. As an example and not by way of limitation, in the social graph 800, the user node 802 of user "C" is connected to the user node 802 of user "A" via multiple paths including, for example, a first path directly passing through the user node 802 of user "B," a second path passing through the concept node 804 of company "Alme" and the user node 802 of user "D," and a third path passing through the user nodes 802 and concept nodes 804 representing school "Stateford," user "G," company "Alme," and user "D." User "C" and user "A" have a degree of separation of two because the shortest path connecting their corresponding nodes (i.e., the first path) includes two edges 806.

In particular embodiments, an edge 806 between a user node 802 and a concept node 804 may represent a particular action or activity performed by a user associated with user node 802 toward a concept associated with a concept node 804. As an example and not by way of limitation, as illustrated in FIG. 8, a user may "like," "attended," "played," "listened," "cooked," "worked at," or "read" a concept, each of which may correspond to an edge type or subtype. A concept-profile interface corresponding to a concept node 804 may include, for example, a selectable "check in" icon (such as, for example, a clickable "check in" icon) or a selectable "add to favorites" icon. Similarly, after a user clicks these icons, the social-networking system 160 may create a "favorite" edge or a "check in" edge in response to a user's action corresponding to a respective action. As another example and not by way of limitation, a user (user "C") may listen to a particular song ("Imagine") using a particular application (a third-party online music application). In this case, the social-networking system 160 may create a "listened" edge 806 and a "used" edge (as illustrated in FIG. 8) between user nodes 802 corresponding to the user and concept nodes 804 corresponding to the song and application to indicate that the user listened to the song and used the application. Moreover, the social-networking system 160 may create a "played" edge 806 (as illustrated in FIG. 8) between concept nodes 804 corresponding to the song and the application to indicate that the particular song was played by the particular application. In this case, "played" edge 806 corresponds to an action performed by an external application (the third-party online music application) on an external audio file (the song "Imagine"). Although this disclosure describes particular edges 806 with particular attributes connecting user nodes 802 and concept nodes 804, this disclosure contemplates any suitable edges 806 with any suitable attributes connecting user nodes 802 and concept nodes 804. Moreover, although this disclosure describes edges between a user node 802 and a concept node 804 representing a single relationship, this disclosure contemplates edges between a user node 802 and a concept node 804 representing one or more relationships. As an example and not by way of limitation, an edge 806 may represent both that a user likes and has used at a particular concept. Alternatively, another edge 806 may represent each type of relationship (or multiples of a single relationship) between a user node 802 and a concept node 804 (as illustrated in FIG. 8 between user node 802 for user "E" and concept node 804 for "online music application").

In particular embodiments, the social-networking system 160 may create an edge 806 between a user node 802 and a concept node 804 in the social graph 800. As an example and not by way of limitation, a user viewing a concept-profile interface (such as, for example, by using a web browser or a special-purpose application hosted by the user's client system 130) may indicate that he or she likes the concept represented by the concept node 804 by clicking or selecting a "Like" icon, which may cause the user's client system 130 to send to the social-networking system 160 a message indicating the user's liking of the concept associated with the concept-profile interface. In response to the message, the social-networking system 160 may create an edge 806 between user node 802 associated with the user and concept node 804, as illustrated by "like" edge 806 between the user and concept node 804. In particular embodiments, the social-networking system 160 may store an edge 806 in one or more data stores. In particular embodiments, an edge 806 may be automatically formed by the social-networking system 160 in response to a particular user action. As an example and not by way of limitation, if a first user uploads a picture, reads a book, watches a movie, or listens to a song, an edge 806 may be formed between user node 802 corresponding to the first user and concept nodes 804 corresponding to those concepts. Although this disclosure describes forming particular edges 806 in particular manners, this disclosure contemplates forming any suitable edges 806 in any suitable manner.

Vector Spaces and Embeddings

Figure 9:
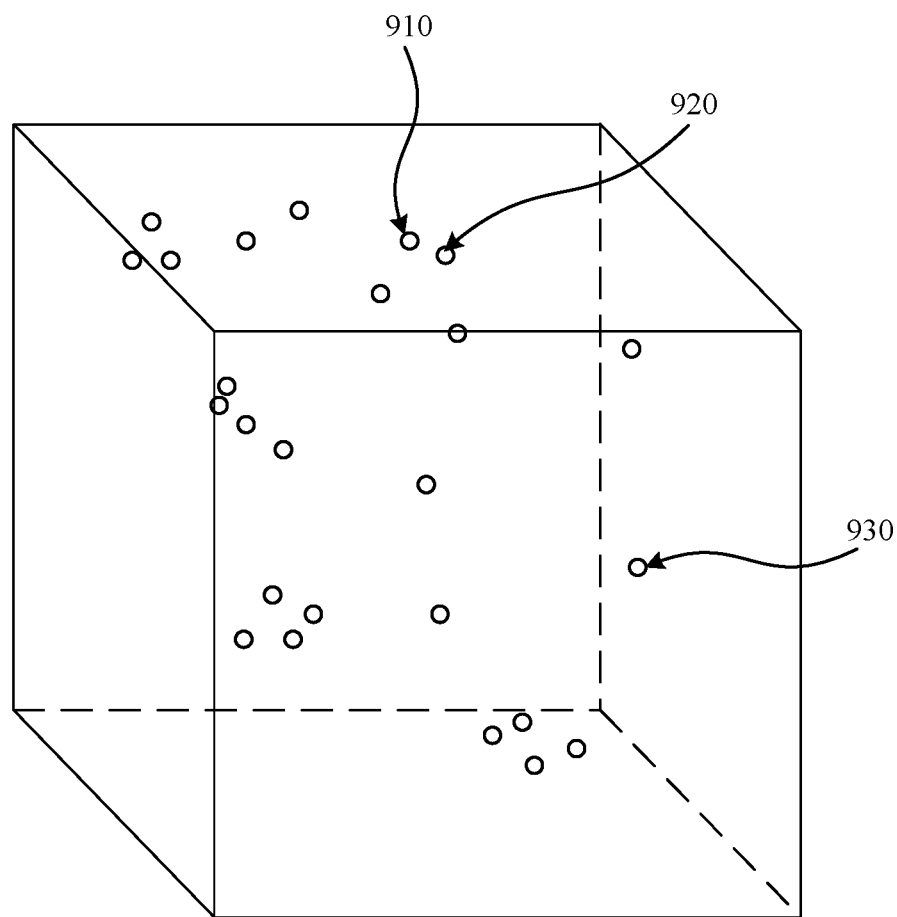
FIG. 9 illustrates an example view of an embedding space.

FIG. 9 illustrates an example view of a vector space 900. In particular embodiments, an object or an n-gram may be represented in a d-dimensional vector space, where d denotes any suitable number of dimensions. Although the vector space 900 is illustrated as a three-dimensional space, this is for illustrative purposes only, as the vector space 900 may be of any suitable dimension. In particular embodiments, an n-gram may be represented in the vector space 900 as a vector referred to as a term embedding. Each vector may comprise coordinates corresponding to a particular point in the vector space 900 (i.e., the terminal point of the vector). As an example and not by way of limitation, vectors 910, 920, and 930 may be represented as points in the vector space 900, as illustrated in FIG. 9. An n-gram may be mapped to a respective vector representation. As an example and not by way of limitation, n-grams $t_1$ and $t_2$ may be mapped to vectors $\vec{v_1}$ and $\vec{v_2}$ in the vector space 900, respectively, by applying a function $\vec{\pi}$ defined by a dictionary, such that $\vec{v_1} = \vec{\pi}(t_1)$ and $\vec{v_2} = \vec{\pi}(t_2)$. As another example and not by way of limitation, a dictionary trained to map text to a vector representation may be utilized, or such a dictionary may be itself generated via training. As another example and not by way of limitation, a word-embeddings model may be used to map an n-gram to a vector representation in the vector space 900. In particular embodiments, an n-gram may be mapped to a vector representation in the vector space 900 by using a machine leaning model (e.g., a neural network). The machine learning model may have been trained using a sequence of training data (e.g., a corpus of objects each comprising n-grams).

In particular embodiments, an object may be represented in the vector space 900 as a vector referred to as a feature vector or an object embedding. As an example and not by way of limitation, objects $e_1$ and $e_2$ may be mapped to vectors $\vec{v_1}$ and $\vec{v_2}$ in the vector space 900, respectively, by applying a function $\vec{v_1}$, such that $\vec{v_1} = \vec{\pi}(e_1)$ and $\vec{v_2} = \vec{\pi}(e_2)$. In particular embodiments, an object may be mapped to a vector based on one or more properties, attributes, or features of the object, relationships of the object with other objects, or any other suitable information associated with the object. As an example and not by way of limitation, a function may map objects to vectors by feature extraction, which may start from an initial set of measured data and build derived values (e.g., features). As an example and not by way of limitation, an object comprising a video or an image may be mapped to a vector by using an algorithm to detect or isolate various desired portions or shapes of the object. Features used to calculate the vector may be based on information obtained from edge detection, corner detection, blob detection, ridge detection, scale-invariant feature transformation, edge direction, changing intensity, autocorrelation, motion detection, optical flow, thresholding, blob extraction, template matching, Hough transformation (e.g., lines, circles, ellipses, arbitrary shapes), or any other suitable information. As another example and not by way of limitation, an object comprising audio data may be mapped to a vector based on features such as a spectral slope, a tonality coefficient, an audio spectrum centroid, an audio spectrum envelope, a Mel-frequency cepstrum, or any other suitable information. In particular embodiments, when an object has data that is either too large to be efficiently processed or comprises redundant data, a function $\vec{\pi}$ may map the object to a vector using a transformed reduced set of features (e.g., feature selection). In particular embodiments, a function $\vec{\pi}$ may map an object e to a vector $\vec{\pi}(e)$ based on one or more n-grams associated with object e. Although this disclosure describes representing an n-gram or an object in a vector space in a particular manner, this disclosure contemplates representing an n-gram or an object in a vector space in any suitable manner.

In particular embodiments, the social-networking system 160 may calculate a similarity metric of vectors in vector space 900. A similarity metric may be a cosine similarity, a Minkowski distance, a Mahalanobis distance, a Jaccard similarity coefficient, or any suitable similarity metric. As an example and not by way of limitation, a similarity metric of $\vec{v_1}$ and $\vec{v_2}$ may be a cosine similarity $$\frac{\vec{v_1} \cdot \vec{v_2}}{\|\vec{v_1}\| \|\vec{v_2}\|}.$$

As another example and not by way of limitation, a similarity metric of $\vec{v_1}$ and $\vec{v_2}$ may be a Euclidean distance $\|\vec{v_1} - \vec{v_2}\|$. A similarity metric of two vectors may represent how similar the two objects or n-grams corresponding to the two vectors, respectively, are to one another, as measured by the distance between the two vectors in the vector space 900. As an example and not by way of limitation, vector 910 and vector 920 may correspond to objects that are more similar to one another than the objects corresponding to vector 910 and vector 930, based on the distance between the respective vectors. Although this disclosure describes calculating a similarity metric between vectors in a particular manner, this disclosure contemplates calculating a similarity metric between vectors in any suitable manner.

More information on vector spaces, embeddings, feature vectors, and similarity metrics may be found in U.S. patent application Ser. No. 14/949,436, filed 23 Nov. 2015, U.S. patent application Ser. No. 15/286,315, filed 5 Oct. 2016, and U.S. patent application Ser. No. 15/365,789, filed 30 Nov. 2016, each of which is incorporated by reference.

Artificial Neural Networks

Figure 10:
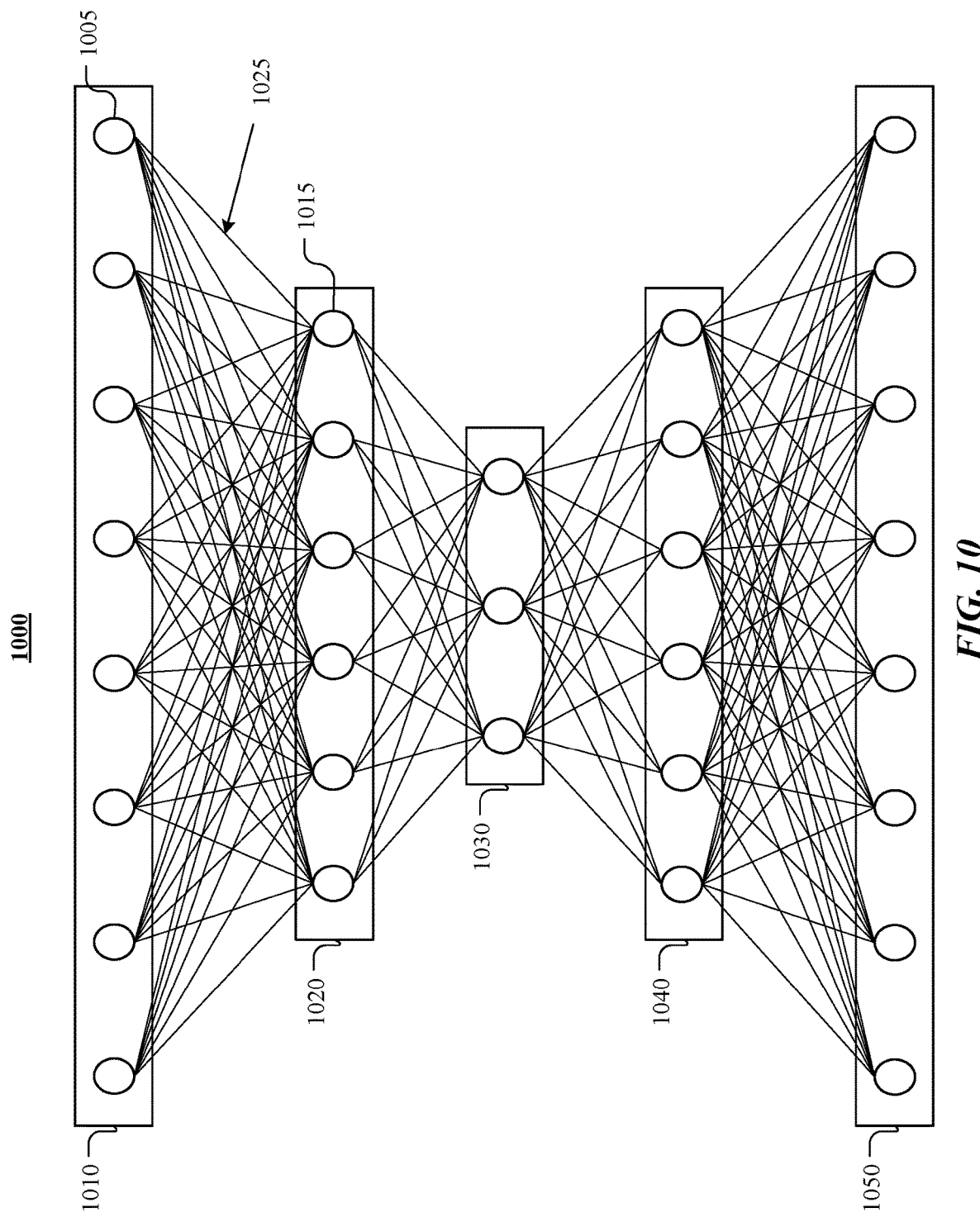
FIG. 10 illustrates an example artificial neural network.

FIG. 10 illustrates an example artificial neural network ("ANN") 1000. In particular embodiments, an ANN may refer to a computational model comprising one or more nodes. Example ANN 1000 may comprise an input layer 1010, hidden layers 1020, 1030, 1040, and an output layer 1050. Each layer of the ANN 1000 may comprise one or more nodes, such as a node 1005 or a node 1015. In particular embodiments, each node of an ANN may be connected to another node of the ANN. As an example and not by way of limitation, each node of the input layer 1010 may be connected to one or more nodes of the hidden layer 1020. In particular embodiments, one or more nodes may be a bias node (e.g., a node in a layer that is not connected to and does not receive input from any node in a previous layer). In particular embodiments, each node in each layer may be connected to one or more nodes of a previous or subsequent layer. Although FIG. 10 depicts a particular ANN with a particular number of layers, a particular number of nodes, and particular connections between nodes, this disclosure contemplates any suitable ANN with any suitable number of layers, any suitable number of nodes, and any suitable connections between nodes. As an example and not by way of limitation, although FIG. 10 depicts a connection between each node of the input layer 1010 and each node of the hidden layer 1020, one or more nodes of the input layer 1010 may not be connected to one or more nodes of the hidden layer 1020.

In particular embodiments, an ANN may be a feedforward ANN (e.g., an ANN with no cycles or loops where communication between nodes flows in one direction beginning with the input layer and proceeding to successive layers). As an example and not by way of limitation, the input to each node of the hidden layer 1020 may comprise the output of one or more nodes of the input layer 1010. As another example and not by way of limitation, the input to each node of the output layer 1050 may comprise the output of one or more nodes of the hidden layer 1040. In particular embodiments, an ANN may be a deep neural network (e.g., a neural network comprising at least two hidden layers). In particular embodiments, an ANN may be a deep residual network. A deep residual network may be a feedforward ANN comprising hidden layers organized into residual blocks. The input into each residual block after the first residual block may be a function of the output of the previous residual block and the input of the previous residual block. As an example and not by way of limitation, the input into residual block N may be F(x)+x, where F(x) may be the output of residual block N−1, x may be the input into residual block N−1. Although this disclosure describes a particular ANN, this disclosure contemplates any suitable ANN.

In particular embodiments, an activation function may correspond to each node of an ANN. An activation function of a node may define the output of a node for a given input. In particular embodiments, an input to a node may comprise a set of inputs. As an example and not by way of limitation, an activation function may be an identity function, a binary step function, a logistic function, or any other suitable function. As another example and not by way of limitation, an activation function for a node k may be the sigmoid function $$F_k(s_k) = \frac{1}{1 + e^{-s_k}},$$

the hyperbolic tangent function $$F_k(s_k) = \frac{e^{s_k} - e^{-s_k}}{e^{s_k} + e^{-s_k}},$$

the rectifier $F_k(s_k)=\max(0, s_k)$, or any other suitable function $F_k(s_k)$, where $s_k$ may be the effective input to node k. In particular embodiments, the input of an activation function corresponding to a node may be weighted. Each node may generate output using a corresponding activation function based on weighted inputs. In particular embodiments, each connection between nodes may be associated with a weight. As an example and not by way of limitation, a connection 1025 between the node 1005 and the node 1015 may have a weighting coefficient of 0.4, which may indicate that 0.4 multiplied by the output of the node 1005 is used as an input to the node 1015. As another example and not by way of limitation, the output $y_k$ of node k may be $y_k=F_k(s_k)$, where $F_k$ may be the activation function corresponding to node k, $s_k=\Sigma_j(w_{jk}x_j)$ may be the effective input to node k, $x_j$ may be the output of a node j connected to node k, and $w_{jk}$ may be the weighting coefficient between node j and node k. In particular embodiments, the input to nodes of the input layer may be based on a vector representing an object. Although this disclosure describes particular inputs to and outputs of nodes, this disclosure contemplates any suitable inputs to and outputs of nodes. Moreover, although this disclosure may describe particular connections and weights between nodes, this disclosure contemplates any suitable connections and weights between nodes.

In particular embodiments, an ANN may be trained using training data. As an example and not by way of limitation, training data may comprise inputs to the ANN 1000 and an expected output. As another example and not by way of limitation, training data may comprise vectors each representing a training object and an expected label for each training object. In particular embodiments, training an ANN may comprise modifying the weights associated with the connections between nodes of the ANN by optimizing an objective function. As an example and not by way of limitation, a training method may be used (e.g., the conjugate gradient method, the gradient descent method, the stochastic gradient descent) to backpropagate the sum-of-squares error measured as a distances between each vector representing a training object (e.g., using a cost function that minimizes the sum-of-squares error). In particular embodiments, an ANN may be trained using a dropout technique. As an example and not by way of limitation, one or more nodes may be temporarily omitted (e.g., receive no input and generate no output) while training. For each training object, one or more nodes of the ANN may have some probability of being omitted. The nodes that are omitted for a particular training object may be different than the nodes omitted for other training objects (e.g., the nodes may be temporarily omitted on an object-by-object basis). Although this disclosure describes training an ANN in a particular manner, this disclosure contemplates training an ANN in any suitable manner.

Privacy

In particular embodiments, one or more objects (e.g., content or other types of objects) of a computing system may be associated with one or more privacy settings. The one or more objects may be stored on or otherwise associated with any suitable computing system or application, such as, for example, a social-networking system 160, a client system 130, an assistant system 140, a third-party system 170, a social-networking application, an assistant application, a messaging application, a photo-sharing application, or any other suitable computing system or application. Although the examples discussed herein are in the context of an online social network, these privacy settings may be applied to any other suitable computing system. Privacy settings (or "access settings") for an object may be stored in any suitable manner, such as, for example, in association with the object, in an index on an authorization server, in another suitable manner, or any suitable combination thereof. A privacy setting for an object may specify how the object (or particular information associated with the object) can be accessed, stored, or otherwise used (e.g., viewed, shared, modified, copied, executed, surfaced, or identified) within the online social network. When privacy settings for an object allow a particular user or other entity to access that object, the object may be described as being "visible" with respect to that user or other entity. As an example and not by way of limitation, a user of the online social network may specify privacy settings for a user-profile page that identify a set of users that may access work-experience information on the user-profile page, thus excluding other users from accessing that information.

In particular embodiments, privacy settings for an object may specify a "blocked list" of users or other entities that should not be allowed to access certain information associated with the object. In particular embodiments, the blocked list may include third-party entities. The blocked list may specify one or more users or entities for which an object is not visible. As an example and not by way of limitation, a user may specify a set of users who may not access photo albums associated with the user, thus excluding those users from accessing the photo albums (while also possibly allowing certain users not within the specified set of users to access the photo albums). In particular embodiments, privacy settings may be associated with particular social-graph elements. Privacy settings of a social-graph element, such as a node or an edge, may specify how the social-graph element, information associated with the social-graph element, or objects associated with the social-graph element can be accessed using the online social network. As an example and not by way of limitation, a particular concept node 804 corresponding to a particular photo may have a privacy setting specifying that the photo may be accessed only by users tagged in the photo and friends of the users tagged in the photo. In particular embodiments, privacy settings may allow users to opt in to or opt out of having their content, information, or actions stored/logged by the social-networking system 160 or assistant system 140 or shared with other systems (e.g., a third-party system 170). Although this disclosure describes using particular privacy settings in a particular manner, this disclosure contemplates using any suitable privacy settings in any suitable manner.

In particular embodiments, privacy settings may be based on one or more nodes or edges of a social graph 800. A privacy setting may be specified for one or more edges 806 or edge-types of the social graph 800, or with respect to one or more nodes 802, 804 or node-types of the social graph 800. The privacy settings applied to a particular edge 806 connecting two nodes may control whether the relationship between the two entities corresponding to the nodes is visible to other users of the online social network. Similarly, the privacy settings applied to a particular node may control whether the user or concept corresponding to the node is visible to other users of the online social network. As an example and not by way of limitation, a first user may share an object to the social-networking system 160. The object may be associated with a concept node 804 connected to a user node 802 of the first user by an edge 806. The first user may specify privacy settings that apply to a particular edge 806 connecting to the concept node 804 of the object, or may specify privacy settings that apply to all edges 806 connecting to the concept node 804. As another example and not by way of limitation, the first user may share a set of objects of a particular object-type (e.g., a set of images). The first user may specify privacy settings with respect to all objects associated with the first user of that particular object-type as having a particular privacy setting (e.g., specifying that all images posted by the first user are visible only to friends of the first user and/or users tagged in the images).

In particular embodiments, the social-networking system 160 may present a "privacy wizard" (e.g., within a webpage, a module, one or more dialog boxes, or any other suitable interface) to the first user to assist the first user in specifying one or more privacy settings. The privacy wizard may display instructions, suitable privacy-related information, current privacy settings, one or more input fields for accepting one or more inputs from the first user specifying a change or confirmation of privacy settings, or any suitable combination thereof. In particular embodiments, the social-networking system 160 may offer a "dashboard" functionality to the first user that may display, to the first user, current privacy settings of the first user. The dashboard functionality may be displayed to the first user at any appropriate time (e.g., following an input from the first user summoning the dashboard functionality, following the occurrence of a particular event or trigger action). The dashboard functionality may allow the first user to modify one or more of the first user's current privacy settings at any time, in any suitable manner (e.g., redirecting the first user to the privacy wizard).

Privacy settings associated with an object may specify any suitable granularity of permitted access or denial of access. As an example and not by way of limitation, access or denial of access may be specified for particular users (e.g., only me, my roommates, my boss), users within a particular degree-of-separation (e.g., friends, friends-of-friends), user groups (e.g., the gaming club, my family), user networks (e.g., employees of particular employers, students or alumni of particular university), all users ("public"), no users ("private"), users of third-party systems 170, particular applications (e.g., third-party applications, external websites), other suitable entities, or any suitable combination thereof. Although this disclosure describes particular granularities of permitted access or denial of access, this disclosure contemplates any suitable granularities of permitted access or denial of access.

In particular embodiments, one or more servers 162 may be authorization/privacy servers for enforcing privacy settings. In response to a request from a user (or other entity) for a particular obj ect stored in a data store 164, the social-networking system 160 may send a request to the data store 164 for the object. The request may identify the user associated with the request and the object may be sent only to the user (or a client system 130 of the user) if the authorization server determines that the user is authorized to access the object based on the privacy settings associated with the object. If the requesting user is not authorized to access the object, the authorization server may prevent the requested object from being retrieved from the data store 164 or may prevent the requested object from being sent to the user. In the search-query context, an object may be provided as a search result only if the querying user is authorized to access the object, e.g., if the privacy settings for the object allow it to be surfaced to, discovered by, or otherwise visible to the querying user. In particular embodiments, an object may represent content that is visible to a user through a newsfeed of the user. As an example and not by way of limitation, one or more objects may be visible to a user's "Trending" page. In particular embodiments, an object may correspond to a particular user. The object may be content associated with the particular user, or may be the particular user's account or information stored on the social-networking system 160, or other computing system. As an example and not by way of limitation, a first user may view one or more second users of an online social network through a "People You May Know" function of the online social network, or by viewing a list of friends of the first user. As an example and not by way of limitation, a first user may specify that they do not wish to see objects associated with a particular second user in their newsfeed or friends list. If the privacy settings for the object do not allow it to be surfaced to, discovered by, or visible to the user, the object may be excluded from the search results. Although this disclosure describes enforcing privacy settings in a particular manner, this disclosure contemplates enforcing privacy settings in any suitable manner.

In particular embodiments, different objects of the same type associated with a user may have different privacy settings. Different types of objects associated with a user may have different types of privacy settings. As an example and not by way of limitation, a first user may specify that the first user's status updates are public, but any images shared by the first user are visible only to the first user's friends on the online social network. As another example and not by way of limitation, a user may specify different privacy settings for different types of entities, such as individual users, friends-of-friends, followers, user groups, or corporate entities. As another example and not by way of limitation, a first user may specify a group of users that may view videos posted by the first user, while keeping the videos from being visible to the first user's employer. In particular embodiments, different privacy settings may be provided for different user groups or user demographics. As an example and not by way of limitation, a first user may specify that other users who attend the same university as the first user may view the first user's pictures, but that other users who are family members of the first user may not view those same pictures.

In particular embodiments, the social-networking system 160 may provide one or more default privacy settings for each object of a particular object-type. A privacy setting for an object that is set to a default may be changed by a user associated with that object. As an example and not by way of limitation, all images posted by a first user may have a default privacy setting of being visible only to friends of the first user and, for a particular image, the first user may change the privacy setting for the image to be visible to friends and friends-of-friends.

In particular embodiments, privacy settings may allow a first user to specify (e.g., by opting out, by not opting in) whether the social-networking system 160 or assistant system 140 may receive, collect, log, or store particular objects or information associated with the user for any purpose. In particular embodiments, privacy settings may allow the first user to specify whether particular applications or processes may access, store, or use particular objects or information associated with the user. The privacy settings may allow the first user to opt in or opt out of having objects or information accessed, stored, or used by specific applications or processes. The social-networking system 160 or assistant system 140 may access such information in order to provide a particular function or service to the first user, without the social-networking system 160 or assistant system 140 having access to that information for any other purposes. Before accessing, storing, or using such objects or information, the social-networking system 160 or assistant system 140 may prompt the user to provide privacy settings specifying which applications or processes, if any, may access, store, or use the object or information prior to allowing any such action. As an example and not by way of limitation, a first user may transmit a message to a second user via an application related to the online social network (e.g., a messaging app), and may specify privacy settings that such messages should not be stored by the social-networking system 160 or assistant system 140.

In particular embodiments, a user may specify whether particular types of objects or information associated with the first user may be accessed, stored, or used by the social-networking system 160 or assistant system 140. As an example and not by way of limitation, the first user may specify that images sent by the first user through the social-networking system 160 or assistant system 140 may not be stored by the social-networking system 160 or assistant system 140. As another example and not by way of limitation, a first user may specify that messages sent from the first user to a particular second user may not be stored by the social-networking system 160 or assistant system 140. As yet another example and not by way of limitation, a first user may specify that all objects sent via a particular application may be saved by the social-networking system 160 or assistant system 140.

In particular embodiments, privacy settings may allow a first user to specify whether particular objects or information associated with the first user may be accessed from particular client systems 130 or third-party systems 170. The privacy settings may allow the first user to opt in or opt out of having objects or information accessed from a particular device (e.g., the phone book on a user's smart phone), from a particular application (e.g., a messaging app), or from a particular system (e.g., an email server). The social-networking system 160 or assistant system 140 may provide default privacy settings with respect to each device, system, or application, and/or the first user may be prompted to specify a particular privacy setting for each context. As an example and not by way of limitation, the first user may utilize a location-services feature of the social-networking system 160 or assistant system 140 to provide recommendations for restaurants or other places in proximity to the user. The first user's default privacy settings may specify that the social-networking system 160 or assistant system 140 may use location information provided from a client device 130 of the first user to provide the location-based services, but that the social-networking system 160 or assistant system 140 may not store the location information of the first user or provide it to any third-party system 170. The first user may then update the privacy settings to allow location information to be used by a third-party image-sharing application in order to geo-tag photos.

In particular embodiments, privacy settings may allow a user to specify one or more geographic locations from which objects can be accessed. Access or denial of access to the objects may depend on the geographic location of a user who is attempting to access the objects. As an example and not by way of limitation, a user may share an object and specify that only users in the same city may access or view the object. As another example and not by way of limitation, a first user may share an object and specify that the object is visible to second users only while the first user is in a particular location. If the first user leaves the particular location, the object may no longer be visible to the second users. As another example and not by way of limitation, a first user may specify that an object is visible only to second users within a threshold distance from the first user. If the first user subsequently changes location, the original second users with access to the object may lose access, while a new group of second users may gain access as they come within the threshold distance of the first user.

In particular embodiments, the social-networking system 160 or assistant system 140 may have functionalities that may use, as inputs, personal or biometric information of a user for user-authentication or experience-personalization purposes. A user may opt to make use of these functionalities to enhance their experience on the online social network. As an example and not by way of limitation, a user may provide personal or biometric information to the social-networking system 160 or assistant system 140. The user's privacy settings may specify that such information may be used only for particular processes, such as authentication, and further specify that such information may not be shared with any third-party system 170 or used for other processes or applications associated with the social-networking system 160 or assistant system 140. As another example and not by way of limitation, the social-networking system 160 may provide a functionality for a user to provide voice-print recordings to the online social network. As an example and not by way of limitation, if a user wishes to utilize this function of the online social network, the user may provide a voice recording of his or her own voice to provide a status update on the online social network. The recording of the voice-input may be compared to a voice print of the user to determine what words were spoken by the user. The user's privacy setting may specify that such voice recording may be used only for voice-input purposes (e.g., to authenticate the user, to send voice messages, to improve voice recognition in order to use voice-operated features of the online social network), and further specify that such voice recording may not be shared with any third-party system 170 or used by other processes or applications associated with the social-networking system 160. As another example and not by way of limitation, the social-networking system 160 may provide a functionality for a user to provide a reference image (e.g., a facial profile, a retinal scan) to the online social network. The online social network may compare the reference image against a later-received image input (e.g., to authenticate the user, to tag the user in photos). The user's privacy setting may specify that such image may be used only for a limited purpose (e.g., authentication, tagging the user in photos), and further specify that such image may not be shared with any third-party system 170 or used by other processes or applications associated with the social-networking system 160.

Systems and Methods

Figure 11:
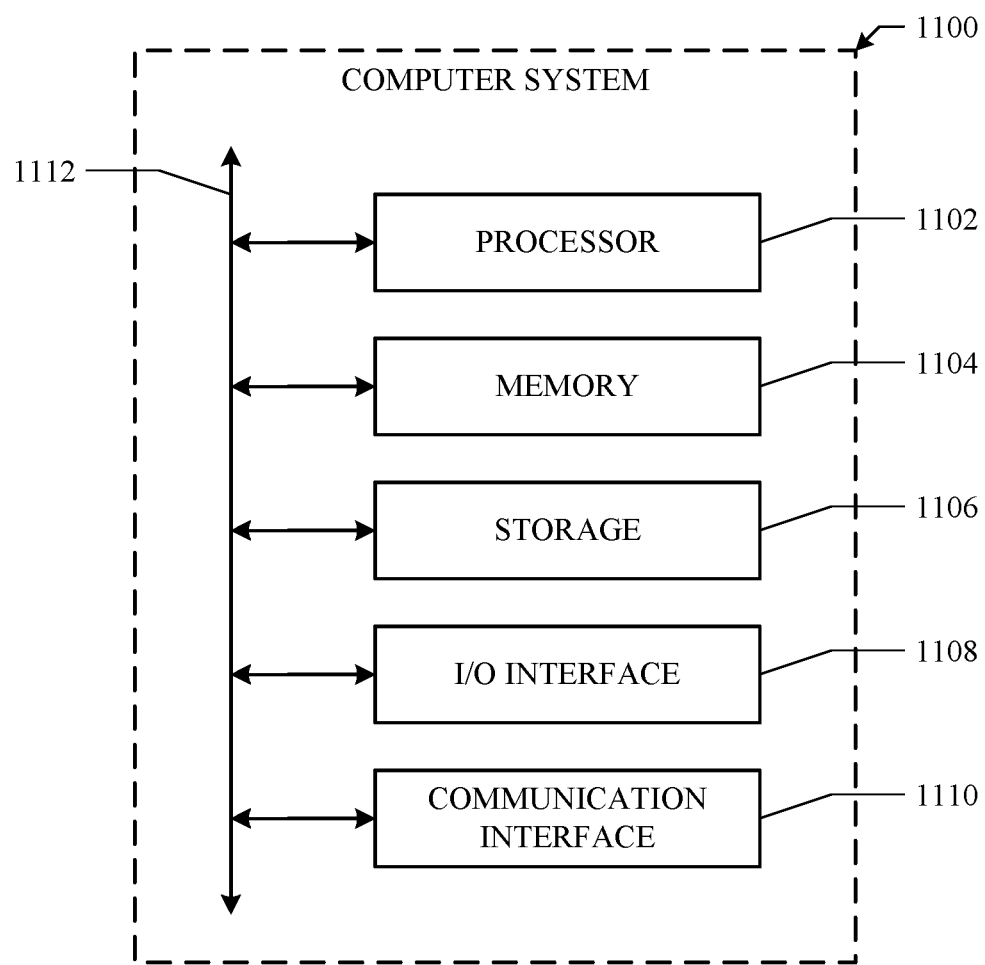
FIG. 11 illustrates an example computer system.

FIG. 11 illustrates an example computer system 1100. In particular embodiments, one or more computer systems 1100 perform one or more steps of one or more methods described or illustrated herein. In particular embodiments, one or more computer systems 1100 provide functionality described or illustrated herein. In particular embodiments, software running on one or more computer systems 1100 performs one or more steps of one or more methods described or illustrated herein or provides functionality described or illustrated herein. Particular embodiments include one or more portions of one or more computer systems 1100. Herein, reference to a computer system may encompass a computing device, and vice versa, where appropriate. Moreover, reference to a computer system may encompass one or more computer systems, where appropriate.

This disclosure contemplates any suitable number of computer systems 1100. This disclosure contemplates computer system 1100 taking any suitable physical form. As example and not by way of limitation, computer system 1100 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 1100 may include one or more computer systems 1100; be unitary or distributed; span multiple locations; span multiple machines; span multiple data centers; or reside in a cloud, which may include one or more cloud components in one or more networks. Where appropriate, one or more computer systems 1100 may perform without substantial spatial or temporal limitation one or more steps of one or more methods described or illustrated herein. As an example and not by way of limitation, one or more computer systems 1100 may perform in real time or in batch mode one or more steps of one or more methods described or illustrated herein. One or more computer systems 1100 may perform at different times or at different locations one or more steps of one or more methods described or illustrated herein, where appropriate.

In particular embodiments, computer system 1100 includes a processor 1102, memory 1104, storage 1106, an input/output (I/O) interface 1108, a communication interface 1110, and a bus 1112. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1102 includes hardware for executing instructions, such as those making up a computer program. As an example and not by way of limitation, to execute instructions, processor 1102 may retrieve (or fetch) the instructions from an internal register, an internal cache, memory 1104, or storage 1106; decode and execute them; and then write one or more results to an internal register, an internal cache, memory 1104, or storage 1106. In particular embodiments, processor 1102 may include one or more internal caches for data, instructions, or addresses. This disclosure contemplates processor 1102 including any suitable number of any suitable internal caches, where appropriate. As an example and not by way of limitation, processor 1102 may include one or more instruction caches, one or more data caches, and one or more translation lookaside buffers (TLBs). Instructions in the instruction caches may be copies of instructions in memory 1104 or storage 1106, and the instruction caches may speed up retrieval of those instructions by processor 1102. Data in the data caches may be copies of data in memory 1104 or storage 1106 for instructions executing at processor 1102 to operate on; the results of previous instructions executed at processor 1102 for access by subsequent instructions executing at processor 1102 or for writing to memory 1104 or storage 1106; or other suitable data. The data caches may speed up read or write operations by processor 1102. The TLBs may speed up virtual-address translation for processor 1102. In particular embodiments, processor 1102 may include one or more internal registers for data, instructions, or addresses. This disclosure contemplates processor 1102 including any suitable number of any suitable internal registers, where appropriate. Where appropriate, processor 1102 may include one or more arithmetic logic units (ALUs); be a multi-core processor; or include one or more processors 1102. Although this disclosure describes and illustrates a particular processor, this disclosure contemplates any suitable processor.

In particular embodiments, memory 1104 includes main memory for storing instructions for processor 1102 to execute or data for processor 1102 to operate on. As an example and not by way of limitation, computer system 1100 may load instructions from storage 1106 or another source (such as, for example, another computer system 1100) to memory 1104. Processor 1102 may then load the instructions from memory 1104 to an internal register or internal cache. To execute the instructions, processor 1102 may retrieve the instructions from the internal register or internal cache and decode them. During or after execution of the instructions, processor 1102 may write one or more results (which may be intermediate or final results) to the internal register or internal cache. Processor 1102 may then write one or more of those results to memory 1104. In particular embodiments, processor 1102 executes only instructions in one or more internal registers or internal caches or in memory 1104 (as opposed to storage 1106 or elsewhere) and operates only on data in one or more internal registers or internal caches or in memory 1104 (as opposed to storage 1106 or elsewhere). One or more memory buses (which may each include an address bus and a data bus) may couple processor 1102 to memory 1104. Bus 1112 may include one or more memory buses, as described below. In particular embodiments, one or more memory management units (MMUs) reside between processor 1102 and memory 1104 and facilitate accesses to memory 1104 requested by processor 1102. In particular embodiments, memory 1104 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1104 may include one or more memories 1104, where appropriate. Although this disclosure describes and illustrates particular memory, this disclosure contemplates any suitable memory.

In particular embodiments, storage 1106 includes mass storage for data or instructions. As an example and not by way of limitation, storage 1106 may include a hard disk drive (HDD), a floppy disk drive, flash memory, an optical disc, a magneto-optical disc, magnetic tape, or a Universal Serial Bus (USB) drive or a combination of two or more of these. Storage 1106 may include removable or non-removable (or fixed) media, where appropriate. Storage 1106 may be internal or external to computer system 1100, where appropriate. In particular embodiments, storage 1106 is non-volatile, solid-state memory. In particular embodiments, storage 1106 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1106 taking any suitable physical form. Storage 1106 may include one or more storage control units facilitating communication between processor 1102 and storage 1106, where appropriate. Where appropriate, storage 1106 may include one or more storages 1106. Although this disclosure describes and illustrates particular storage, this disclosure contemplates any suitable storage.

In particular embodiments, I/O interface 1108 includes hardware, software, or both, providing one or more interfaces for communication between computer system 1100 and one or more I/O devices. Computer system 1100 may include one or more of these I/O devices, where appropriate. One or more of these I/O devices may enable communication between a person and computer system 1100. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1108 for them. Where appropriate, I/O interface 1108 may include one or more device or software drivers enabling processor 1102 to drive one or more of these I/O devices. I/O interface 1108 may include one or more I/O interfaces 1108, where appropriate. Although this disclosure describes and illustrates a particular I/O interface, this disclosure contemplates any suitable I/O interface.

In particular embodiments, communication interface 1110 includes hardware, software, or both providing one or more interfaces for communication (such as, for example, packet-based communication) between computer system 1100 and one or more other computer systems 1100 or one or more networks. As an example and not by way of limitation, communication interface 1110 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1110 for it. As an example and not by way of limitation, computer system 1100 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1100 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1100 may include any suitable communication interface 1110 for any of these networks, where appropriate. Communication interface 1110 may include one or more communication interfaces 1110, where appropriate. Although this disclosure describes and illustrates a particular communication interface, this disclosure contemplates any suitable communication interface.

In particular embodiments, bus 1112 includes hardware, software, or both coupling components of computer system 1100 to each other. As an example and not by way of limitation, bus 1112 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1112 may include one or more buses 1112, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by one or more computing systems:
   receiving, from a client system associated with a user, a first user request to execute a first task comprising one or more sub-tasks;
   receiving, from the client system, a second user request to suspend the first task;
   storing a dialog state for the first task in response to the second user request, wherein the dialog state comprises results of executed sub-tasks and a status indicating the first task is suspended;
   receiving a third user request;
   determining, based on a current dialog state and user interactions with the computing systems with respect to one or more entities associated with the first task, that the third user request is a request to resume the suspended first task;
   accessing the dialog state for the first task; and
   sending, to the client system, instructions for presenting a prompt to resume the first task.

2. The method of claim 1, further comprising:
   executing one or more of the one or more sub-tasks of the first task.

3. The method of claim 1, further comprising:
   determining, by a natural-language understanding module, the second user request is associated with a meta-intent to suspend the first task.

4. The method of claim 1, further comprising:
   determining, based on a current dialog state and contextual information associated with the second user request, that the first task is associated with the second user request.

5. The method of claim 1, further comprising:
   determining, by a natural-language understanding module, the third user request is associated with a meta-intent to resume the first task.

6. The method of claim 1, further comprising:
   determining, based on the current dialog state and contextual information associated with the third user request, that the suspended first task is associated with the third user request.

7. The method of claim 1, wherein storing the dialog state for the first task comprises:

allocating a particular portion of the dialog state to the first task, wherein the particular portion is associated with one or more of a task identifier or a task name associated with the first task.

8. The method of claim 7, wherein accessing the dialog state for the first task comprises:
identifying the particular portion of the dialog state based on one or more of the task identifier or the task name associated with the first task; and
retrieving the particular portion of the stored dialog state, wherein the retrieved portion comprises the dialog state for the first task.

9. The method of claim 1, wherein the first, second, or third user requests are based on one or more of a textual input, an image input, a video input, an audio input, or a gesture input.

10. The method of claim 1, wherein the dialog state for the first task is stored in a dialog state stack, wherein the storing of the dialog state in the dialog state stack is based on a priority associated with the first task.

11. The method of claim 1, wherein storing the dialog state for the first task is based on one or more task policies.

12. The method of claim 1, wherein accessing the dialog state for the first task is based on one or more task policies.

13. The method of claim 1, further comprising:
determining, based on one or more of contextual information associated with the user or a policy associated with the first task, that the user needs to be reminded of the suspended task; and
sending, to the client system, instructions for presenting a notification reminding the user of the suspended first task.

14. The method of claim 1, wherein the prompt comprises a summary of the first task, wherein the summary is generated based on the accessed dialog state.

15. The method of claim 14, wherein the summary is generated by a natural-language generation (NLG) module based on one or more of a language-template or a language model.

16. The method of claim 1, further comprising:
receiving, from the client system, a fourth user request to execute a second task;
executing the second task; and
resuming the first task based on execution results of the second task.

17. The method of claim 1, further comprising:
generating a task-function based on the suspension and resuming of the first task, wherein the task-function comprises one or more default intents and one or more slot-values for one or more slots associated with the first task, respectively, and wherein the task-function is associated with a task alias;
receiving a user call from the user, wherein the user call comprises the task alias;
sending, to the client system, instructions for presenting a summary of the task-function based on the default intents and the slot-values; and
executing the first task based on the default intents and the slot-values upon receiving a confirmation from the user.

18. One or more computer-readable non-transitory storage media embodying software that is operable when executed to:
receive, from a client system associated with a user, a first user request to execute a first task comprising one or more sub-tasks;
receive, from the client system, a second user request to suspend the first task;
store a dialog state for the first task in response to the second user request, wherein the dialog state comprises results of executed sub-tasks and a status indicating the first task is suspended;
receive a third user request;
determine, based on a current dialog state and user interactions with the computing systems with respect to one or more entities associated with the first task, that the third user request is a request to resume the suspended first task;
access the dialog state for the first task; and
send, to the client system, instructions for presenting a prompt to resume the first task.

19. A system comprising: one or more processors; and a non-transitory memory coupled to the processors comprising instructions executable by the processors, the processors operable when executing the instructions to:
receive, from a client system associated with a user, a first user request to execute a first task comprising one or more sub-tasks;
receive, from the client system, a second user request to suspend the first task;
store a dialog state for the first task in response to the second user request, wherein the dialog state comprises results of executed sub-tasks and a status indicating the first task is suspended;
receive a third user request;
determine, based on a current dialog state and user interactions with the computing systems with respect to one or more entities associated with the first task, that the third user request is a request to resume the suspended first task;
access the dialog state for the first task; and
send, to the client system, instructions for presenting a prompt to resume the first task.

* * * * *